(12) United States Patent
Koberg et al.

(10) Patent No.: US 12,535,176 B2
(45) Date of Patent: Jan. 27, 2026

(54) INTERLOCKING OUTRIGGER PAD SUPPORT SYSTEM

(71) Applicant: DICA Marketing Company, Urbandale, IA (US)

(72) Inventors: Kris Koberg, Cedar Rapids, IA (US); Dan Lewis, West Des Moines, IA (US)

(73) Assignee: DICA Marketing Company, Urbandale, IA (US)

( * ) Notice: Subject to any disclaimer, the term of this patent is extended or adjusted under 35 U.S.C. 154(b) by 129 days.

(21) Appl. No.: 18/449,232

(22) Filed: Aug. 14, 2023

(65) Prior Publication Data

US 2024/0084953 A1 Mar. 14, 2024

Related U.S. Application Data

(63) Continuation-in-part of application No. 17/825,636, filed on May 26, 2022, now abandoned.
(Continued)

(51) Int. Cl.
*F16M 3/00* (2006.01)
(52) U.S. Cl.
CPC ........... *F16M 3/00* (2013.01); *F16M 2200/08* (2013.01)
(58) Field of Classification Search
CPC ....... F16M 3/00; F16M 2200/08; E02F 9/085; B66C 23/78
See application file for complete search history.

(56) References Cited

U.S. PATENT DOCUMENTS

| 1,009,469 A | 11/1911 | Burrowes |
| 1,312,331 A | 8/1919 | Kircher |

(Continued)

FOREIGN PATENT DOCUMENTS

| CA | 2821073 C | 11/2014 |
| CA | 2860490 C | 7/2016 |

(Continued)

OTHER PUBLICATIONS

Mytee products medium outrigger pad, stackable, sold on amazon. com https://www.amazon.com/Mytee-Medium-Outrigger-Pad-Black/dp/B07XF6WR35?th=1 first available date: Sep. 4, 2019 (Year: 2019).*

(Continued)

*Primary Examiner* — Terrell L Mckinnon
*Assistant Examiner* — Ding Y Tan
(74) *Attorney, Agent, or Firm* — Christopher A. Proskey; BrownWinick Law Firm

(57) ABSTRACT

An interlocking outrigger pad support system is provided. The system includes a base pad assembly layer, a support layer, and an upper pad. The base pad assembly layer is formed of a plurality of base pads having alignment features that extend across at least a portion of the upper surface of the plurality of base pads. The support layer is placed on top of the base pad assembly layer and the support layer engages and is held in place by the alignment features of the plurality of base pads. In one or more arrangements, the upper pad has an upper surface and a lower surface, with the lower surface also having an alignment feature. When the upper pad is placed on top of the support layer, the alignment feature of the upper pad engages and is held in place by the support layer.

46 Claims, 83 Drawing Sheets

Related U.S. Application Data

(60) Provisional application No. 63/492,136, filed on Mar. 24, 2023, provisional application No. 63/193,624, filed on May 27, 2021.

(56) References Cited

U.S. PATENT DOCUMENTS

| | | | |
|---|---|---|---|
| 1,703,303 A | 2/1929 | Fitzgerald | |
| 1,704,941 A | 3/1929 | Hobson | |
| 1,707,224 A | 4/1929 | Hobson | |
| 1,749,303 A | 3/1930 | Rutter | |
| 1,773,579 A | 8/1930 | Flath | |
| 1,787,199 A | 12/1930 | Huntoon | |
| 1,868,260 A | 7/1932 | Snyder | |
| 2,123,016 A | 7/1938 | Mcdaniel | |
| 2,197,960 A | 4/1940 | Alexander | |
| 2,306,527 A | 12/1942 | Daniels | |
| 2,315,441 A | 3/1943 | Mcdaniel | |
| 2,335,678 A | 11/1943 | Johnson | |
| 2,353,052 A | 7/1944 | Levin | |
| 3,176,676 A | 4/1965 | Caldwell | |
| 3,415,475 A | 12/1968 | Goodman | |
| 3,464,211 A | 9/1969 | Andresen | |
| 3,631,682 A | 1/1972 | Hilfiker | |
| 3,754,777 A * | 8/1973 | Riggs | B62D 37/00 280/766.1 |
| 3,831,774 A | 8/1974 | Moore | |
| 4,066,234 A * | 1/1978 | Nycum | F16F 1/37 248/633 |
| 4,068,482 A | 1/1978 | Hilfiker | |
| 4,073,454 A | 2/1978 | Sauber | |
| 4,130,293 A | 12/1978 | Hinterreiter | |
| 4,505,449 A | 3/1985 | Turner | |
| D279,030 S | 5/1985 | Risi | |
| D280,024 S | 8/1985 | Risi | |
| D282,241 S | 1/1986 | Sauber | |
| 4,664,562 A | 5/1987 | Clark | |
| D290,277 S | 6/1987 | Fernandez | |
| 4,840,003 A | 6/1989 | Lucas | |
| 4,932,178 A | 6/1990 | Mozingo | |
| 4,937,315 A | 6/1990 | Barthelemy | |
| 4,997,315 A | 3/1991 | Clark | |
| 5,143,484 A | 9/1992 | Deul | |
| D349,046 S | 7/1994 | Brown | |
| 5,377,976 A | 1/1995 | Matherne | |
| 5,380,269 A | 1/1995 | Urso | |
| 5,427,346 A | 6/1995 | Urgola | |
| 5,435,670 A | 7/1995 | Pienaar | |
| 5,589,243 A | 12/1996 | Day | |
| 5,624,622 A | 4/1997 | Boyce | |
| 5,746,547 A * | 5/1998 | Reinmann | E21D 15/04 299/11 |
| 5,834,082 A | 11/1998 | Day | |
| 5,895,025 A | 4/1999 | Alesi | |
| 5,979,844 A | 11/1999 | Hopkins | |
| 6,050,539 A | 4/2000 | Millen | |
| 6,079,910 A | 6/2000 | Marianski | |
| D429,005 S | 8/2000 | Risi | |
| 6,164,697 A * | 12/2000 | Riggs | B60S 9/02 248/188.9 |
| 6,250,849 B1 | 6/2001 | Marianski | |
| 6,250,850 B1 | 6/2001 | Price | |
| 6,352,392 B1 | 3/2002 | McCartney | |
| 6,354,569 B1 | 3/2002 | Gioia | |
| 7,040,659 B2 | 5/2006 | Lagsdin | |
| 7,073,821 B2 | 7/2006 | Lagsdin | |
| 7,172,216 B1 | 2/2007 | Lagsdin | |
| 7,398,664 B1 | 7/2008 | Weinerman | |
| 7,468,025 B2 | 12/2008 | Hauser | |
| 7,487,622 B2 | 2/2009 | Wang | |
| 7,520,010 B2 | 4/2009 | Welch | |
| 7,802,814 B2 | 9/2010 | Lagsdin | |
| 7,841,805 B2 | 11/2010 | Chugh | |
| 7,896,789 B2 | 3/2011 | Hinton | |
| 7,934,885 B2 | 5/2011 | Fournier | |
| 8,333,134 B1 | 12/2012 | Duffy | |
| 8,393,116 B2 | 3/2013 | Reeve | |
| D686,794 S | 7/2013 | Koberg | |
| D692,393 S | 10/2013 | Hillman | |
| 8,814,121 B2 * | 8/2014 | Koberg | B60S 9/02 248/910 |
| 9,254,821 B2 | 2/2016 | Koberg | |
| D760,069 S * | 6/2016 | Pierce | D8/374 |
| 9,447,547 B2 | 9/2016 | Penland, Jr. | |
| 9,550,657 B2 | 1/2017 | Koberg | |
| 9,617,693 B1 | 4/2017 | Penland, Jr. | |
| 9,670,639 B2 | 6/2017 | Reeve | |
| D804,768 S * | 12/2017 | Norton | E21D 15/02 D34/35 |
| 9,905,324 B2 | 2/2018 | Koo | |
| 10,392,234 B2 | 8/2019 | Bryan | |
| 10,773,933 B2 | 9/2020 | Bryan | |
| 10,961,017 B2 * | 3/2021 | Perkins, II | B65D 19/0012 |
| 11,015,316 B1 | 5/2021 | Norton | |
| D947,134 S | 3/2022 | Woods | |
| 11,280,079 B2 | 3/2022 | Brown, Jr. | |
| 11,292,702 B2 | 4/2022 | Bryan | |
| 11,479,939 B2 | 10/2022 | Koberg | |
| D975,199 S | 1/2023 | Huang | |
| D988,852 S | 6/2023 | Manfre | |
| 2003/0068204 A1 | 4/2003 | Paton-Ash | |
| 2005/0017223 A1 | 1/2005 | Lucas | |
| 2005/0040308 A1 | 2/2005 | Sweeney | |
| 2005/0074593 A1 | 4/2005 | Day | |
| 2005/0144866 A1 | 7/2005 | Chappell | |
| 2006/0002770 A1 | 1/2006 | Paton-Ash | |
| 2006/0185408 A1 | 8/2006 | Graham | |
| 2006/0260223 A1 * | 11/2006 | Wang | E04F 15/087 52/177 |
| 2009/0026427 A1 | 1/2009 | McCallum | |
| 2009/0072525 A1 * | 3/2009 | Banks | B66C 23/78 248/188.8 |
| 2009/0286043 A1 | 11/2009 | De Baets | |
| 2010/0221073 A1 * | 9/2010 | Chugh | E21D 15/02 405/288 |
| 2010/0266833 A1 | 10/2010 | Day | |
| 2012/0032056 A1 * | 2/2012 | Mora | B08B 9/08 248/351 |
| 2012/0251814 A1 | 10/2012 | Day | |
| 2013/0213920 A1 * | 8/2013 | Oliver | B60R 9/00 212/302 |
| 2014/0291475 A1 | 10/2014 | Hubbard | |
| 2014/0319315 A1 * | 10/2014 | Koberg | B66C 23/78 248/678 |
| 2014/0326359 A1 * | 11/2014 | Bennett | B65B 3/04 220/661 |
| 2016/0177515 A1 | 6/2016 | Penland, Jr. | |
| 2016/0177530 A1 * | 6/2016 | Reeve | B32B 5/024 248/634 |
| 2016/0325974 A1 * | 11/2016 | Wilson | B60S 9/04 |
| 2016/0355993 A1 | 12/2016 | Tubbs | |
| 2017/0089015 A1 | 3/2017 | Penland, Jr. | |
| 2017/0121973 A1 * | 5/2017 | Brandao | E04B 2/18 |
| 2019/0136532 A1 | 5/2019 | Brown, Jr. | |
| 2019/0382246 A1 | 12/2019 | Bryan | |
| 2020/0157747 A1 * | 5/2020 | Penland, Jr. | E01C 5/20 |
| 2021/0156105 A1 * | 5/2021 | Koberg | E02D 27/44 |
| 2022/0381391 A1 | 12/2022 | Koberg | |

FOREIGN PATENT DOCUMENTS

| | | |
|---|---|---|
| CN | 202140760 | 2/2012 |
| CN | 202698012 U | 1/2013 |
| EP | 3233465 A1 | 10/2017 |
| GB | 2261003 A | 5/1993 |
| GB | 2306527 A | 5/1997 |
| GB | 2335678 A | 9/1999 |
| GB | 2353052 A | 2/2001 |

OTHER PUBLICATIONS

AME Intl.—Super Stacker Cribbing Blocks May 17, 2018.

(56) References Cited

OTHER PUBLICATIONS

Redwood Plastics—Redco Dura Crib and Dura Stat Nov. 17, 2015.
Plastics—Cura Crib Products Jan. 1, 2019.
Outrigger Pads—Ecocrib Cribbing Block Apr. 1, 2019.
Strata Worldwide—Link-N-Lock system Jan. 1, 2018.
Strike Products—Hoss Plate [retrieved on Apr. 9, 2024. Retrieved from the Internet. <URL: https://www.striketool.com/outrigger-pad---hoss-plate.html>.
Prime Tech Inc. [Online]—Outrigger Pads [retrieved on Apr. 9, 2024]. Retrieved from the Internet. <URL: https://www.primetechpads.com/outrigger-pads>.
Lifton's Inc. [Online]—Outrigger Pads [retrieved on Apr. 9, 2024]. Retrieved from the Internet. <URL: https://liftonsinc.com/?gclid=EAIaIQobChMIw7fQgrXOgwMVGkl_AB34qAW2EAAYAiAAEgJiOvD_BwE>.
Nylacast [Online]—Bigfoot Outrigger Pads [retrieved on Apr. 9, 2024]. Retrieved from the Internet. <URL: https://www.nylacast.com/our-brands/bigfoot-outrigger-pads>.
Outdoors for Life [Online]—Outrigger & Crane Pads [retrieved on Apr. 9, 2024]. Retrieved from the Internet. <URL: https://oflpads.com/products/>.

* cited by examiner

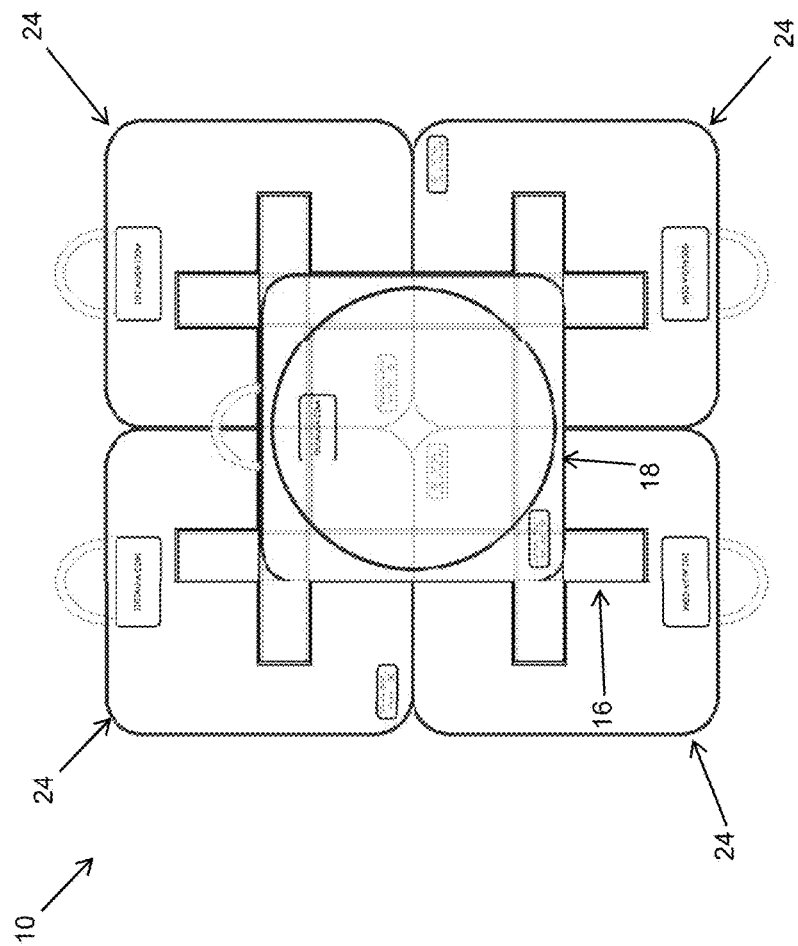
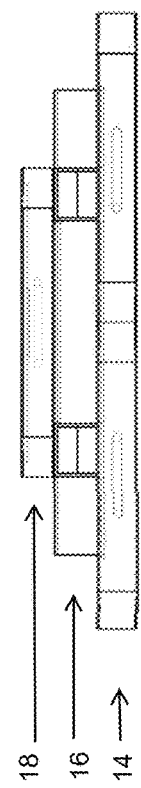
FIG. 10A
FIG. 10B

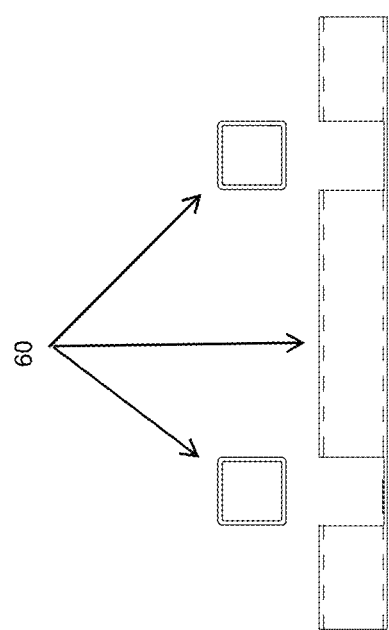

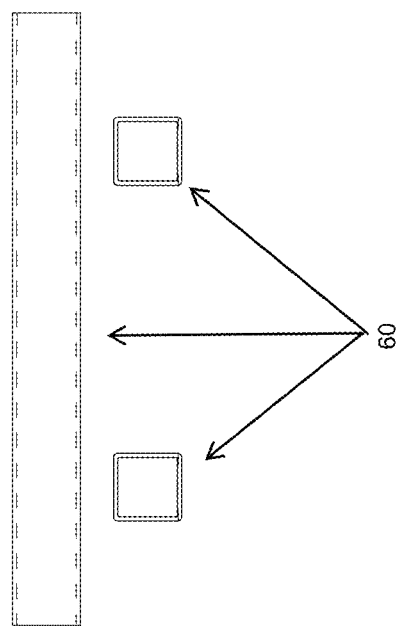

Step 1

Step 4

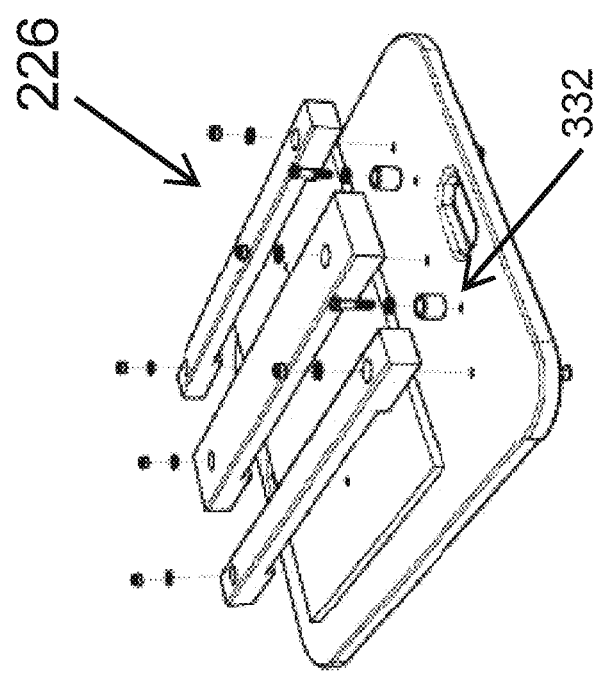

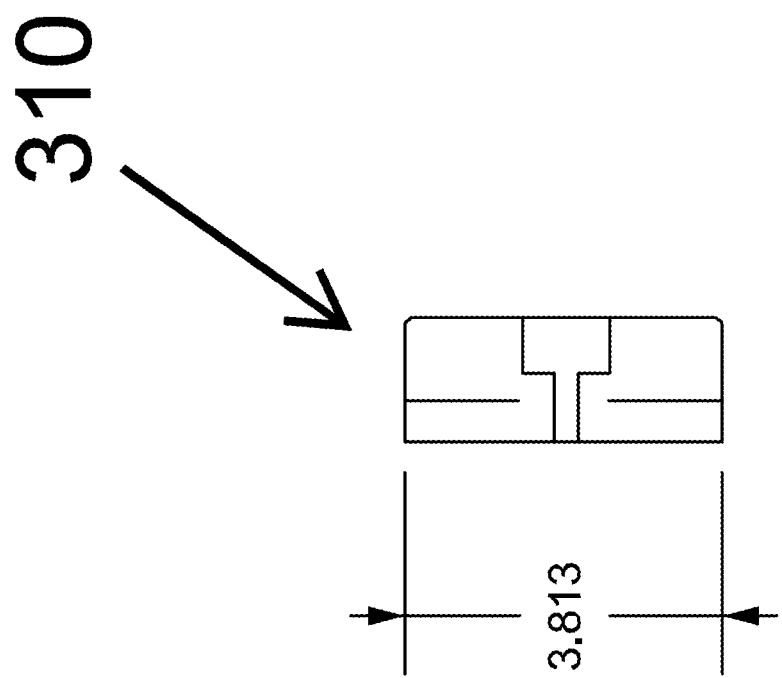

INTERLOCKING OUTRIGGER PAD SUPPORT SYSTEM

CROSS-REFERENCE TO RELATED APPLICATIONS

The present application is a continuation-in-part of U.S. application Ser. No. 17/825,636, filed on May 26, 2022, which claims priority to U.S. Provisional Application 63/193,624, titled INTERLOCKING OUTRIGGER PAD SUPPORT SYSTEM and filed on May 27, 2021, both of which are hereby incorporated by reference herein in their entireties, including any figures, tables, drawings, or other information.

The present application also claims priority to U.S. Provisional Application 63/492,136, titled OUTRIGGER PAD SUPPORT SYSTEM and filed on Mar. 24, 2023, which is hereby incorporated by reference herein in its entirety including any figures, tables, drawings, or other information.

FIELD OF THE DISCLOSURE

This disclosure relates to pads for supporting outrigger arms of cranes, trucks, and other vehicles and equipment. More specifically and without limitation, this disclosure relates to a pad support system formed of a plurality of interlocking components.

OVERVIEW OF THE DISCLOSURE

Outriggers are old and well known in the art and are frequently used to provide additional stability and support to cranes, boom trucks, aerial work platforms, concrete pump trucks and the like. There are countless types, forms and designs of outriggers known in the art. Generally speaking, these outriggers extend outward from the body of the vehicle or equipment and engage the ground thereby giving a greater base of stability which increases safety and allows the vehicle or equipment to move heavier loads or increase its reach with greater security and safety.

Pads, mats, blocking or cribbing are sometimes used to provide a foundation for outriggers, stabilizers, jacks or similar devices and the outriggers may rest on the pad, mat, blocking or cribbing. Since the outriggers are typically used to provide a greater base of stability which allows the equipment to move heavier loads and increase its reach, the pads must be able to withstand a great deal of force and do this without moving or slipping, thereby jeopardizing the stability of the outrigger and the safety of the operator and other individuals and property in the area surrounding the outrigger. Pads, mats, blocking and cribbing must be able to effectively distribute the exerted load and pressures from the outriggers to the supporting ground under the pads, mats, blocking and cribbing. Distribution of load can be measured by the reduction of pressure being exerted onto the ground and the utilization of the pads, mats, cribbing or blocking. Many devices and assemblies currently used as pads, mats, cribbing and blocking do not effectively distribute load over a large area. The result is a decrease in safety, and increased potential to damage the ground and even ground failure causing equipment to overturn. While some large pads, mats, blocking and cribbing may distribute the load over a wide area, such large devices are not practical to transport, store, deploy, remove or adjust.

Pads, mats, blocking and cribbing must be able to protect the supporting surface from damage that can be caused by outriggers. Pressures exerted by outriggers can exceed the capacity of the supporting surface thereby causing the supporting surface to shear, crack, crumble or fail. Most outriggers are constructed from iron, steel, aluminum, or other metallic materials. Both metallic and non-metallic materials can scar, imbed, scratch, crack or otherwise damage supporting surfaces. Pads, mats, cribbing & blocking in combination with other material when needed should help prevent damage to supporting surfaces that outriggers can cause.

Further complicating protection of the supporting surface is the fact that outrigger feet from equipment can be small. This, combined with the potential outrigger loads, can create a high pressure or point loaded moment. The highly concentrated point load makes it difficult for traditional pads, mats, and cribbing to effectively distribute the pressure over the required area to ensure the pressure exerted onto the ground does not exceed the ground's ability to support the pressure. Additionally, the high concentration of pressure can cause traditional materials such as wood to fail abruptly from compression and sheer.

A number of different materials have been used to create these pads, mats, blocking and cribbing. One such material is wood. While wood is cheap and reasonably lightweight, making it easy to move, wood is relatively weak and cannot withstand some of the loads under which it may be placed when in use. Additionally, wood is less durable and more susceptible to wear and tear, which means wooden pads would need to be replaced frequently. In addition, pads formed of wood are susceptible to breaking, which can have catastrophic effects.

Another type of material used to make pads or mats is composite materials. Composite materials are lightweight, thereby making them easy to move and transport. Composite materials can be designed to various levels of strength; however, some are not as strong as certain other materials and may not be able to support some of the heaviest loads they may be placed under when in use. Additionally, some composite materials are less rigid and more susceptible to displacement from bending when placed under large loads, which reduces the stability of the outrigger and the safety of the operator and other individuals and property in the area.

Another material which has been used to make pads or mats is metallic materials. Certain metallic materials, such as iron or steel, are very strong and may be able to withstand heavy loads that may be placed on the pads when in use. Strong metallic materials, like iron or steel are rigid and less likely to experience displacement when placed under such heavy loads. However, metallic materials such as iron or steel are extremely heavy, thereby making them difficult to produce, difficult to move and use in the field, and more difficult and expensive to transport.

Therefore, for all the reasons stated above, and the reasons stated below, there is a need in the art for an improved outrigger pad support system which has the necessary strength, rigidity, and durability to distribute loads over a larger area, while also remaining easy to transport and store.

Thus, it is a primary object of the disclosure to provide an outrigger pad support system that improves upon the state of the art.

Another object of the disclosure is to provide an outrigger pad support system that is formed of interlocking components.

Yet another object of the disclosure is to provide an outrigger pad support system that is convenient to transport.

Another object of the disclosure is to provide an outrigger pad support system that is convenient to transport and store.

Yet another object of the disclosure is to provide an outrigger pad support system that may be deployed by hand (without the use of a crane).

Yet another object of the disclosure is to provide an outrigger pad support system that may be assembled out of a plurality of components thereby forming a system that has a greater overall carrying capacity than the carrying capacity of each component of the system.

Another object of the disclosure is to provide an outrigger pad support system that can effectively distribute load over a larger area.

Yet another object of the disclosure is to provide an outrigger pad support system that is rigid.

Another object of the disclosure is to provide an outrigger pad support system that minimizes displacement under heavy loads.

Yet another object of the disclosure is to provide an outrigger pad support system that is relatively easy to manufacture.

Another object of the disclosure is to provide an outrigger pad support system that is easy to use.

Yet another object of the disclosure is to provide an outrigger pad support system that is relatively lightweight.

Another object of the disclosure is to provide an outrigger pad support system that is easy to move.

Yet another object of the disclosure is to provide an outrigger pad support system that has a robust design.

Another object of the disclosure is to provide an outrigger pad support system that is durable.

Yet another object of the disclosure is to provide an outrigger pad support system that has a long useful life.

Another object of the disclosure is to provide an outrigger pad support system that is not easily susceptible to wear and tear.

Yet another object of the disclosure is to provide an outrigger pad support system that is high quality.

Another object of the disclosure is to provide an outrigger pad support system that is relatively inexpensive.

Yet another object of the disclosure is to provide an outrigger pad support system that increases safety for the operator and other individuals and property in the area.

Another object of the disclosure is to provide an outrigger pad support system that is easy to transport.

Another object of the disclosure is to provide an outrigger pad support system that effectively distributes loads and pressures from outriggers to levels the supporting surface can withstand, or levels deemed acceptable by site owners.

Another object of the disclosure is to provide an outrigger pad support system that protects supporting surfaces from damage caused by outriggers.

Another object of the disclosure is to provide an outrigger pad support system that has the strength to withstand heavy loads.

These and other objects, features, or advantages of the disclosure will become apparent from the specification, figures, and claims.

SUMMARY OF THE DISCLOSURE

In one or more arrangements, an interconnected outrigger pad support system is provided. The system includes a base pad assembly layer, a support layer, and an upper pad. In one or more arrangements, the base pad assembly layer is formed of a plurality of base pads. In one or more arrangements, each of the plurality of base pads has an upper surface and a lower surface. In one or more arrangements, the base pads of the base pad assembly layer have alignment features that extend across at least a portion of the upper surfaces of the plurality of base pads. Wherein when the middle support layer is placed on top of the base pad assembly layer, the middle support layer engages and is held in place by the alignment features of the base pads of the base pad assembly layer. In one or more arrangements, the upper pad has an upper surface and a lower surface. The lower surface of the upper pad also has an alignment feature. When the upper pad is placed on top of the support layer, the alignment feature of the upper pad engages and is held in place by the support layer.

BRIEF DESCRIPTION OF THE FIGURES

FIG. 10A is an elevation view of an interlocking outrigger pad support system, in accordance with one or more arrangements; the view, the view showing a base pad assembly layer formed of a plurality of base pads, a support layer formed of a plurality of interconnected support members, and an upper pad.

FIG. 10B is a plan view of an interlocking outrigger pad support system, in accordance with one or more arrangements; the view, the view showing a base pad assembly layer, a support layer resting on top of the base pad assembly layer, and an upper pad resting on top of the support layer.

FIG. 11B is an exploded plan view of a support layer for an interlocking outrigger pad support system, in accordance with one or more arrangements; the view showing a support member having notches extending in perpendicular alignment with two other support members.

FIG. 11C is an exploded plan view of a support layer for an interlocking outrigger pad support system, in accordance with one or more arrangements; the view showing a support member extending in a perpendicular manner to two other support members.

FIG. 42E is an exploded view of an upper pad assembly for an interlocking outrigger pad support system, in accordance with one or more arrangements; the view showing an upper pad, the upper pad having mating features, and an intermediate plate, both exploded from alignment features of the upper pad assembly.

FIG. 44F is a partial plan view of an alignment feature of the upper pad assembly for an interlocking outrigger pad support system, in accordance with one or more arrangements.

DETAILED DESCRIPTION OF THE DISCLOSURE

Figure 1:
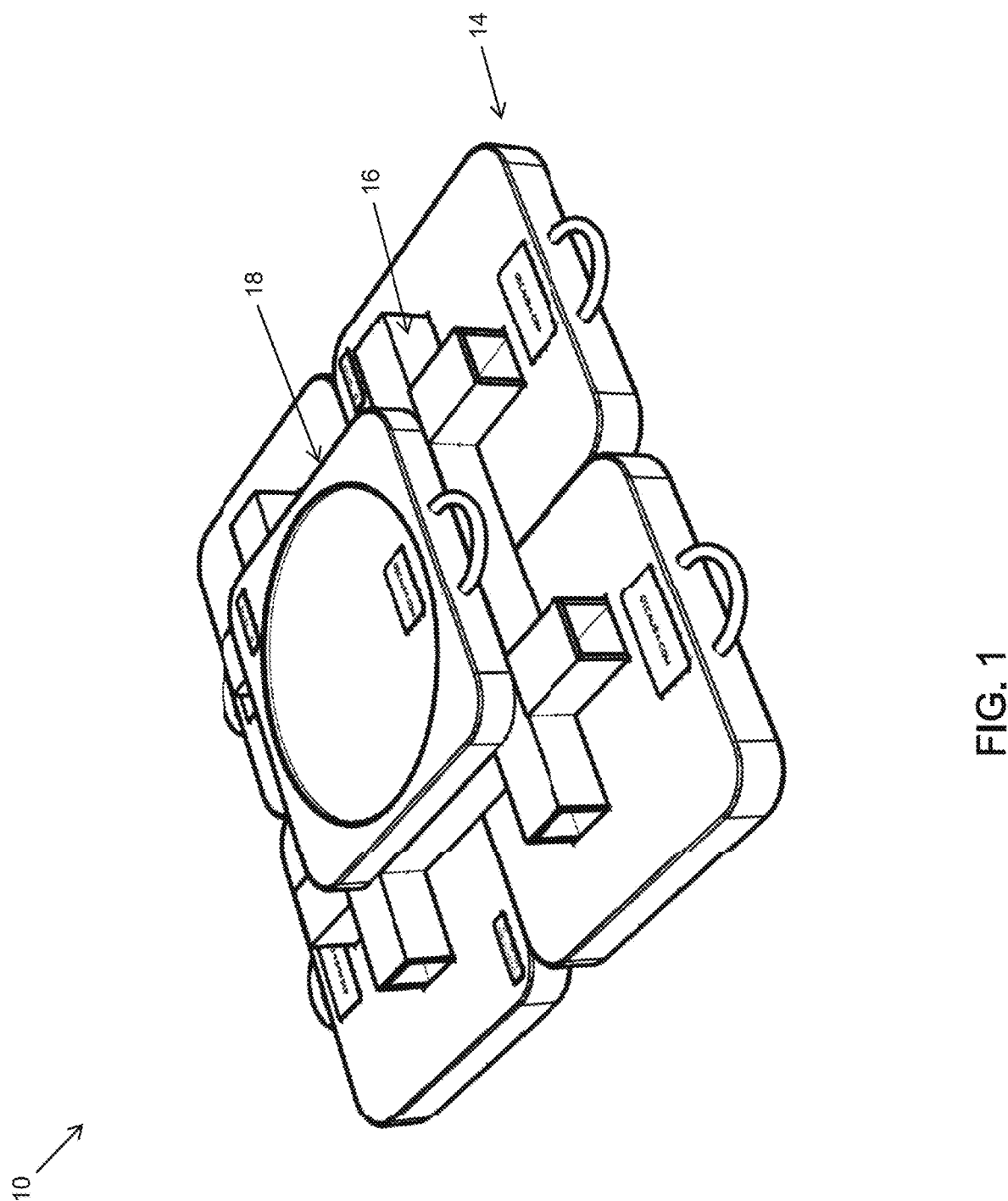
FIG. 1 is a perspective view of an interlocking outrigger pad support system, in accordance with one or more arrangements; the view showing a base pad assembly layer formed of a plurality of base pads, a support layer formed of interconnected support members in engagement with the base pads, and an upper pad in engagement with the support members.
Figure 2:
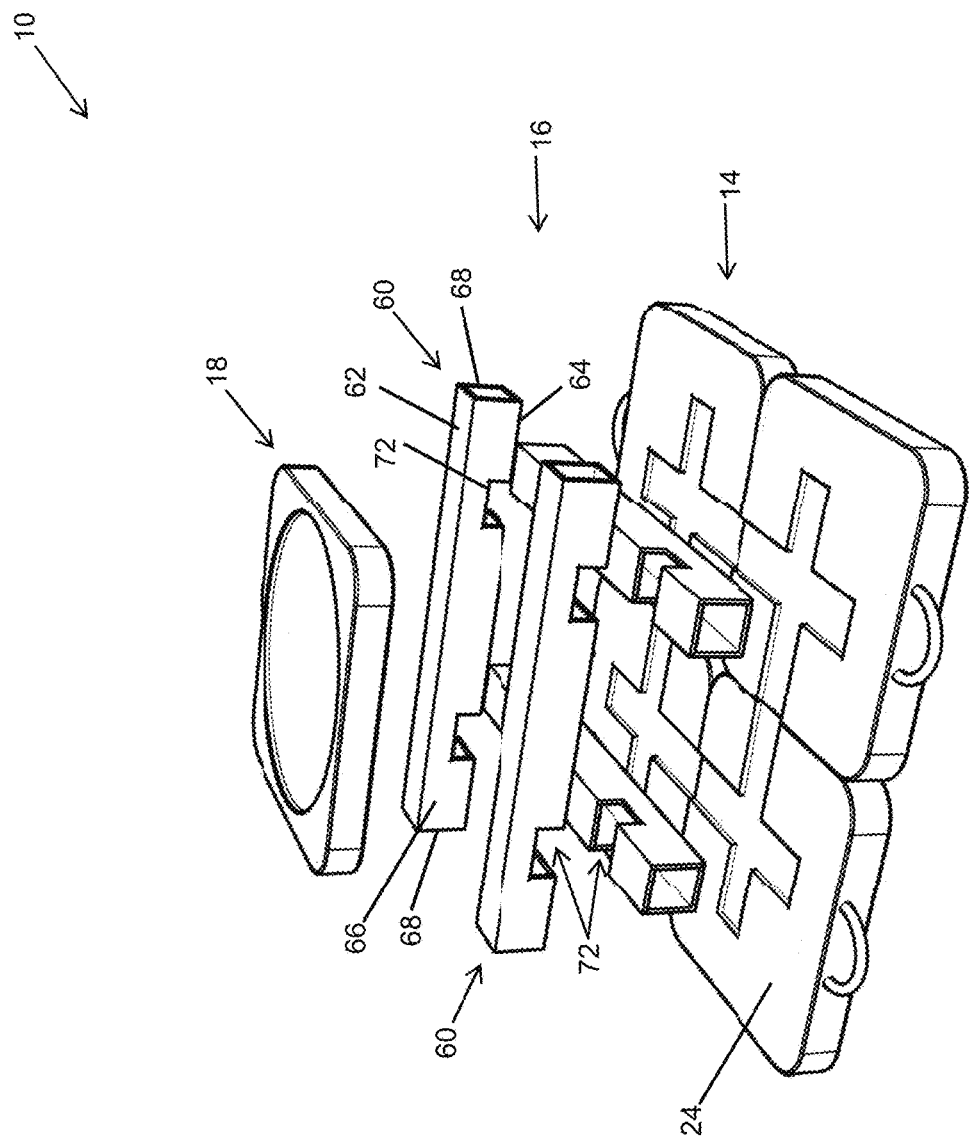
FIG. 2 is an exploded view of an interlocking outrigger pad support system, in accordance with one or more arrangements; the view showing a base pad assembly layer formed of a plurality of base pads with alignment features comprised of recesses therein; a support layer formed of a plurality of support members exploded from each other, with two support members having upward facing notches configured to interconnect with downward facing notches on the remaining support members; and an upper pad.
Figure 3:
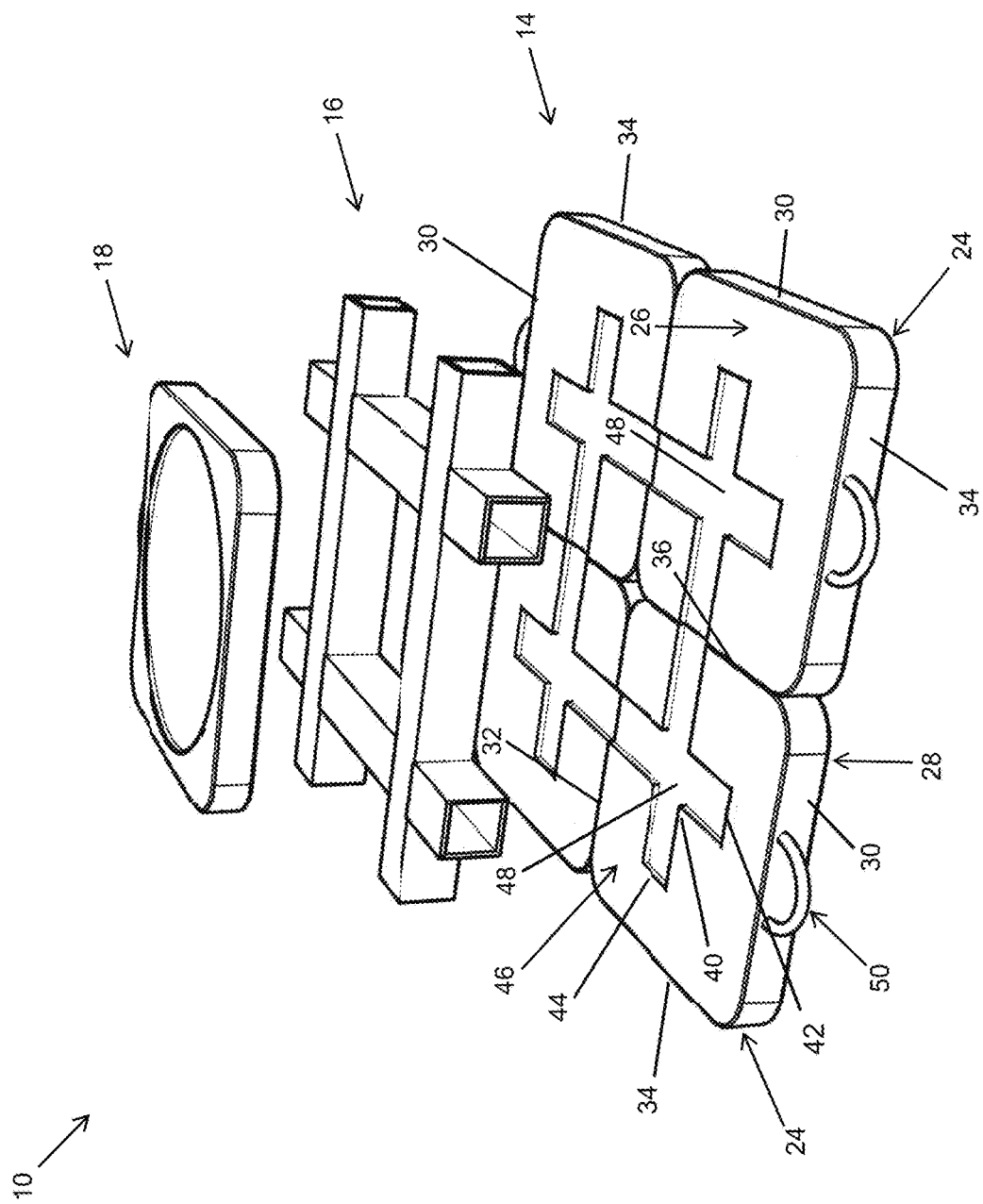
FIG. 3 is an exploded view of an interlocking outrigger pad support system, in accordance with one or more arrangements; the view showing a base pad assembly layer formed of a plurality of base pads with alignment features comprised of recesses therein; a support layer formed of a plurality of interconnected support members; and an upper pad.
Figure 4:
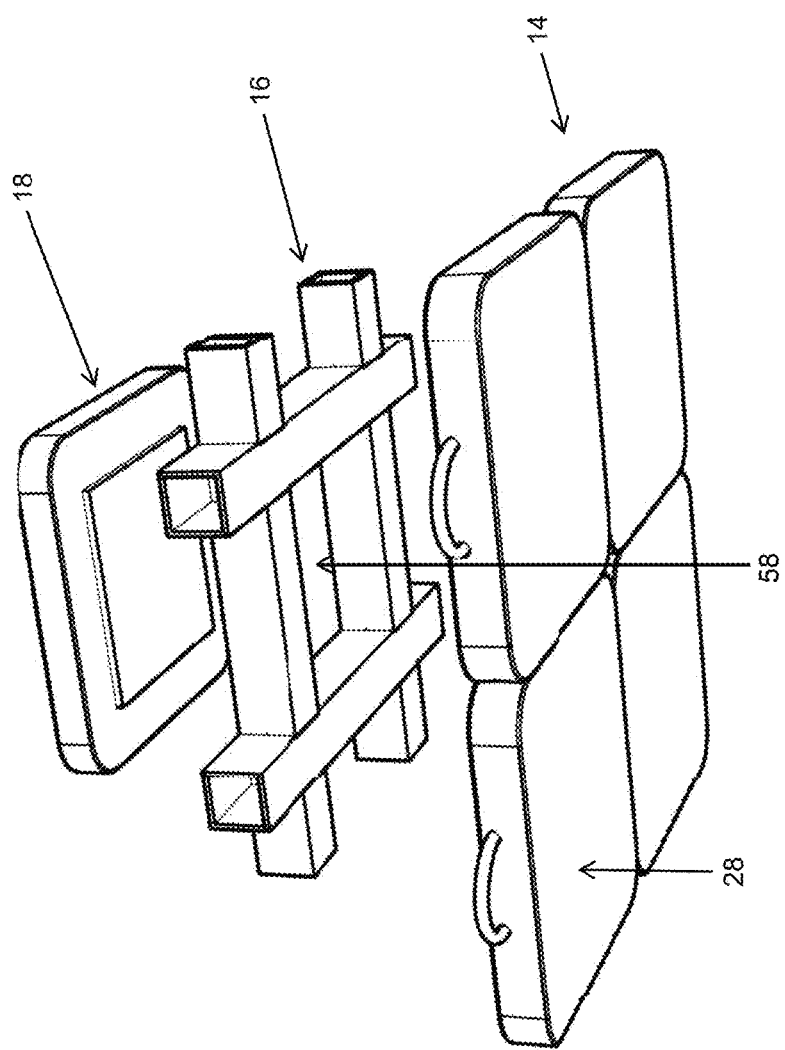
FIG. 4 is an exploded view of an interlocking outrigger pad support system, in accordance with one or more arrangements; the view showing a base pad assembly layer formed of a plurality of base pads; a support layer formed of a plurality of interconnected support members; and an upper pad.
Figure 5:
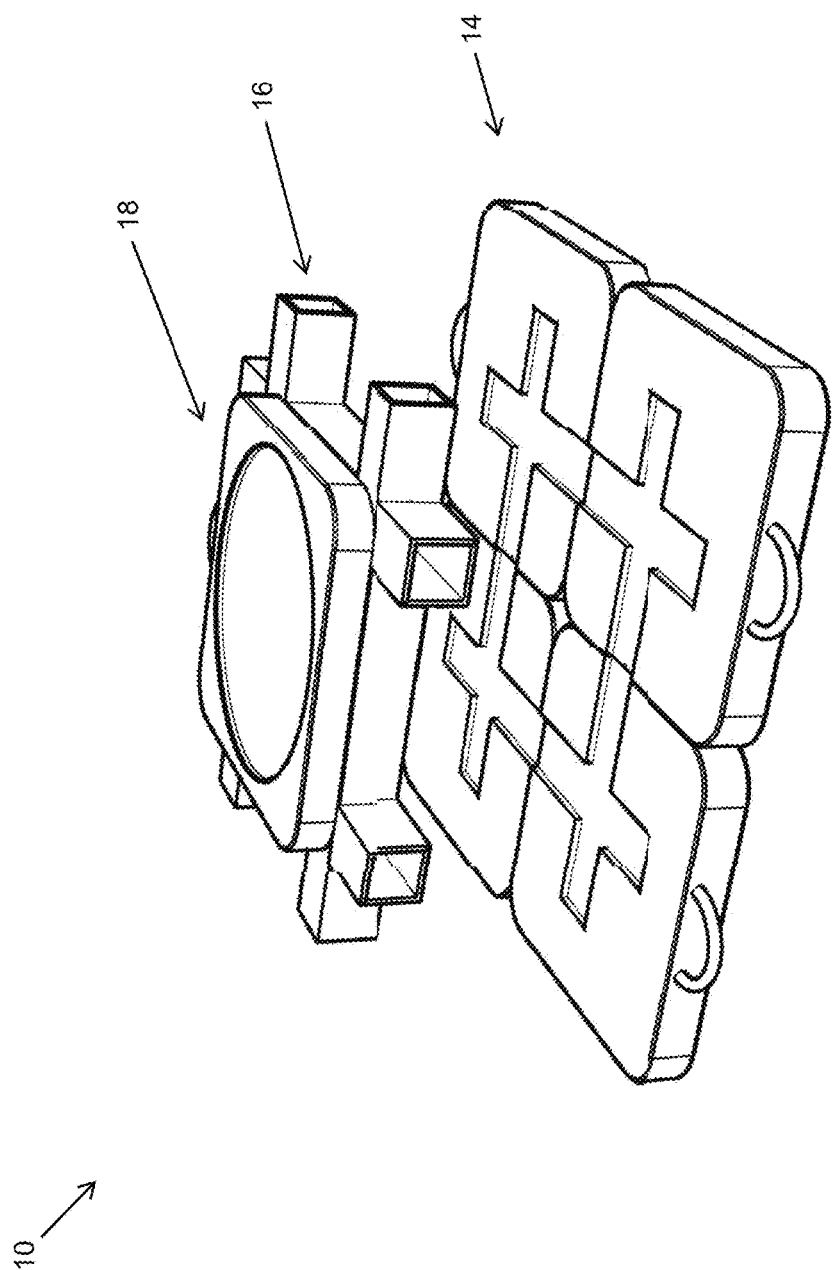
FIG. 5 is an exploded view of an interlocking outrigger pad support system, in accordance with one or more arrangements; the view showing a base pad assembly layer formed of a plurality of base pads with alignment features comprised of recesses therein, and a support layer formed of a plurality of interconnected support members with an upper pad in engagement with the support members.
Figure 6:
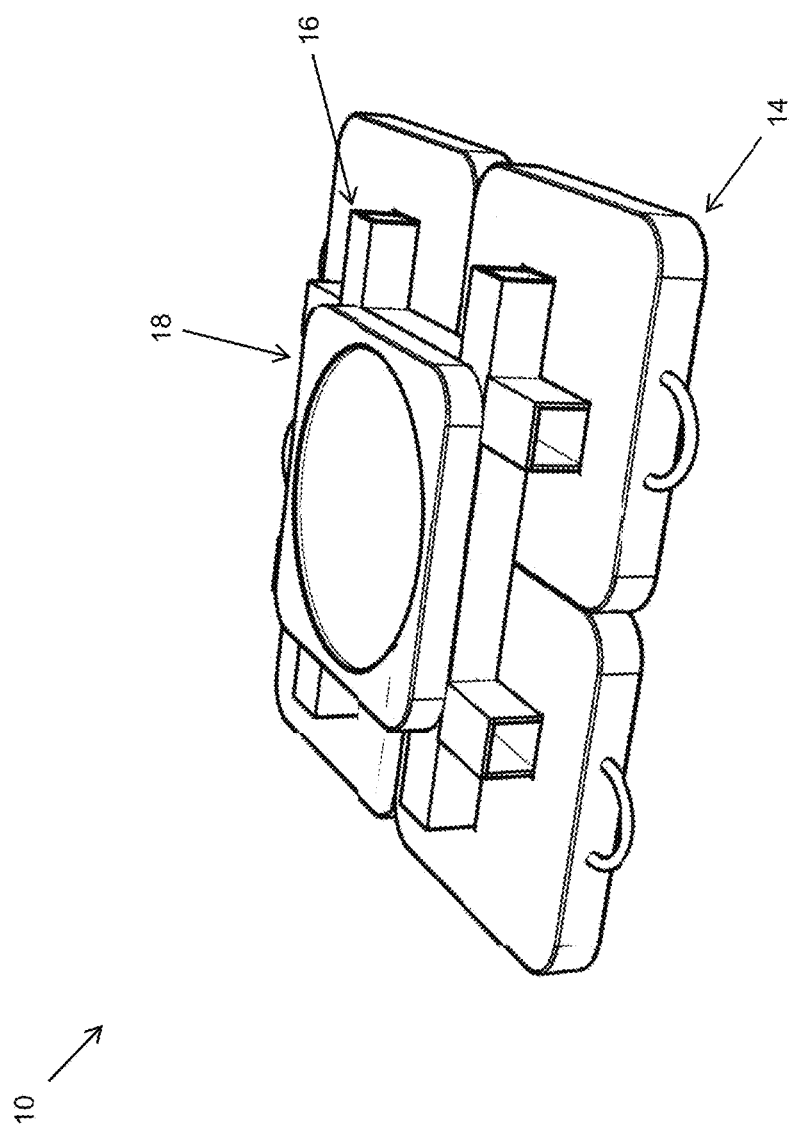
FIG. 6 is perspective view of an interlocking outrigger pad support system, in accordance with one or more arrangements; the view showing a base pad assembly layer formed of a plurality of base pads, with a support layer formed of interconnected support members in engagement with the base pads, and an upper pad in engagement with the support members.
Figure 7:
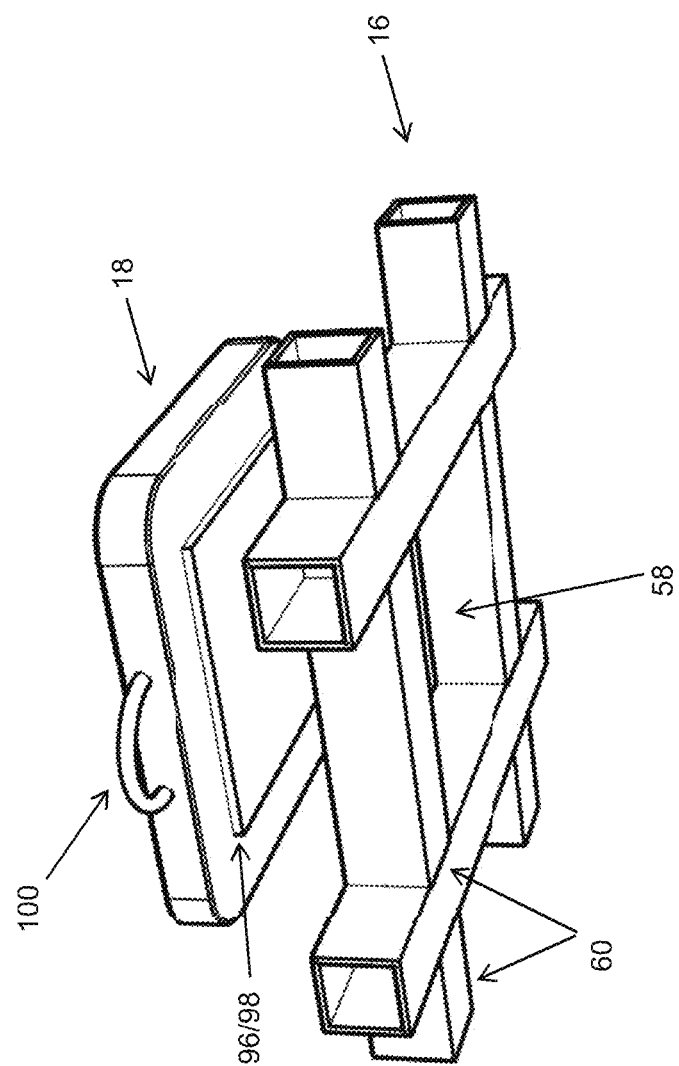
FIG. 7 is an exploded view showing a support layer made of interconnected support members and an upper pad with a protrusion forming an alignment feature on the bottom of the upper pad, in accordance with one or more arrangements.
Figure 8:
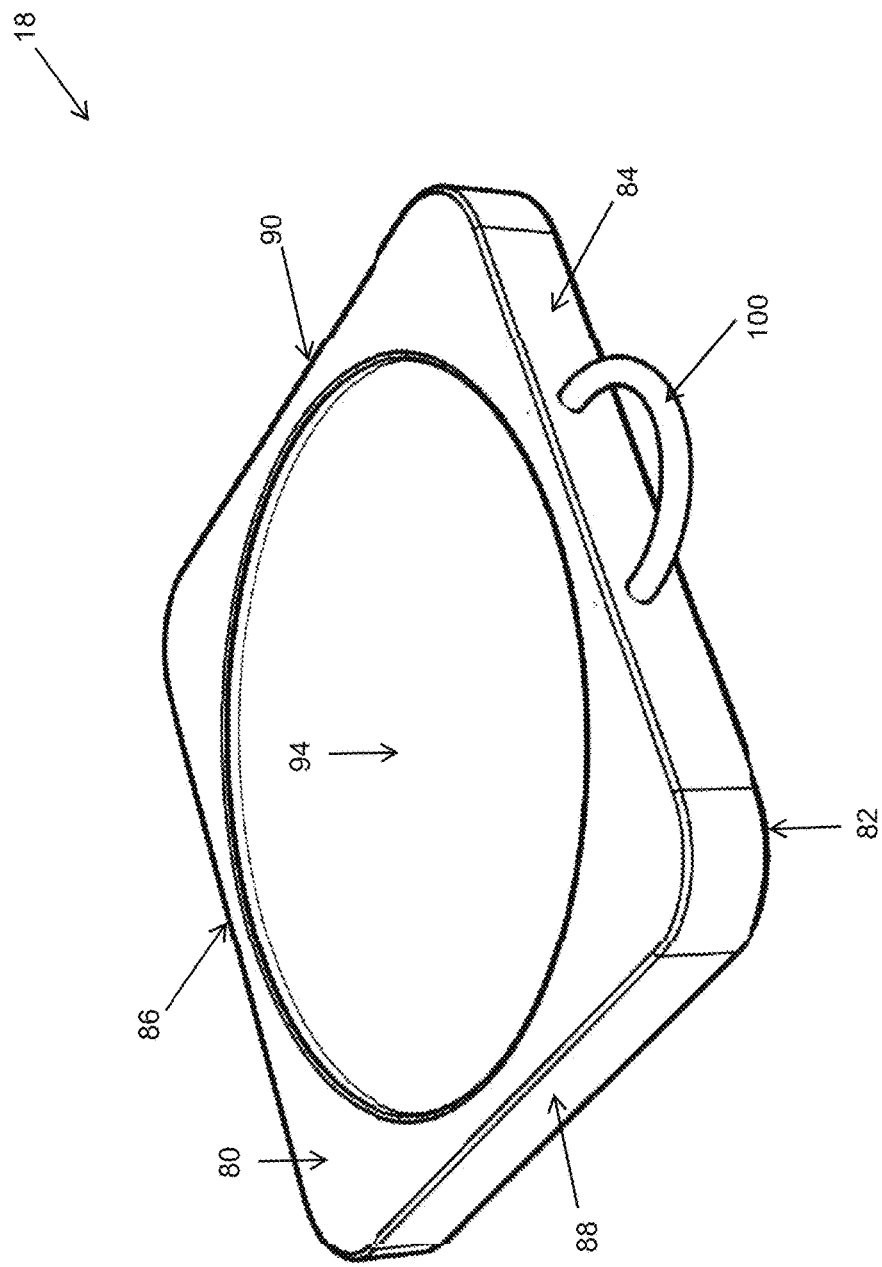
FIG. 8 is a perspective view of an upper pad for an interlocking outrigger pad support system, in accordance with one or more arrangements; the view showing the upper pad having an upper surface, a lower surface, a front edge, a back edge, a right edge, a left edge, a recess configured to receive and hold outriggers or feet of machinery, and a handle.
Figure 9A:
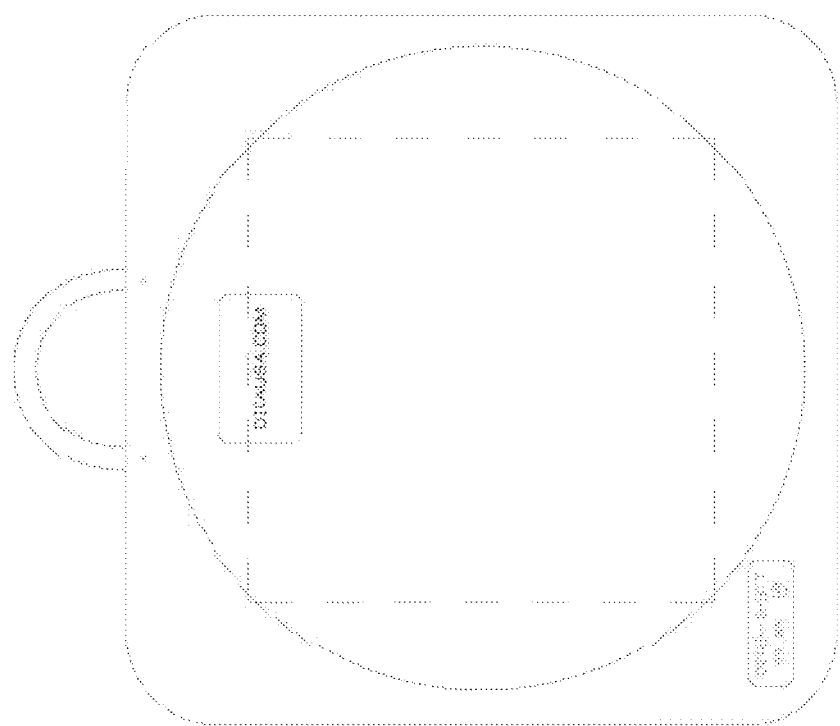
FIG. 9A is an elevation view of an upper pad for an interlocking outrigger pad support system, in accordance with one or more arrangements; the view showing the upper surface of the upper pad.
Figure 9B:
FIG. 9B is a plan view of an upper pad for an interlocking outrigger pad support system, in accordance with one or more arrangements; the view showing an edge of the upper pad.
Figure 11A:
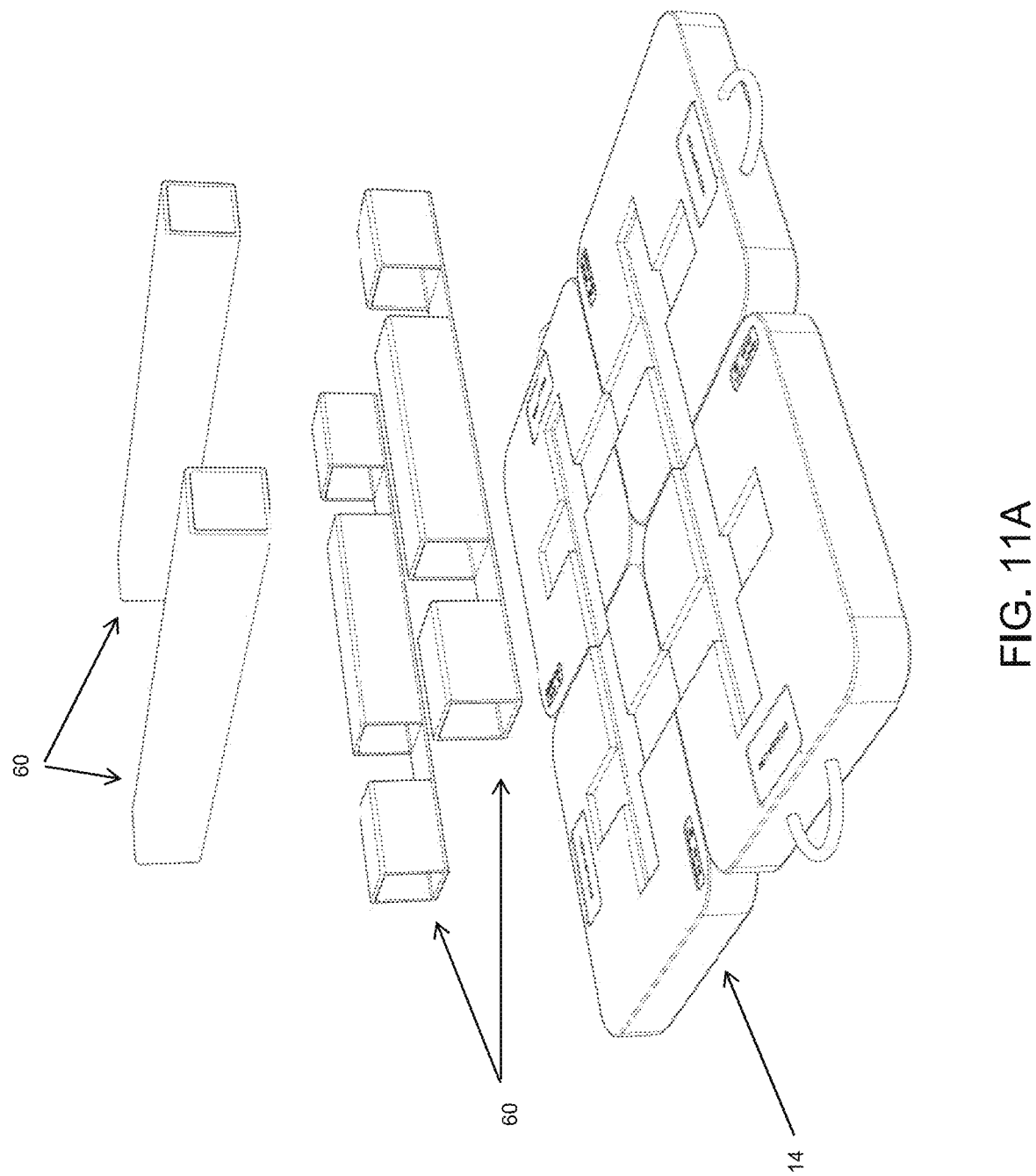
FIG. 11A is an exploded view of an interlocking outrigger pad support system, in accordance with one or more arrangements; the view, the view showing a base pad assembly layer formed of a plurality of base pads, the plurality of base pads having varying depths of recesses on the top surface of the plurality of base pads; the view also showing a support layer formed of a plurality of support members, with two of the support members having notches and two of the support members having no notches.
Figure 12A:
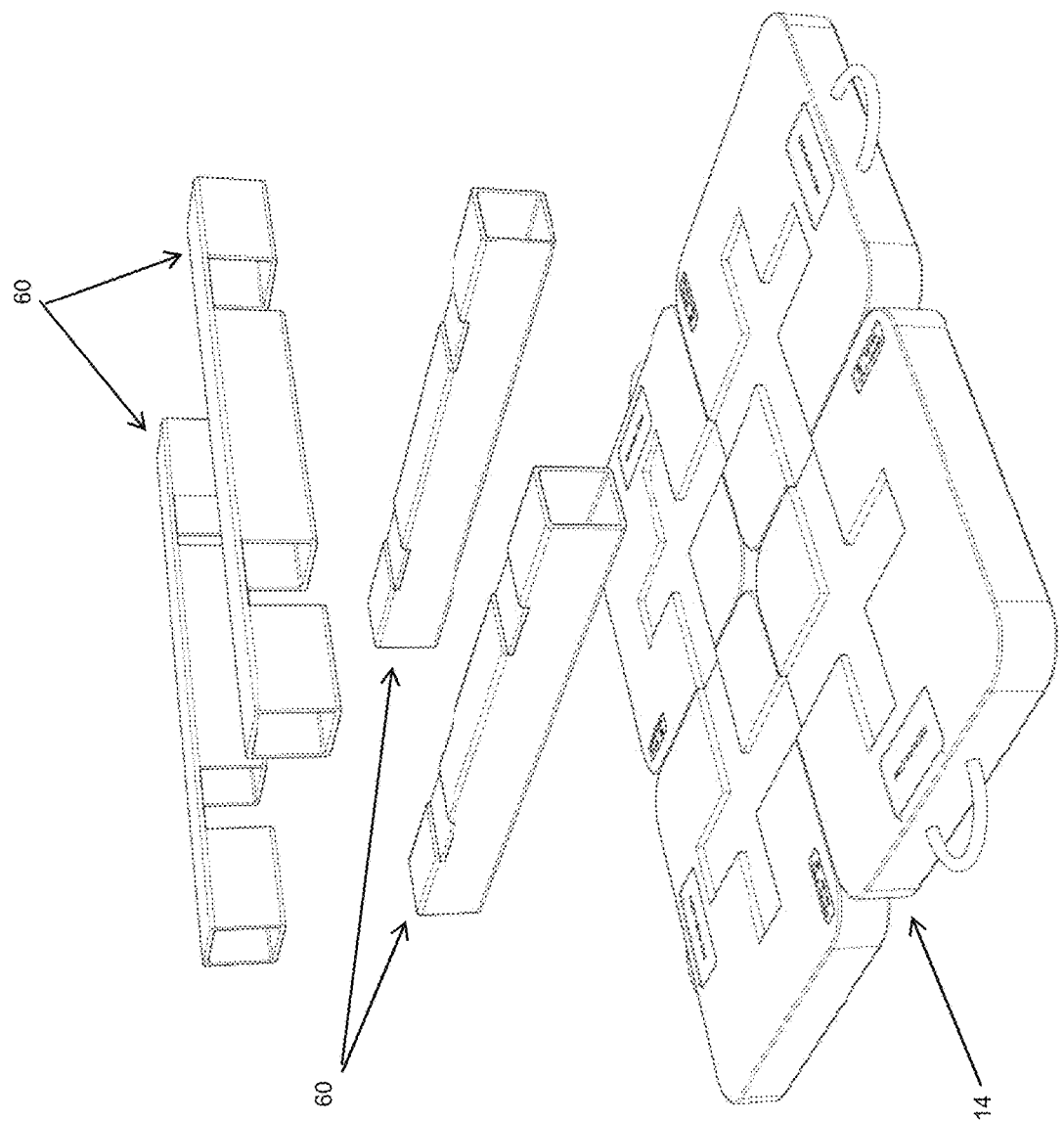
FIG. 12A is an exploded view of an interlocking outrigger pad support system, in accordance with one or more arrangements; the view, the view showing a base pad assembly layer formed of a plurality of base pads; the view also showing two support members having deep notches and two support members having shallow notches configured to interlock with the deep notches on the other two support members.
Figure 12B:
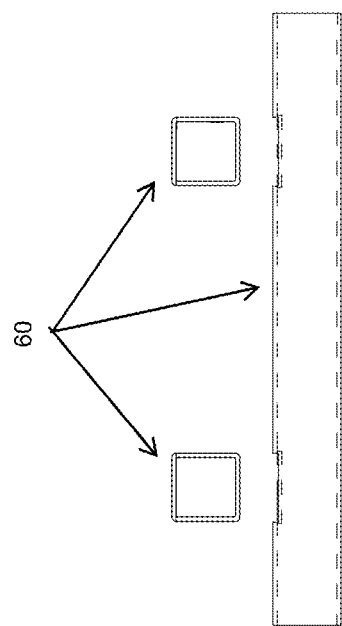
FIG. 12B is an exploded plan view of a support layer for an interlocking outrigger pad support system, in accordance with one or more arrangements; the view showing a support member having shallow notches extending in perpendicular alignment with two other support members.
Figure 12C:
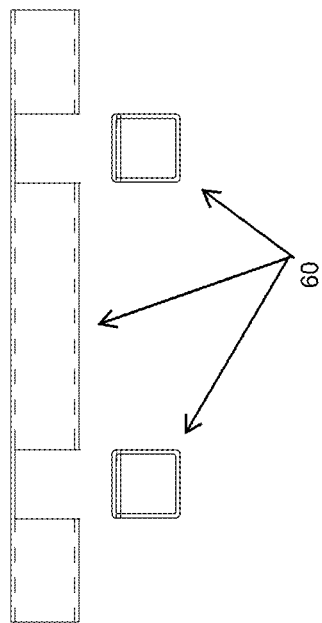
FIG. 12C is an exploded plan view of a support layer for an interlocking outrigger pad support system, in accordance with one or more arrangements; the view showing a support member having deep notches extending in perpendicular alignment with two other support members.
Figure 13:
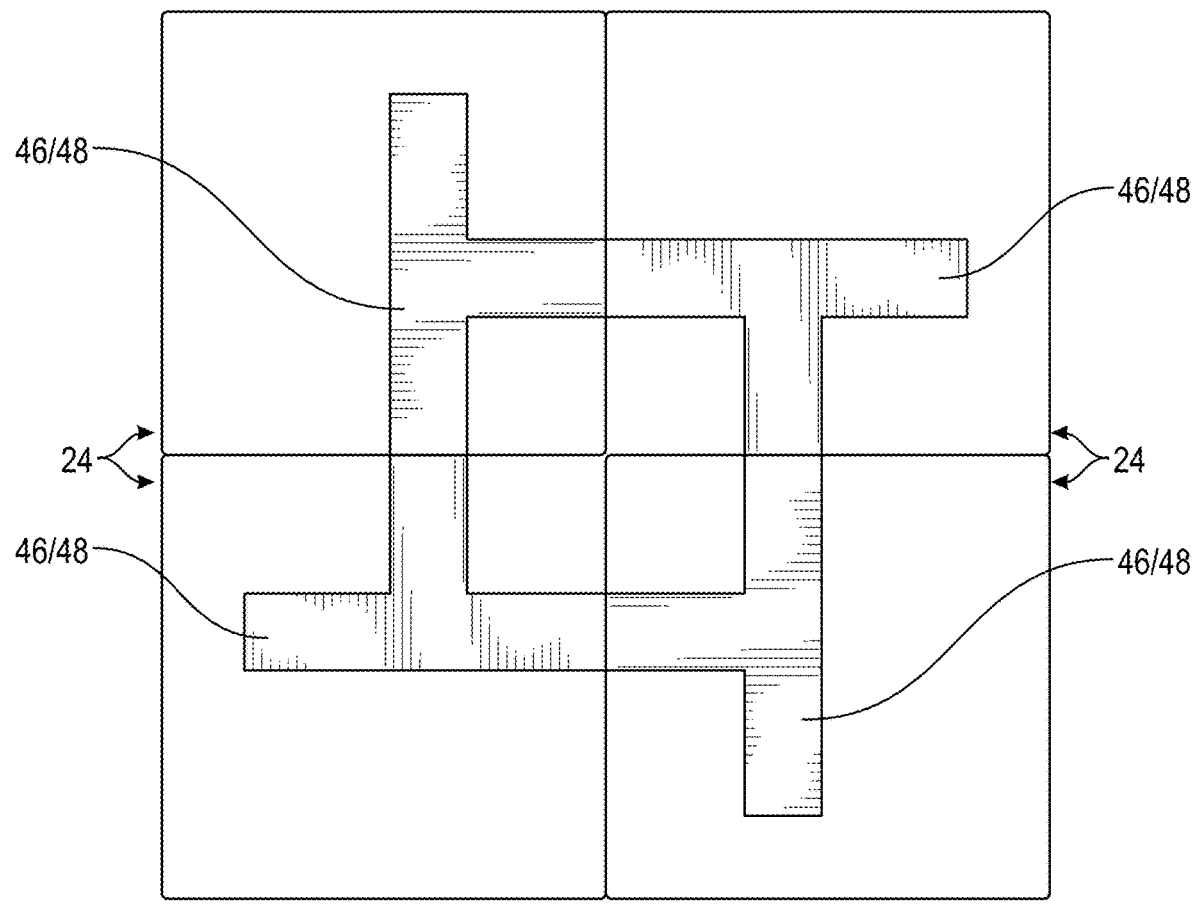
FIG. 13 is a top view of a base pad assembly layer formed of a plurality of base pads, in accordance with one or more arrangements, the view showing the base pads having an alternative configuration of alignment features made up of recesses which do not overlap.

In the following detailed description of the embodiments, reference is made to the accompanying drawings which form a part hereof, and in which is shown by way of illustration specific embodiments in which the invention may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures.

For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously introduced and not, while definite articles like "the" refer to a same previously introduced term; as such, it is understood that "a" or "an" modify items that are permitted to be previously introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected, or connected by any other manner, method, or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

Various disclosed embodiments may be primarily described in the context of pad supports for outriggers. However, the embodiments are not so limited. It is appreciated that the embodiments may be adapted for use in other applications, which may be improved by the disclosed structures, arrangements and/or methods. The system is merely shown and described as being used in the context of pad supports for outriggers for ease of description and as one of countless examples.

Interlocking Outrigger Pad Support System 10

With reference to the figures, an interlocking outrigger pad support system 10 (or simply "system 10") is presented. System 10 is formed of any suitable size, shape, and design and is configured to provide support for outriggers or feet of machinery. In the arrangement shown, as one example, system 10 includes a base pad assembly layer 14, a support layer 16, and an upper pad 18, among other components.

Base Pad Assembly Layer 14:

Base pad assembly layer 14 is formed of any suitable size, shape, and design and is configured to provide a plurality of base pads 24 for support of support layer 16.

In the arrangement shown, as one example, base pad assembly layer 14 includes four base pads 24 configured to be placed next to one another to form a larger base support area to facilitate support of outriggers or feet of machinery by system 10.

Base Pads 24: Base pads 24 are formed of any suitable size, shape, and design and are configured to distribute weight of support layer 16 over their respective areas (in order to increase the surface area of engagement and to increase the surface area of weight distribution). In the arrangement shown, as one example, base pads 24 have a generally square or rectangular planer shape having an upper surface 26 and a lower surface 28 that are generally flat extending between a front edge 30, a back edge 32, a right edge 34, and a left edge 36.

In the arrangement shown, as one example, when base pads 24 are generally square or rectangular in shape, when base pads 24 are assembled in edge-to-edge alignment to form base pad assembly layer 14, the combined and assembled base pad assembly layer 14 is itself generally square or rectangular in shape. However, any other size, shape and design is hereby contemplated. As an example, each base pad 24 may have a rounded or curved outward facing edge such that the combined and assembled base pad assembly layer 14 takes on a generally round or oval shape. Alternatively, each of the base pads 24 may be formed like a like a triangular member or a slice of a circular member (e.g. pie shaped) to form an overall round or oval shape. Alternatively, the outward edge of each base pad 24 may have angles to it such that the combined and assembled base pad assembly layer 14 takes on a generally triangular, quadrilateral, pentagonal, hexagonal, heptagonal, octagonal, nonagonal, decagonal, or any other polygonal shape. Notably, base pad assembly layer 14 may take the form of a symmetric shape and/or an equilateral polygonal shape, or alternatively base pad assembly layer 14 may take on an irregular and/or non-symmetric shape. Any other shape, design or configuration is hereby contemplated for use.

Notably, while the drawings show each of the base pads 24 of base pad assembly layer 14 having edges that form a portion of the exterior peripheral edge of base pad assembly layer 14, it is hereby contemplated that base pad assembly layer 14 may be formed of a greater number of base pads 24, particularly for larger applications, and in these applications, there may be base pads 24 that are interior-only and do not have an edge that forms a part of the exterior peripheral edge of base pad assembly layer 14.

In this example arrangement, base pads 24 have alignment features 46 on upper surface 26. Alignment features 46 are formed of any suitable size, shape, or design, and are configured to facilitate alignment and interconnection of support layer 16 with base pad assembly layer 14. In the arrangement shown, as one example, alignment features 46 are recesses 48, which extend downward into upper surface 26 of the base pads 24 a distance. However, in an alternative arrangement, alignment features 46 may be protrusions, a combination of protrusions and/or recesses, and/or any other feature.

In this example arrangement shown, alignment features 46 are generally square or rectangular recesses 48 that extend a distance downward into the material of the base pads 24. In the arrangement shown, as one example, these alignment features 46 form a cross shape configured to receive and engage with two support members 60 of support layer 16 in order to provide a stable base for outriggers or feet of machinery. In this example arrangement, a first portion of the recesses 48 extends forward from back edge 32 past a center point 40 of base pads 24 to a first inner point 42 and a second portion of the recesses 48 extends rightward from left edge 36 past center point 40 of base pads 24 to a second inner point 44.

In the arrangement shown, system 10 includes four base pads 24 that are respectively oriented at 0, 90, 180, and 270 degrees when viewed from the top, and placed next to one another to align recesses 48 to receive support layer 16. In this way, when support members 60 of support layer 16 are placed on top of a base pads 24, the recesses 48 receive and engage a lower portion of the support members 60 with close and tight tolerances to hold support members 60 in a position at which downward force applied by support members 60 to base pads 24 will be evenly distributed across lower surface 28 of base pads 24. In this manner, recesses 48 operate to facilitate alignment of support layer 16 with base pad assembly layer 14 and also provide increased strength and stability. Installation in this manner helps to prevent shifting and movement of base pads 24 and/or support layer 16 during use. Or, said another way, in the arrangement shown, as one example, the lower portion of support members 60 nest within the recesses 48 of alignment features 46 of base pads 24, thereby engaging and locking support members 60 across all base pads 24. That is, in the arrangement shown, when base pads 24 are aligned in an edge-to-edge arrangement, alignment features 46 form a continuous groove or recess 48 across all base pads 24 thereby locking all base pads 24 together when support members 60 are installed therein.

Although the arrangements are primarily described with reference to base pads 24 having cross shaped recesses 48 configured to hold two support members 60 of support layer 16, the embodiments are not so limited. Rather, it is contemplated that recesses 48 may have various other shapes to accommodate connection with a support layer 16 having a greater or fewer number of support members 60 and/or having support members 60 in different arrangements. Moreover, it is contemplated that in one or more arrangements, alignment features 46 of base pads 24 may include protrusions rising up from upper surface 26 to engage and interlock with support layer 16 in lieu of or in addition to recesses 48.

Handles 50: In the arrangement shown, as one example, base pads 24 include handles 50 to facilitate easy transportation, setup, and disassembly of base pad assembly layer 14 of system 10. Handles 50 are formed of any suitable size, shape, and design and are configured to facilitate handheld carrying of base pads 24 of base pad assembly layer 14. In the arrangement shown, as one example, handles 50 are flexible loop type handles attached to edges of base pads 24. However, embodiments are not so limited. Rather, it is contemplated that handle 50 may be implemented using various different types of rigid or flexible handles or handgrips including but not limited to loops, posts, knobs, holes, recesses, protrusions, and/or any other type of handle or handgrip.

In this example arrangement, two base pads 24 have handles 50 attached to front edge 30 and two base pads 24 have handles 50 attached to right edge 34. However, the embodiments are not so limited. Rather, it is contemplated that in various different arrangements, handles 50 may be positioned at any location that does not interfere with the positioning and interconnection of base pads 24, support layer 16 and or components of system 10. Moreover, it is further contemplated that in some arrangements, handles 50 may be omitted.

Support Layer 16:

Support layer 16 is formed of any suitable size, shape, and design and is configured to engage and interconnect with base pads 24 of base pad assembly layer 14 and upper pad 18 and distribute weight from upper pad 18 across base pads 24. In the arrangement shown, as one example, support layer 16 includes four support members 60 that interconnect in an overlapping arrangement having a general shape of a squared hashtag with an open center 58. However, the embodiments are not so limited. Rather, it is contemplated that support layer 16 may have greater or fewer support members 60 and/or have support members 60 arranged in different shapes or positions.

Support Members 60: Support members 60 are formed of any suitable size, shape, and design and are configured to interconnect to form support layer 16 and distribute weight from upper pad 18 across base pads 24. In the arrangement shown, support members 60 have an elongated square or rectangular shape having a top 62, a bottom 64, and opposing sides 66 extending between opposing ends 68, however any other shape or configuration is hereby contemplated for use. In this example arrangement, support member 60 have notches 72 proximate to ends 68 to facilitate interconnection of support members 60. In this example arrangement, two support members 60 have upward facing notches 72 extending downward into top 62 of the support members 60 and the other two support members 60 have downward facing notches 72 extending upward into bottom 64 of the support members 60. In this way, four support members 60 are aligned in a generally square and perpendicular alignment to one another. In this example arrangement, support members 60 are interconnected by positioning the support members 60 such that downward facing notches 72 are over and aligned with upward facing notches 72 in overlapping perpendicular alignment to one another. The pair of support members 60 with downward facing notches 72 are then lowered so downward facing notches 72 and upward facing notches 72 receive and interconnect with one another. However, the embodiments are not so limited. Rather it is contemplated that, in one or more arrangements, support members 60 of support layer 16 may be interconnected using various means or methods including but not limited to, for example, screwing, bolting, stapling, fasteners, riveting, bonding, adhering, welding, adhesives, interlocking, friction fitting, or any other connecting method or means.

In the arrangement shown, as one example, with support members 60 interconnected with one another to form support layer 16, support layer 16 can be positioned and held within recesses 48 of base pads 24. With support members 60 positioned within recesses 48 of base pads 24, and with all notches 72 of support members 60 interconnected, the support members 60 provide rigidity to prevent movement of base pads 24 and support members 60 while also distributing weight from upper pad 18 across base pads 24.

In the arrangement shown, as one example, downward facing notches 72 and upward facing notches 72 are generally similar in size. That is, in the arrangement shown, as one example, downward facing notches 72 extend upward a distance approximately halfway between bottom 64 and top 62 and upward facing notches 72 extend downward a distance approximately halfway between top 62 and bottom 64. However, notches 72 are not so limited. In an alternative arrangement shown, as one example, notches 72 on two support members 60 are larger than the notches 72 in the other two support members 60. In this alternative arrangement shown, as one example, upward facing notches 72 extend downward into top 62 of support member 60 a distance slightly less than the total distance between top 62 and bottom 64 of support member 60. In this alternative arrangement shown, as one example, downward facing notches 72 extend upward into bottom surface 64 a distance such that when upward facing notches 72 and downward facing notches 72 are aligned and downward facing notches 72 are pushed down on upward facing notches 72, the tops 62 of each support member 60 are generally coplanar.

In yet another alternative arrangement shown, as one example, only two support members 60 have notches 72. In this alternative arrangement, as one example, the notches 72 in two of the support members 60 are deep notches which extend a distance slightly less than the total distance between top 62 and bottom 64 of support member 60. In this arrangement the two other support members are aligned with notches 72 and lowered into notches 72. In this configuration, the tops 62 of the support members 60 without notches 72 are slightly higher than the tops 62 of support members 60 with notches 72. Also, in this alternative arrangement shown, as one example, in order to account for this difference in height, the recesses 48 in base pads 24 within which the support members 60 with notches 72 rest are slightly deeper than the recesses 48 within which the support members 60 without notches 72 rest. In this way, when support members 60 are lowered into recesses 48, the bottom surface of notches 72 are coplanar with the bottom of recesses 48 and, when the support members 60 without notches 72 are lowered into notches 72, the rest on the bottom surface of notches 72 and in recesses 48 and the tops 62 of all support members 60 are coplanar in this arrangement.

In one or more arrangements, support members 60 are formed of a metallic material, such as aluminum, steel, or an alloy or any other metallic material to provide extreme ruggedness and durability. Additionally or alternatively, in one or more arrangements, support members 60 are formed of a plastic material, a rubber material, a synthetic rubber material, an acrylic material, a nylon material, a fiberglass material, a foam material, a UHMW material, a polyethylene material or any other composite material and/or non-metallic material. Additionally or alternatively, in one or more arrangements, support members 60 are formed of a combination of metallic materials or components and non-metallic materials or components.

Support members 60 may be formed of a single, unitary member that is formed in a manufacturing process such as molding, pressing, forming, additive formation, machining, extrusion, casting, or the like to form a unitary and monolithic member. Alternatively, support members 60 may be formed of multiple pieces that are connected or assembled to one another such as through screwing, bolting, stapling, fasteners, riveting, bonding, adhering, welding, adhesives, interlocking, friction fitting, or any other connecting method or means.

In the arrangement shown, support members 60 have a hollow square tube shape, which reduces weight of the metallic material while retaining rigidity of support members 60. However, the embodiments are not so limited. Rather, it is contemplated that in one or more arrangements, support members 60 may be of solid internal construction, hollow internal construction, honeycomb internal construction, or any other internal construction.

In the arrangement shown, as one example, four support members 60 are shown in a generally square or rectangular alignment to one another thereby forming a hollow open center 58 between the four support members 60. Any number of support members 60 are hereby contemplated for use. In an alternative arrangement, additional support members 60 may fill the open center 58. As one example, one, two or more additional support members 60 may extend across the open center 58 either partially filling this space or wholly filling this space. Alternatively, an additional component, such as a block or other component may be placed within open center 58 thereby partially or wholly filling this space. Additional support members 60, or a block or other object, may serve to transfer weight from upper pad 18 to base pads 24 in the area of open center 58.

Upper Pad 18:

Upper pad 18 is formed of any suitable size, shape, and design and is configured to provide an upper surface for support for outriggers or feet of machinery and to distribute weight of such outriggers or feet of machinery across support layer 16 and then across base pads 24.

In the arrangement shown, as one example, upper pad 18 has a generally square or rectangular planer shape having an upper surface 80 and a lower surface 82 extending between a front edge 84, a back edge 86, a right edge 88, and a left edge 90. In this example arrangement, upper pad 18 has a recess 94 formed in upper surface 80. In this example arrangement, recess 94 has a generally circular shape and is configured to receive and hold outriggers or feet of machinery within recess 94 to prevent shifting of such outriggers or feet during use. Any other shape of this recess 94 such as square, rectangular or any other shape is hereby contemplated. However, the embodiments are not so limited. Rather, it is contemplated that, in one or more arrangements, upper pad 18 may have protrusions rising up from upper surface 80 (or another type of connection feature) to engage, hold and/or lock or align outriggers or feet of machinery in addition to or in lieu of recess 94.

In this example arrangement, upper pad 18 has an alignment feature 96 on lower surface 82. Alignment feature 96 is formed of any suitable size, shape, or design, and is configured to facilitate alignment and interconnection of upper pad 18 with support layer 16.

The purpose of the alignment feature 96 is to align upper pad 18 with the top 62 of support members 60. As such, all teaching and disclosure related to alignment feature 46 in the upper surface 26 of base pads 24 is applicable and repeated with respect to alignment feature 96 in the lower surface 82 of upper pad 18, unless stated otherwise. That is, alignment feature 96 may be a protrusion, a recess, a plurality of protrusions, a plurality of recesses and/or a combination of protrusions and recesses or any other feature that aligns, engages, locks and/or holds upper pad 18 with support members 60.

In the arrangement shown, as one example, alignment features 96 includes a protrusion 98 extending downward from lower surface 82. Protrusion 98 is formed of any suitable size, shape, and design and is configured to engage and interlock with support members 60 of support layer 16 in order to prevent upper pad 18 from shifting relative to support layer 16 in order to provide a stable base for outriggers or feet of machinery. In this example arrangement, protrusion 98 has a generally square shape configured to be received within the generally square or rectangular open center 58 of support layer 16 between the four perpendicularly crossed support members 60. However, the embodiments are not so limited. Rather, it is contemplated that protrusion 98 may have various other shapes to accommodate connection with a support layer 16 having a greater or fewer number of support members 60 and/or having support members 60 in different arrangements. Moreover, it is contemplated that in one or more arrangements, alignment feature 96 of upper pad 18 may include recesses in lower surface 82 to engage and interlock with support layer 16 in a similar manner to recesses 48 of base pads 24 in addition to or in lieu of protrusion 98.

In an alternative arrangement, alignment feature 96 is a generally square or rectangular recess or recesses that extend a distance into the material of the upper pad 18. In the alternative arrangement, as one example, alignment feature 96 has a cross shape configured to receive and engage with the tops 62 of support members 60 of support layer 16 in order to provide a stable base for outriggers or feet of machinery. In this way, when upper pad 18 is placed on tops 62 of support members 60, the recesses of alignment feature 96 receive and engage the tops 62 of the support members 60 with close and tight tolerances to hold support members 60 in a position at which downward force applied by upper pad 18 to support members 60 will be evenly distributed across base pads 24. In this manner, recesses of alignment feature 96 operate to facilitate alignment of support layer 16 with upper pad 18 and also provide increased strength and stability. Installation in this manner helps to prevent shifting and movement of upper pad 18 and/or support layer 16 during use. Or, said another way, in the alternative arrangement, as one example, the tops 62 of support members 60 nest within the recesses of alignment feature 96 of base pad 14, thereby engaging and locking support members 60 and upper pad 18. That is, in the alternative arrangement, with upper pad 18 having a groove or recesses in its lower surface 82 that engage the tops 62 of support members 60, the alignment feature 96 engages and locks all support members 60 together when upper pad 18 is installed thereon.

This configuration of upper pad 18 having recesses as alignment feature 96 helps facilitate alignment of upper pad 18 to support members 60 particularly when additional support members 60 extend across open center 58. In this arrangement, the recesses are configured to receive the tops 62 of the additional support members 60 in open center 58.

Handle 100: In the arrangement shown, as one example, upper pad 18 includes a handle 100 to facilitate easy transportation, setup, and disassembly of system 10. Handle 100 is formed of any suitable size, shape, and design and is configured to facilitate handheld carrying of upper pad 18. As described with reference to handle 50 of base pads 24, in the arrangement shown, handle 100 is a flexible loop type handle attached to an edge of upper pad 18. However, embodiments are not so limited. Rather, it is contemplated that handle 100 may be implemented using various different types of rigid or flexible handles or handgrips including but not limited to, loops, posts, knobs, holes, recesses, protrusions, and/or any other type of handle or handgrip.

In this example arrangement, handle 100 is attached to front edge 84 of upper pad 18. However, the embodiments are not so limited. Rather, it is contemplated that in various different arrangements, handle 100 may be positioned at any location that does not interfere with the positioning and interconnection of upper pad 18 with support layer 16 and or components of system 10. Moreover, it is further contemplated that in some arrangements, handle 100 may be omitted.

Materials for Base Pads 24 and Upper Pad 18

In various different arrangements, base pads 24 of base pad assembly layer 14 and upper pad 18 may be formed of various different materials including but not limited to, for example, metallic materials, such as aluminum, steel, or an alloy or any other metallic material, or non-metallic materials, such as a plastic material, a rubber material, a synthetic rubber material, an acrylic material, a nylon material, a fiberglass material, a foam material, a UHMW material, a polyethylene material or any other composite material and/or non-metallic material, as well as any combination of such materials.

In one or more arrangements, upper pad 18 and/or base pads 24 are formed of a compressible material to promote secure connection of system 10 with a ground or floor surface and with outriggers or feet of machinery supported thereon. In some various arrangements, such compressible material may include but is not limited to, for example, a rubber, a synthetic rubber, a rubber composite, a silicone, a plastic, a foam, a polyethylene material or any other composite material, non-metallic material, or any other compressible material, flexible material or any combination thereof. In one arrangement, upper pad 18 and base pads 24 are formed of a material that has a high coefficient of friction so as to ensure the system 10 securely engages the ground or floor surface and the outriggers or feet of the machinery supported by the system 10 such that they securely engage one another and provide a sure footing thereby preventing slipping and other relative movement.

In one or more arrangements, upper pad 18 and base pads 24 are formed partially of or primarily of ground up recycled tires for vehicles. This ground up recycled tire material is then added to a mold and formed into upper pad 18 and base pads 24 with the addition of pressure and heat in a recipe which may include additional additives such as virgin material additives, strengthening additives such as fiberglass strands, strings, chords, netting or other structural supports, binders, or any other materials. In one or more arrangements structural reinforcement may be added to upper pad 18 and base pads 24 to increase the structural rigidity and strength of upper pad 18 and base pads 24 such as steel or iron rods, netting, bars, frame members or any other shaped member. In one or more arrangements, such structural reinforcement is incorporated into the material during the manufacturing process and therefore are completely embedded within upper pad 18 and base pads 24.

In Operation:

In the arrangement shown, as one example, system 10 is formed of interlocking components that can be disassembled to facilitate easy storage and transportation while providing stable support and distribution of weight across a larger area for support of outriggers or feet of machinery. In one or more arrangements, as one example, base pads 24 of base pad assembly layer 14 and upper pad 18 have dimensions of a square measuring approximately 2 ft×2 ft and support members 60 of support layer 16 are approximately 3 ft long. These dimensions allow system 10 to be disassembled and easily transported to a worksite in the bed of a truck or even within the cab. In this example arrangement, base pads 24 upper pad 18 may also be stacked to facilitate compact and organized storage of system 10 when not in use. When system 10 is assembled, the base pads 24 of base pad assembly layer 14 distribute weight across approximately 16 ft². However, the embodiments are not so limited. Rather, it is contemplated that components of system 10 may be scaled up or down to any desired size.

To assemble system 10, base pads 24 are first placed next to one another on a floor or on the ground at a worksite to form base pad assembly layer 14. More specifically, in this example arrangement, base pads 24 are placed next to one another to form a square, with base pads 24 oriented at 0, 90, 180, and 270 degrees so the combined recesses 48 form a cross shape or the shape of a squared hashtag.

With base pads 24 placed to form base pad assembly layer 14, a first pair of support members 60 are placed in recesses 48 parallel to one another with notches 72 facing upward. A second pair of the support members 60 are aligned with recesses 48 in positions parallel to one another and perpendicular to the first pair of support members 60 with notches 72 facing downward. In these positions, the second pair of the support members 60 are lowered into the recesses 48. At the same time, downward facing notches 72 and upward facing notches 72 receive and interconnect with one another to form support layer 16.

With support members 60 placed to form support layer 16, upper pad 18 is placed on the tops 62 of support members 60 with protrusion 98 aligned with and extending into open center 58 of support layer 16 to complete assembly of system 10. With components of system 10 in these positions, the components are interconnected and are further secured in place when weight is applied to the upper surface 80 of upper pad 18. In this manner, an interconnected outrigger pad support system 10 is formed that can distribute loads over a larger area, while retaining the ability to be disassembled for easy transportation and/or storage.

Alternative Arrangement:

While system 10 has been disclosed according to the arrangement shown, as one example, system 10 is not so limited. An alternative arrangement of system 10 is presented. In the alternative arrangement, system 10 and its components are the same as previously described, with the exception of the details provided hereafter. In this alternative arrangement, as one example, support members 60 do not interlock, rather they rest adjacent each other within recesses 48 of base pads 24.

In the alternative arrangement shown, as one example, base pads 24 of base pad assembly layer 14 includes alignment features 46 which are recesses 48. In this arrangement, recesses 48 do not form a cross shape, rather the recesses 48 extend such that one end is adjacent an edge of another recess 48. In this alternative arrangement shown, as one example, a first portion of the recesses 48 extends forward from a back edge 32 toward a center point 40 until it meets an edge of a second portion of the recesses 48. In this alternative arrangement, as one example, the second portion of recesses 48 extends forward from left edge 36 past center point 40 of base pads 24 to a second inner point 44. In this way, the first portion and second portion of recesses 48 do not cross, rather the first portion just meets and rests adjacent to the second portion of recesses 48.

In this alternative arrangement shown, as one example, support members 60 of support layer 16 do not interlock, rather they rest in recesses 48 directly adjacent other support members 60. That is, a single support member 60 is placed within each recess 48 and, when all support members 60 are within each recess 48, each support member 60 has another support member 60 adjacent one end 68 of the support member 60.

From the above discussion it will be appreciated that the disclosed system presented herein improves upon the state of the art. Specifically, in one or more arrangements, an improved outrigger pad support system is provided that: has the necessary strength, rigidity, and durability, while also remaining affordable and relatively lightweight; is formed of interlocking components; is convenient to transport and store; can effectively distribute load over a larger area; is rigid; minimizes displacement under heavy loads; is relatively easy to manufacture; is easy to use; is relatively lightweight; is easy to move; has a robust design; is durable; has a long useful life; is not easily susceptible to wear and tear; is high quality; is relatively inexpensive; increases safety for the operator and other individuals and property in the area; is easy to transport; effectively distributes loads and pressures from outriggers to levels the supporting surface can withstand, or levels deemed acceptable by site owners; protects supporting surfaces from damage caused by outriggers; and/or has the strength to withstand heavy loads, among countless other advantages and improvements.

It will be appreciated by those skilled in the art that other various modifications could be made to the embodiments without parting from the spirit and scope of this disclosure. All such modifications and changes fall within the scope of the claims and are intended to be covered thereby.

Additional Embodiment 1

Figure 14:
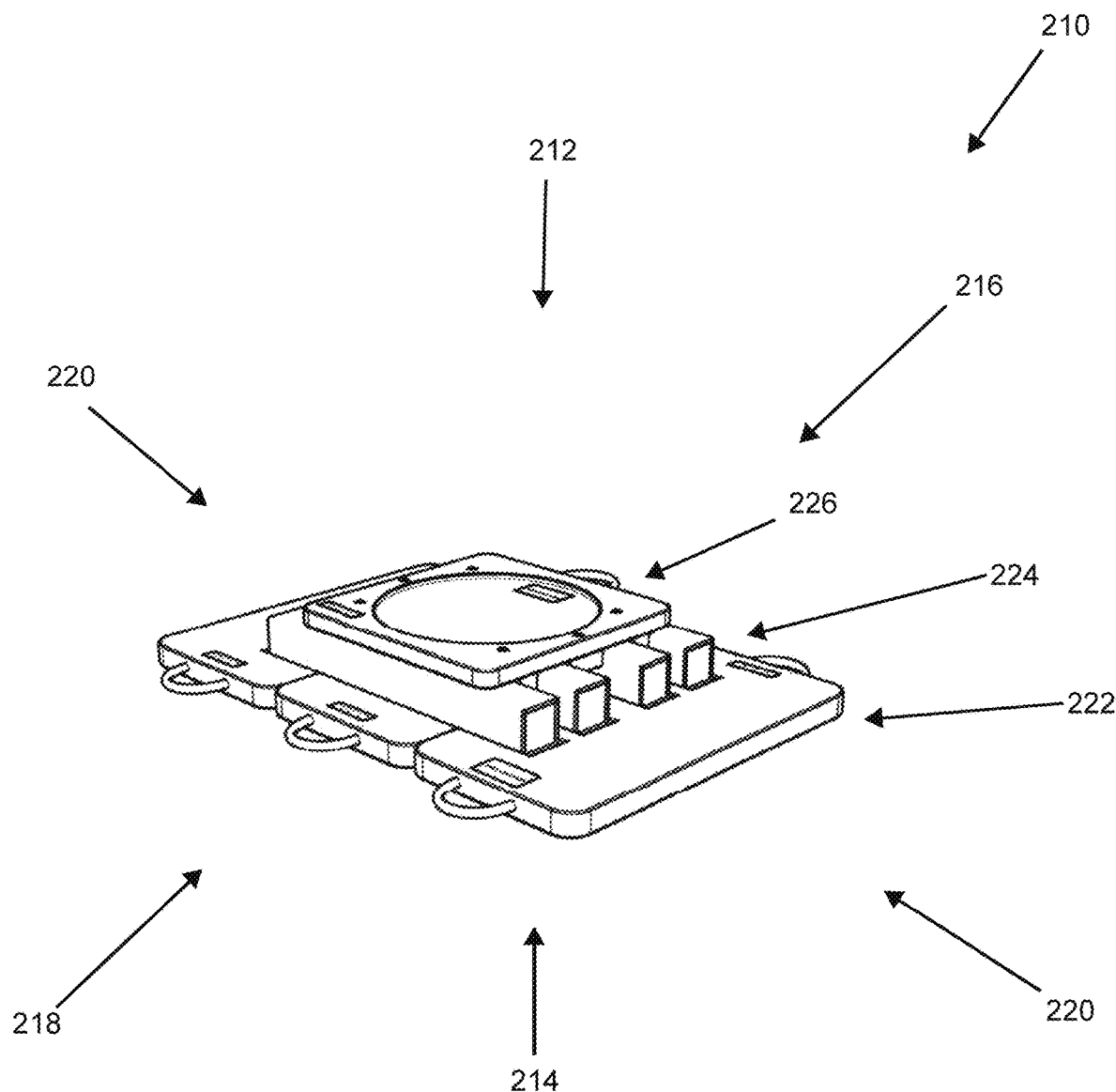
FIG. 14 is a perspective view of an interlocking outrigger pad support system, in accordance with one or more arrangements; the view showing a base pad assembly, a support layer in engagement with the base pad assembly, and an upper pad assembly in engagement with the support layer.
Figure 15:
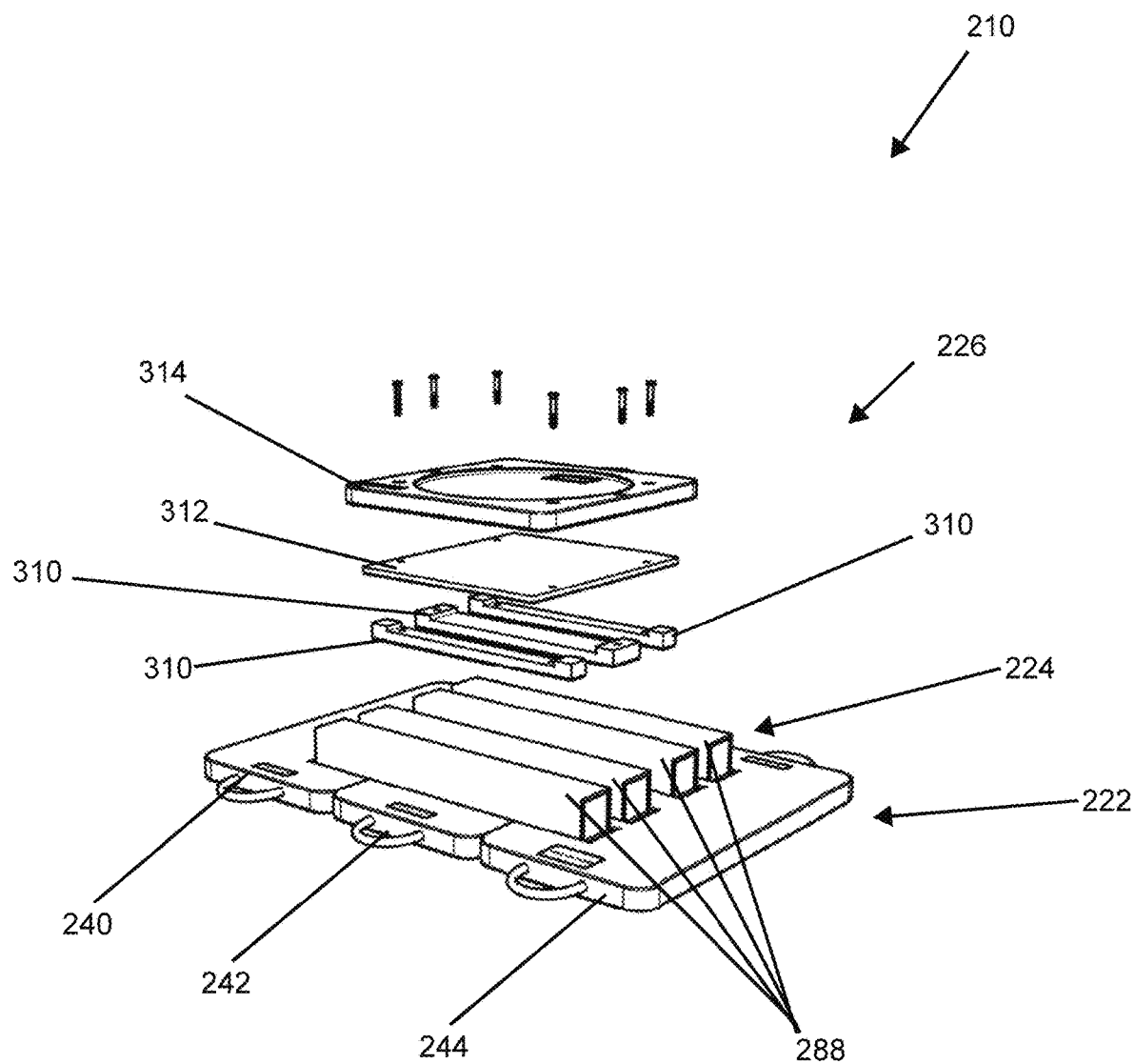
FIG. 15 is an exploded view of an interlocking outrigger pad support system, in accordance with one or more arrangements; the view showing a base pad assembly formed of a first end pad, a center pad, and a second end pad; a support layer formed of elongated members, the elongated members resting in alignment features of the upper surface of the base pad assembly; and an upper pad assembly formed of alignment features, an intermediate plate, and an upper pad, exploded from each other.
Figure 16:
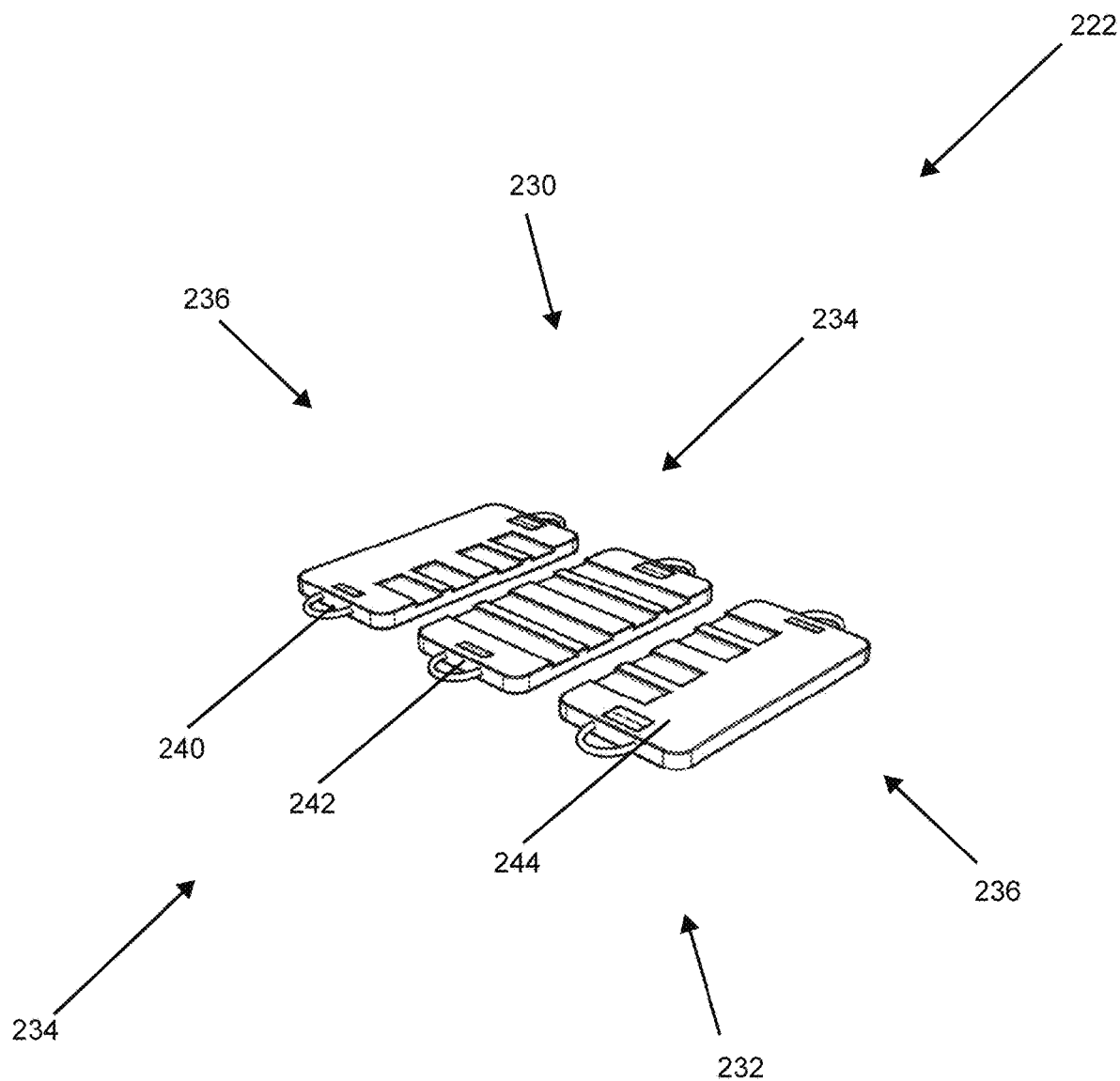
FIG. 16 is a perspective view of a base pad assembly for an interlocking outrigger pad support system, in accordance with one or more arrangements; the view showing a first end pad, a center pad, and a second end pad.
Figure 17:
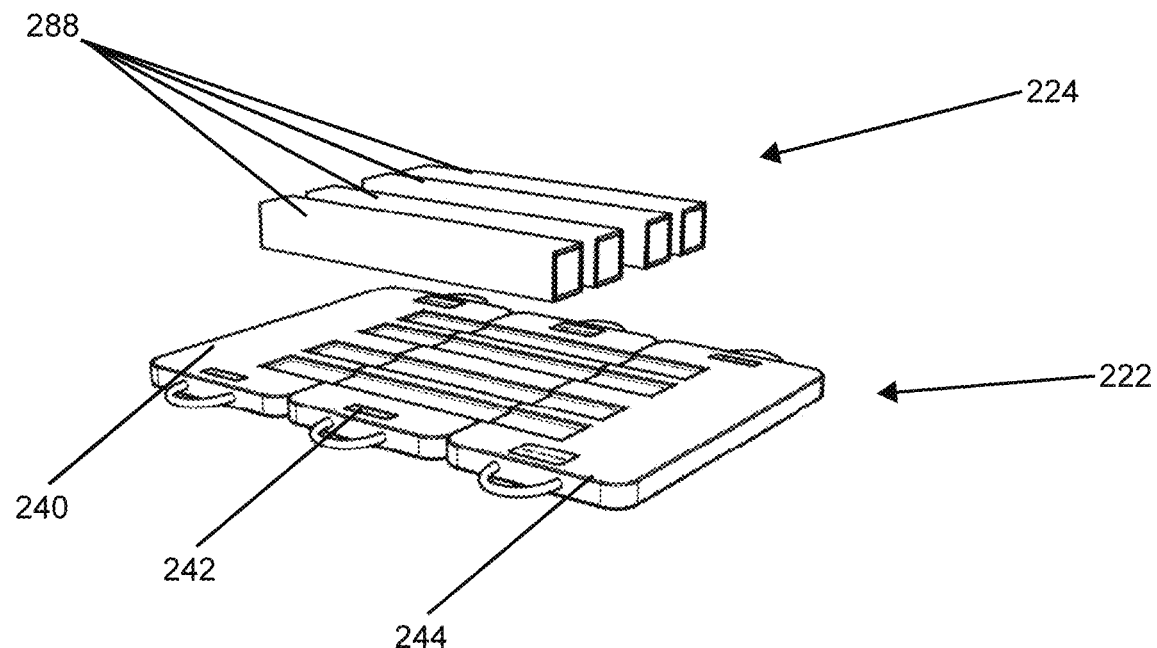
FIG. 17 is an exploded view of a base pad assembly and a support layer for an interlocking outrigger pad support system, in accordance with one or more arrangements; the view showing the base pad assembly formed of a first end pad, a center pad, and a second end pad and the support layer formed of elongated members.
Figure 18:
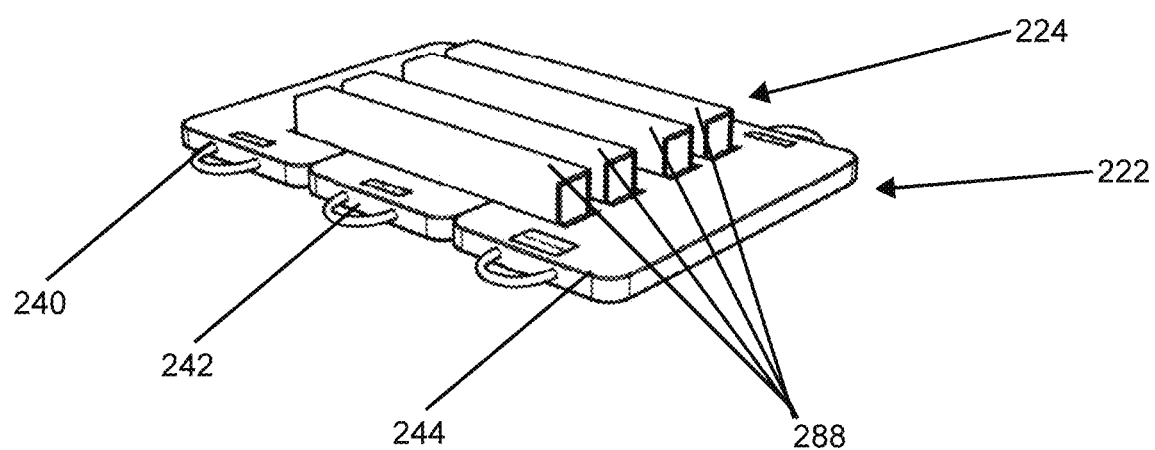
FIG. 18 is a perspective view of a base pad assembly and a support layer for an interlocking outrigger pad support system, in accordance with one or more arrangements; the view showing the base pad assembly formed of a first end pad, a center pad, and a second end pad and the support layer formed of elongated members, with the elongated members resting in alignment features of the base pad assembly.
Figure 19:
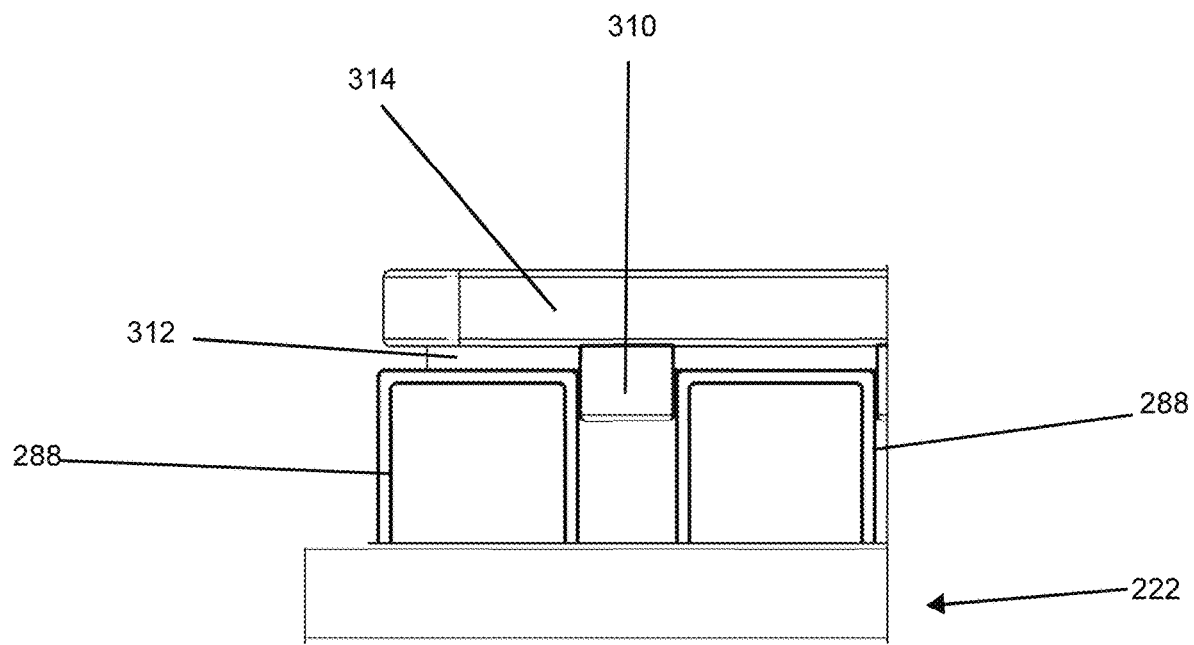
FIG. 19 is a partial close up view of the left or right side of an interlocking outrigger pad support system, in accordance with one or more arrangements, the view showing a base pad assembly, a support layer formed of elongated members, and an upper pad assembly formed of alignment features that rest in between and engage the elongated members of the support layer, an intermediate plate, and an upper pad.
Figure 20:
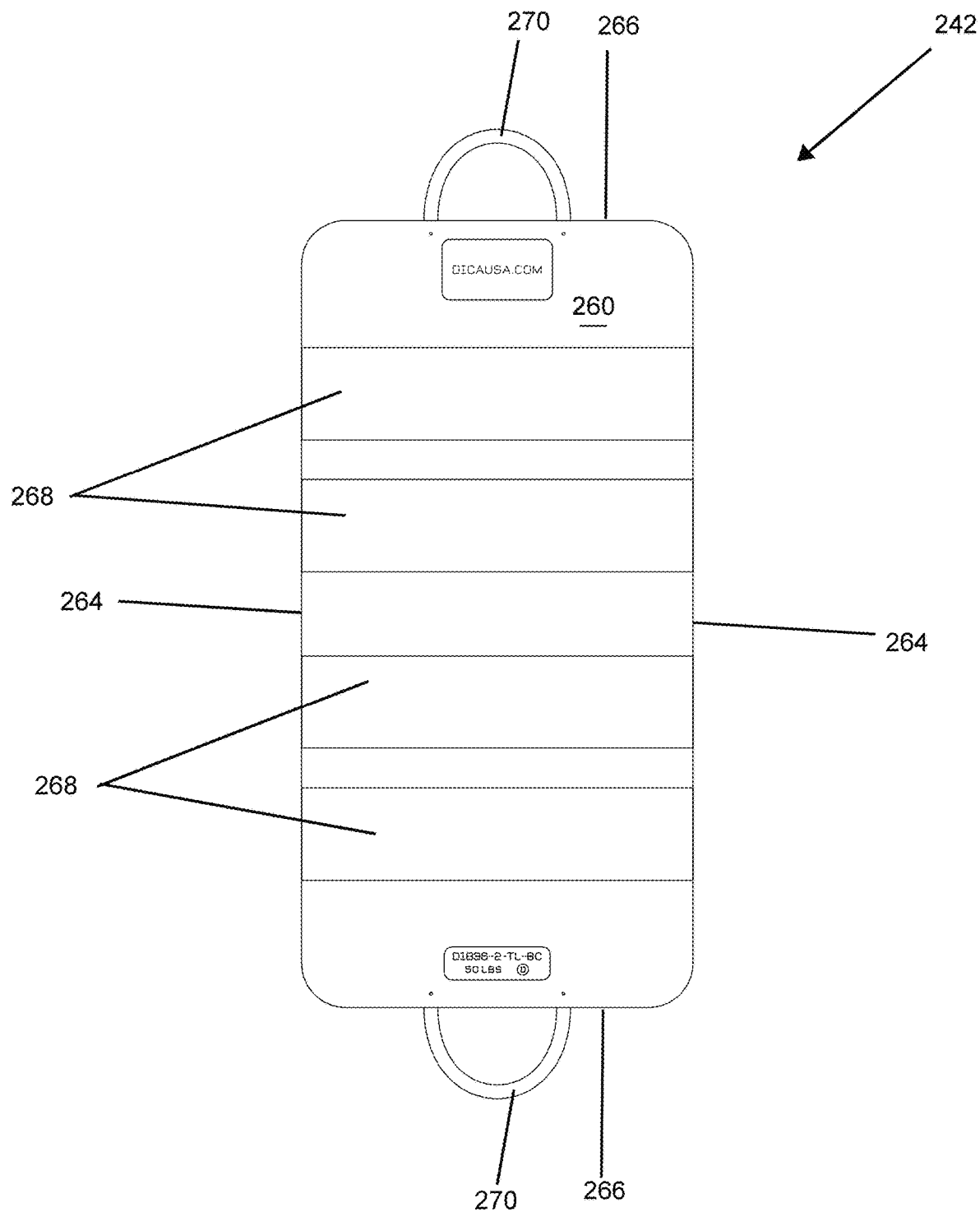
FIG. 20 is a top elevation view of a center pad for an interlocking outrigger pad support system, in accordance with one or more arrangements; the view showing the center pad having a top surface, opposing left and right ends, opposing front and back surfaces, alignment features, and two handles.
Figure 21:
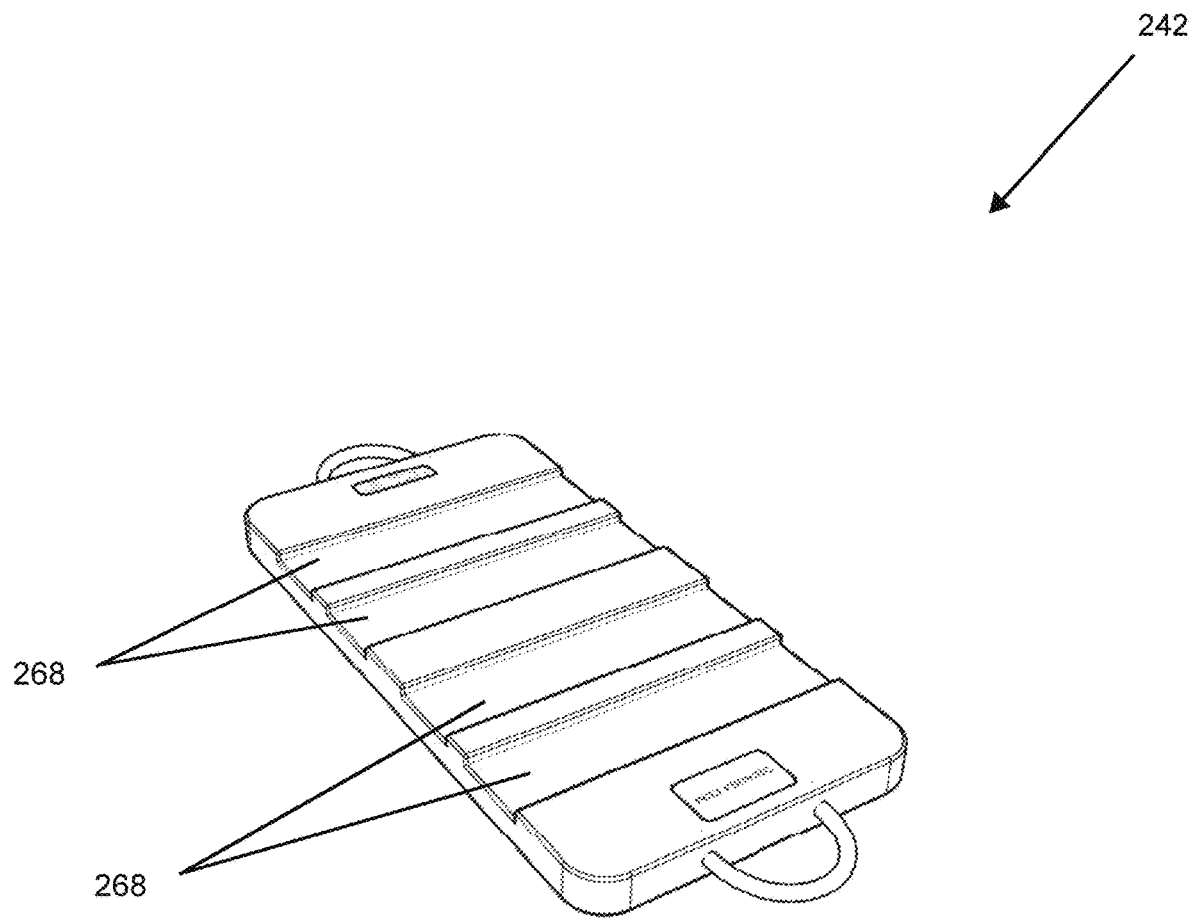
FIG. 21 is a perspective view of a center pad for an interlocking outrigger pad support system, in accordance with one or more arrangements; the view showing the center pad having alignment features comprised of recesses therein.
Figure 22:
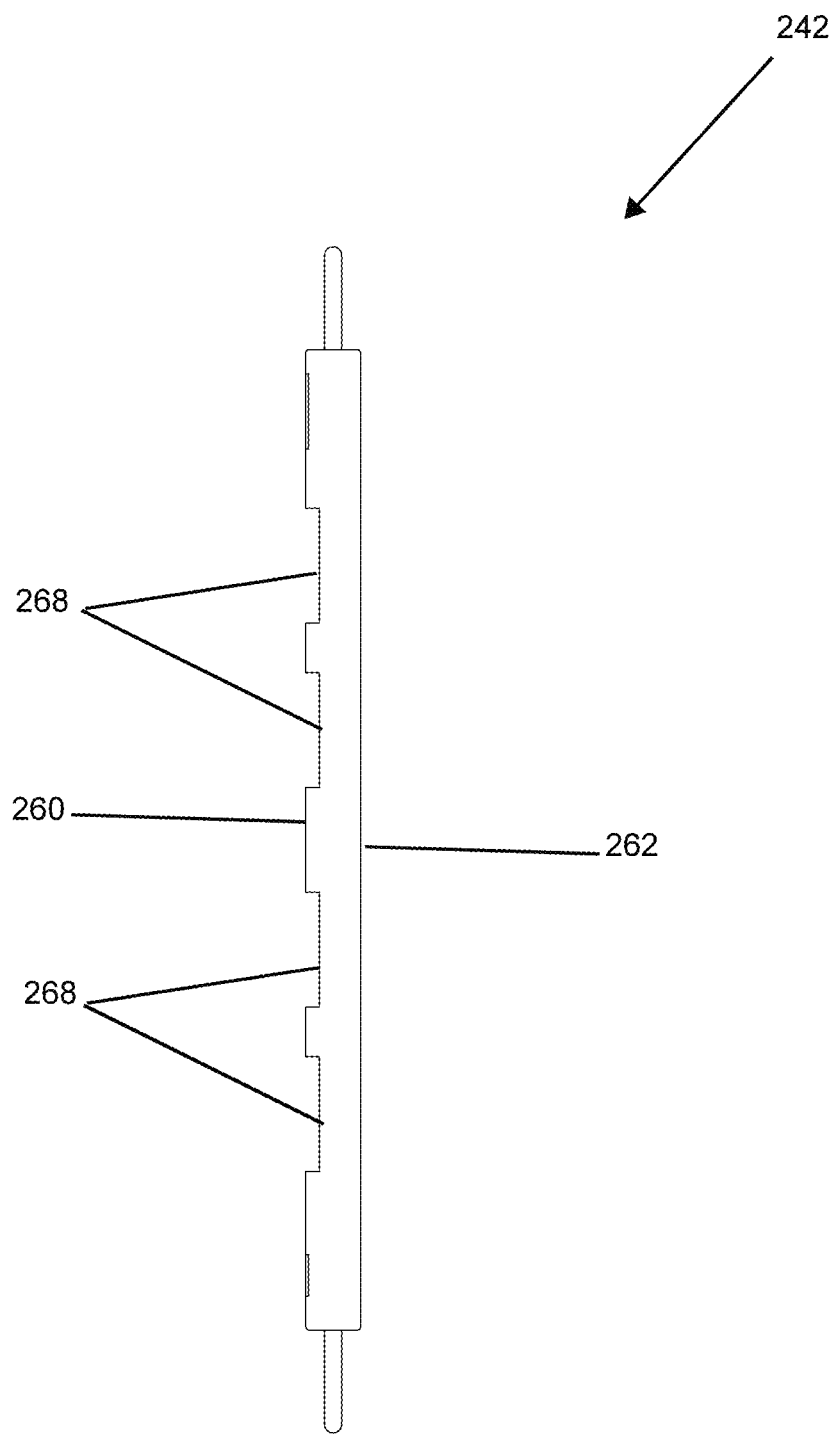
FIG. 22 is a side elevation view of a center pad for an interlocking outrigger pad support system, in accordance with one or more arrangements; the view showing the center pad having a top surface, a bottom surface, and alignment features comprised of recesses in the top surface of the center pad.
Figure 23:
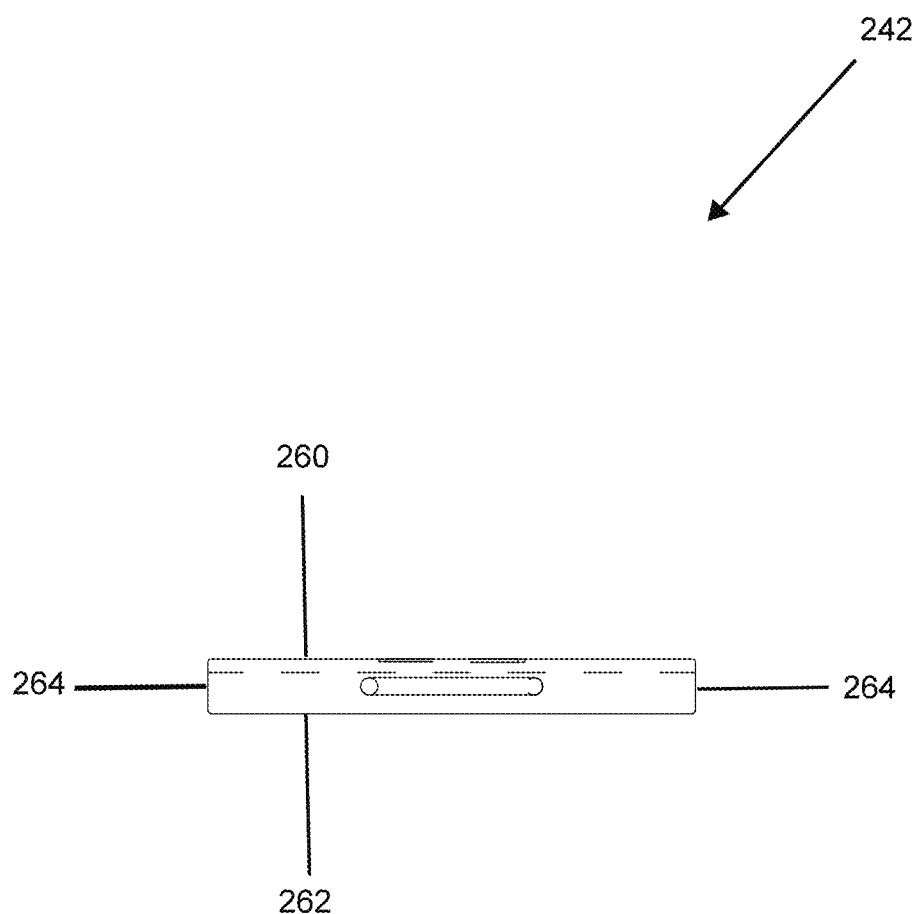
FIG. 23 is a front surface elevation view of a center pad for an interlocking outrigger pad support system, in accordance with one or more arrangements; the view showing the center pad having a top surface, a bottom surface, and opposing left and right ends.
Figure 24:
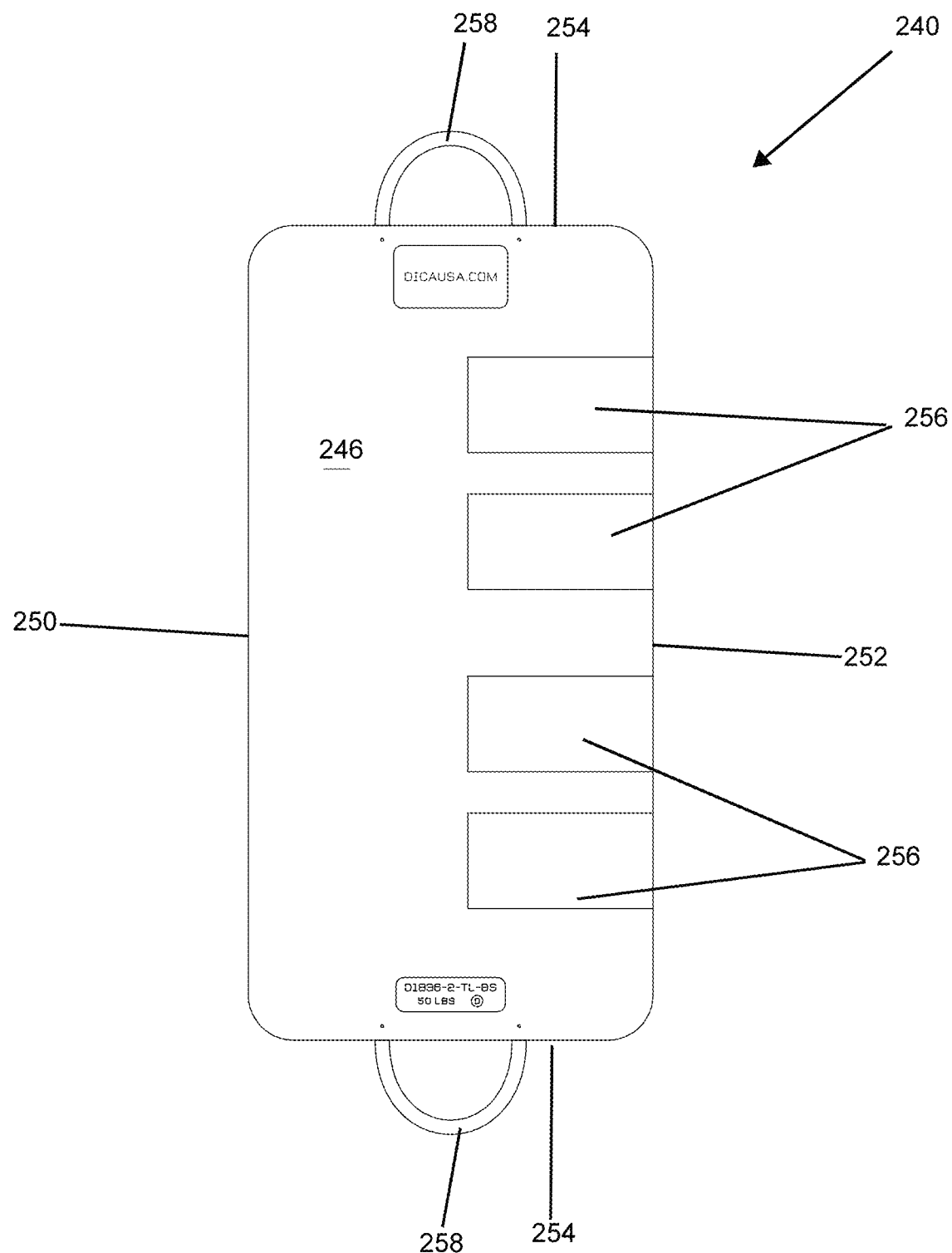
FIG. 24 is a top elevation view of a first end pad for an interlocking outrigger pad support system, in accordance with one or more arrangements; the view showing the first end pad having a top surface, an exterior end, an interior end, opposing front and back surfaces, alignment features, and two handles.
Figure 25:
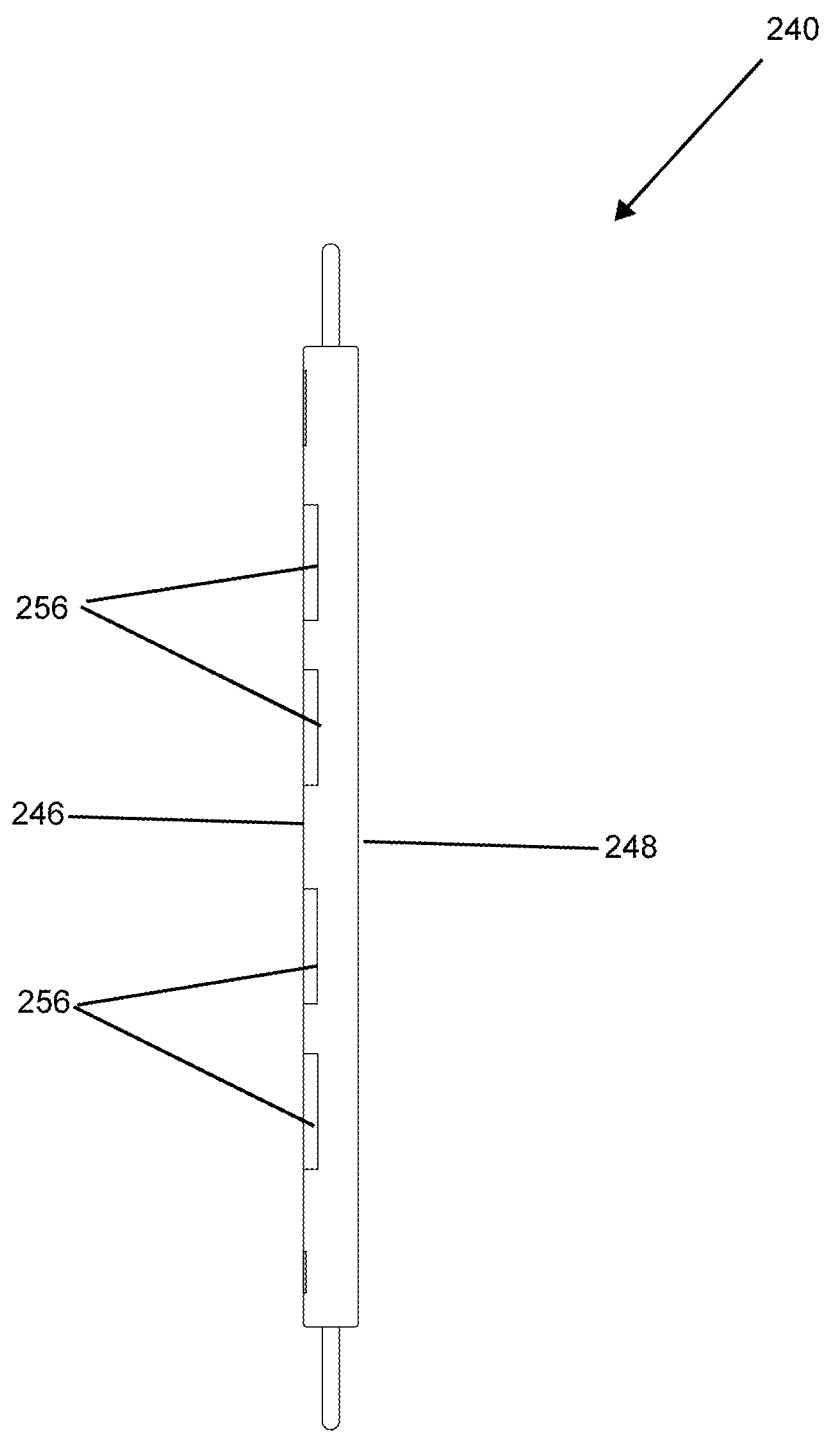
FIG. 25 is a side elevation view of a first end pad for an interlocking outrigger pad support system, in accordance with one or more arrangements; the view showing the first end pad having a top surface, a bottom surface, and alignment features comprised of recesses in the top surface first end pad.
Figure 26:
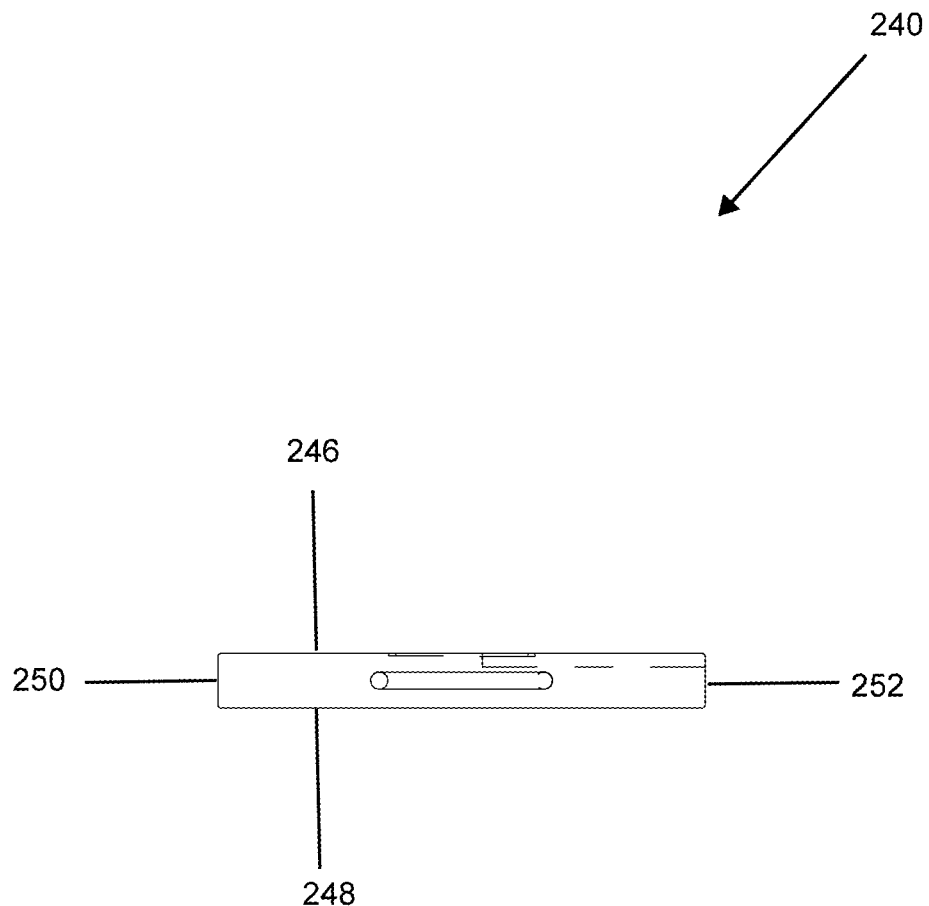
FIG. 26 is a front surface elevation view of a first end pad for an interlocking outrigger pad support system, in accordance with one or more arrangements; the view showing the first end pad having a top surface, a bottom surface, an exterior end, and an interior end.
Figure 27:
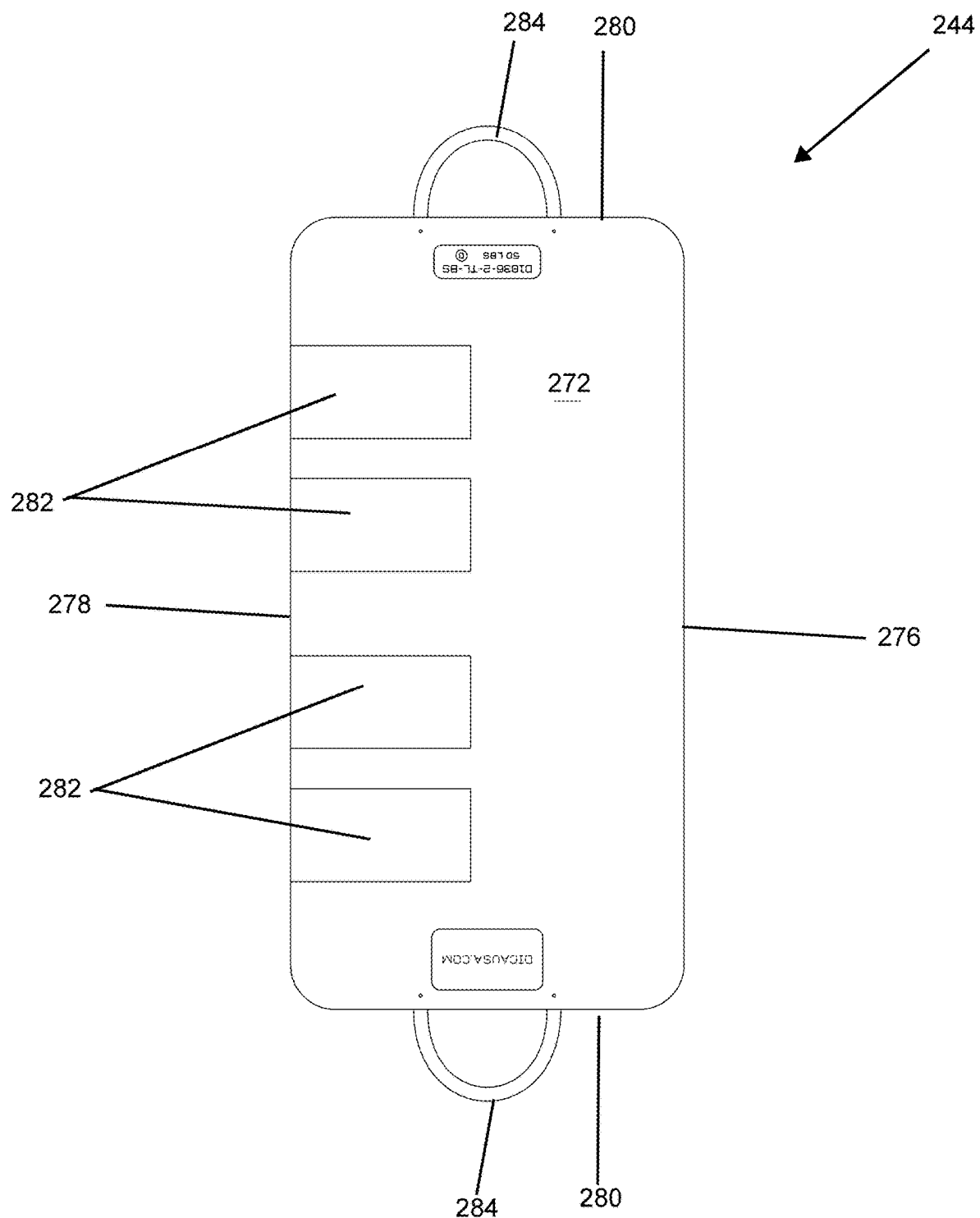
FIG. 27 is a top elevation view of a second end pad for an interlocking outrigger pad support system, in accordance with one or more arrangements; the view showing the second end pad having a top surface, an exterior end, an interior end, opposing front and back surfaces, alignment features, and two handles.
Figure 28:
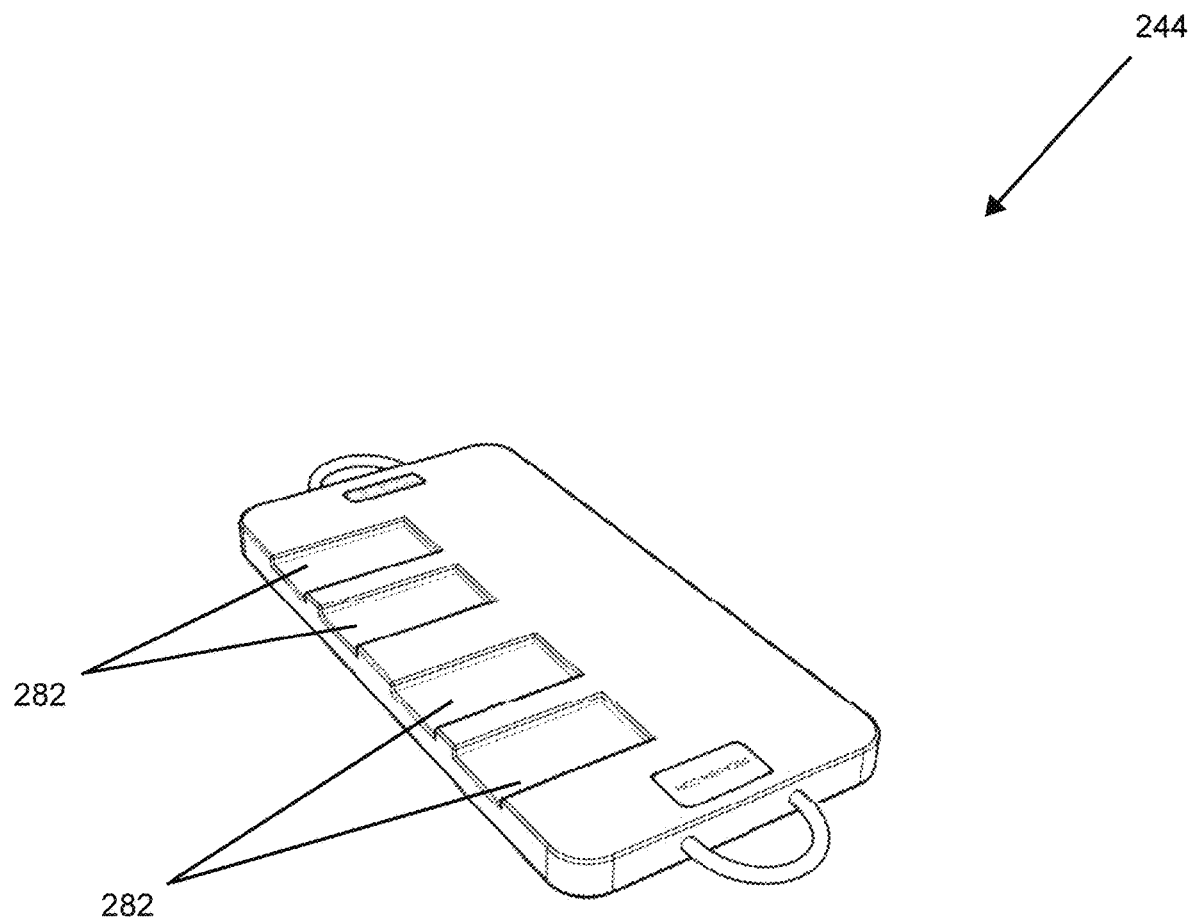
FIG. 28 is a perspective view of a second end pad for an interlocking outrigger pad support system, in accordance with one or more arrangements; the view showing the second end pad having alignment features comprised of recesses therein.
Figure 29:
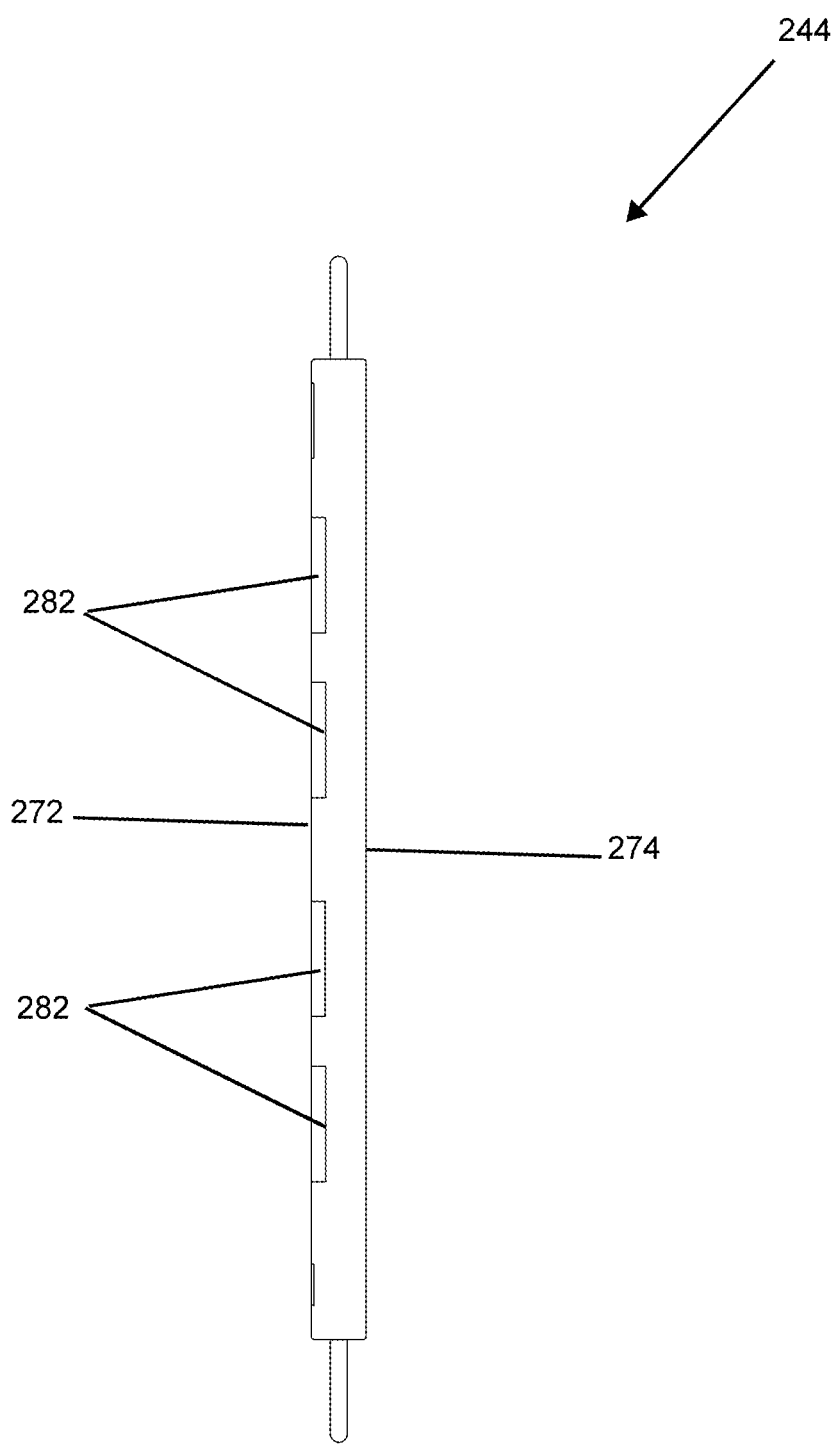
FIG. 29 is a side elevation view of a second end pad for an interlocking outrigger pad support system, in accordance with one or more arrangements; the view showing the second end pad having a top surface, a bottom surface, and alignment features comprised of recesses in the top surface of the second end pad.
Figure 30:
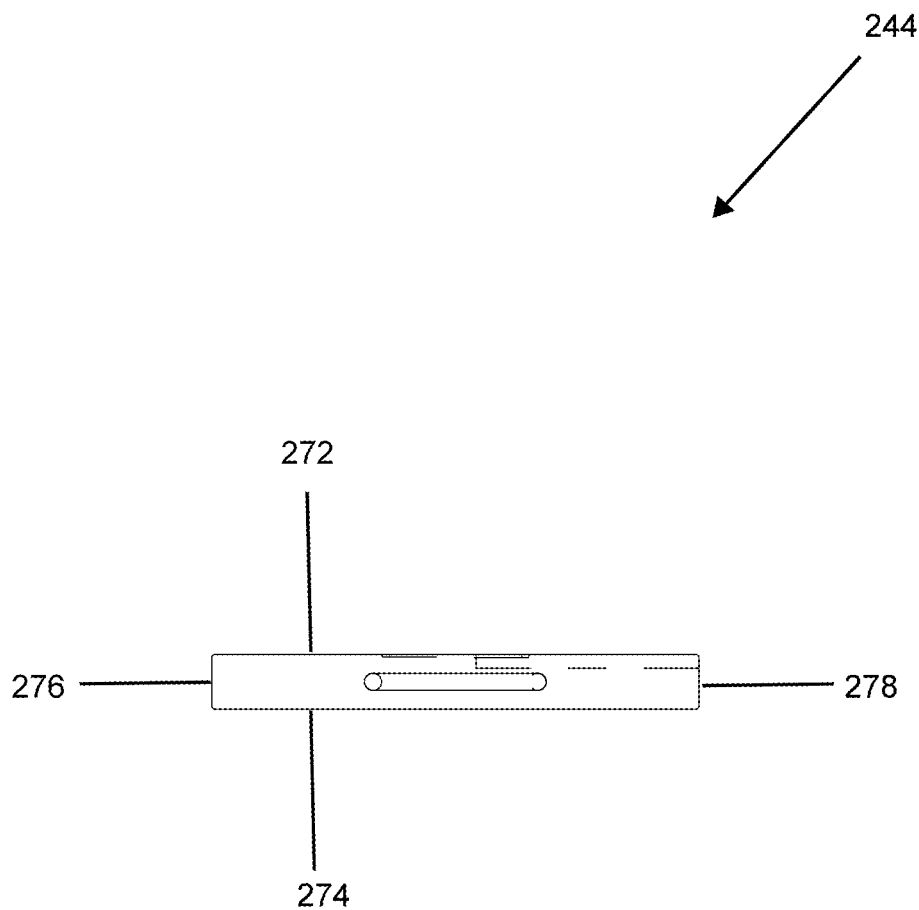
FIG. 30 is a back surface elevation view of a second end pad for an interlocking outrigger pad support system, in accordance with one or more arrangements; the view showing the second end pad having a top surface, a bottom surface, an exterior end, and an interior end.
Figure 31:
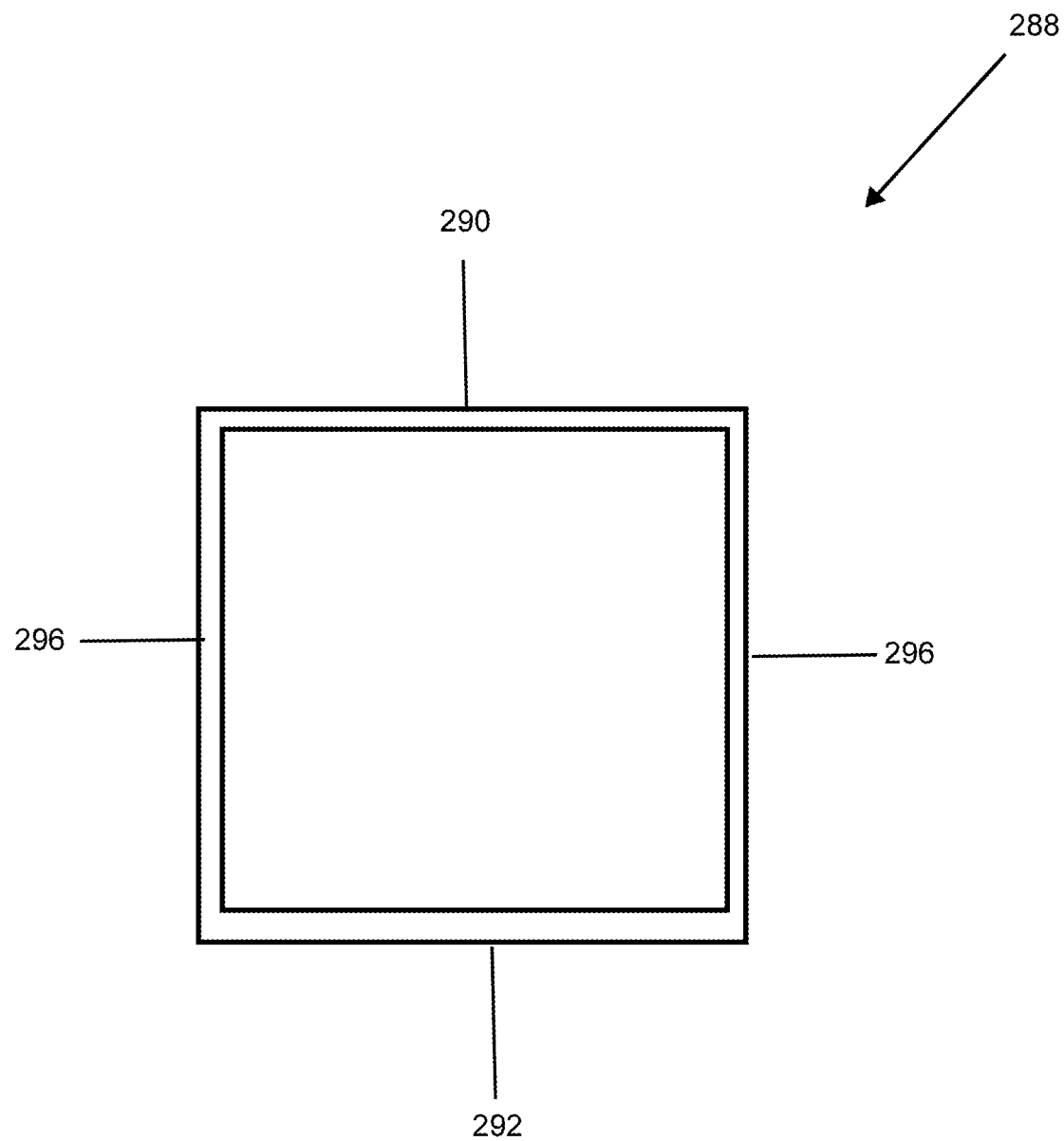
FIG. 31 is a right end elevation view of an elongated member of a support layer for an interlocking outrigger pad support system, in accordance with one or more arrangements; the view showing the elongated member having a top surface, a bottom surface, and opposing front and back surfaces.
Figure 32:
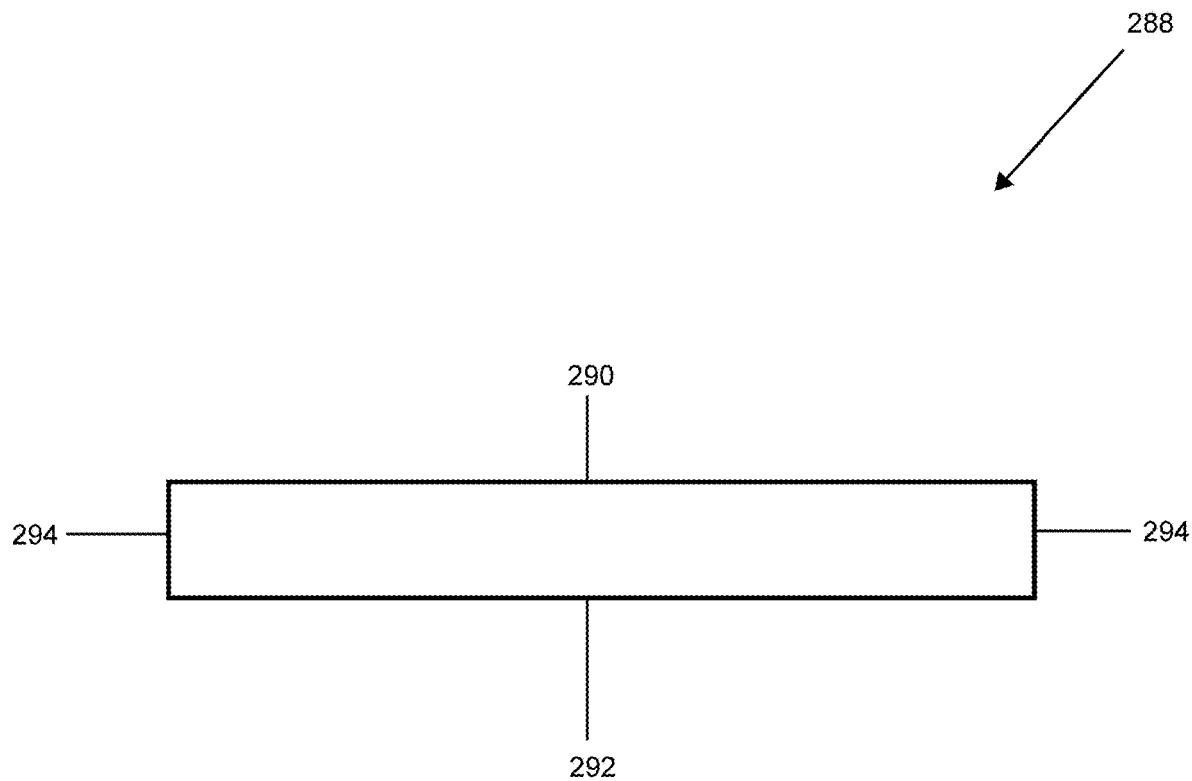
FIG. 32 is a front surface elevation view of an elongated member of a support layer for an interlocking outrigger pad support system, in accordance with one or more arrangements; the view showing the elongated member having a top surface, a bottom surface, and opposing left and right ends.
Figure 33:
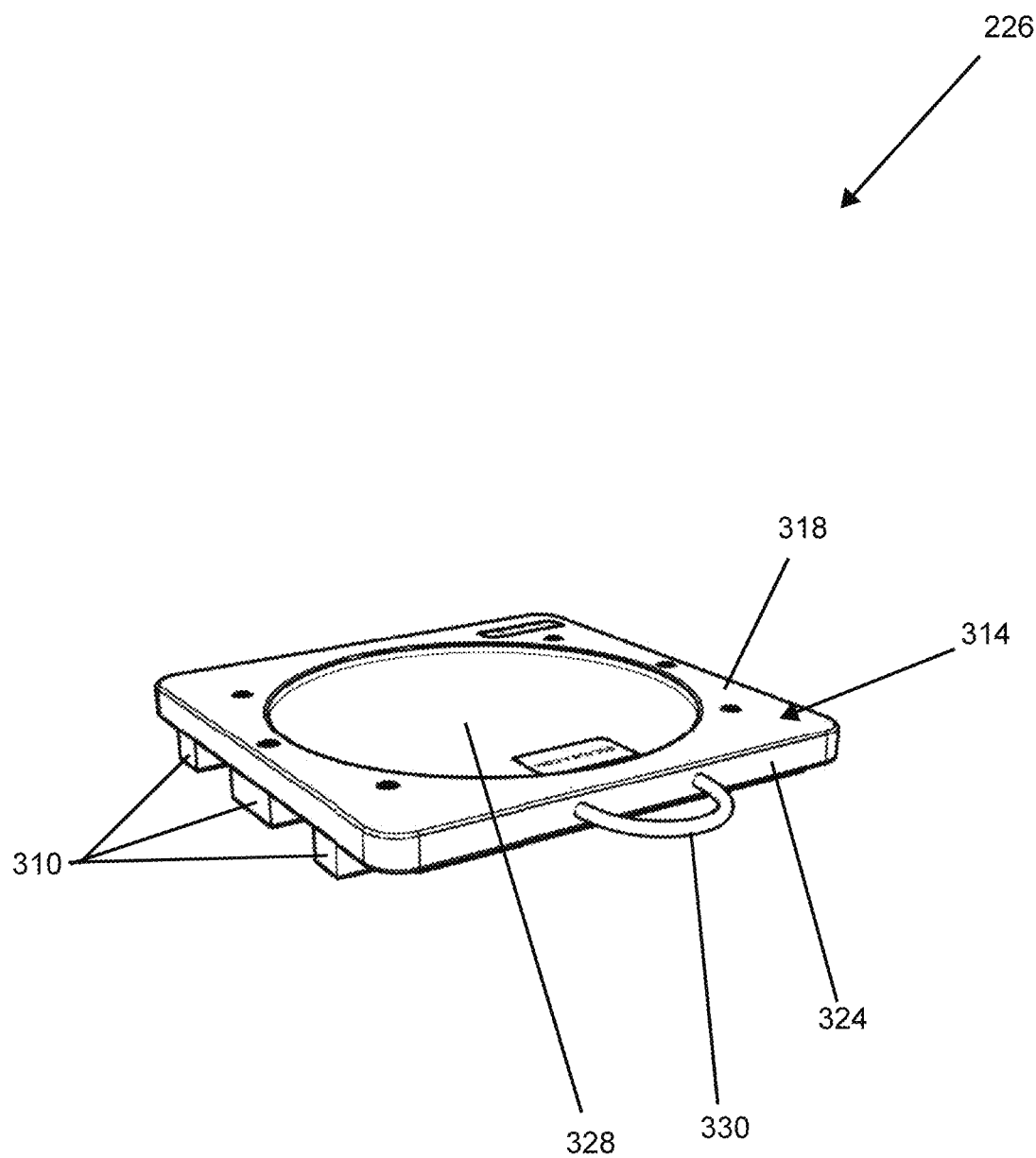
FIG. 33 is a perspective view of an upper pad assembly for an interlocking outrigger pad support system, in accordance with one or more arrangements; the view showing the upper pad assembly having alignment features and an upper pad; the upper pad having a top surface with a recess, a front surface, and a handle.
Figure 34:
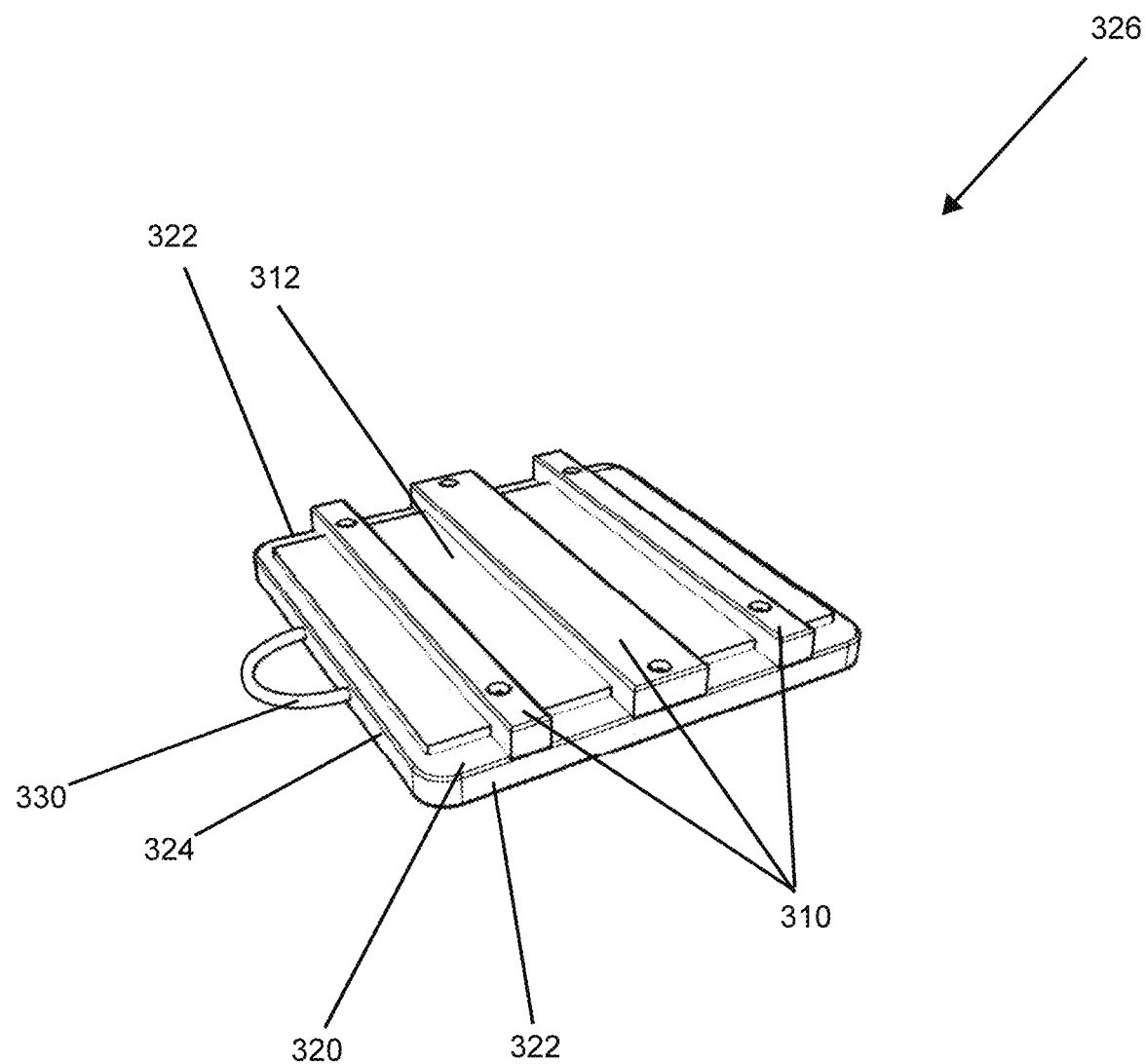
FIG. 34 is a perspective view of an upper pad assembly for an interlocking outrigger pad support system, in accordance with one or more arrangements; the view showing the upper pad assembly having alignment features, an intermediate plate, and an upper pad; the upper pad having a bottom surface, opposing left and right ends, a front surface, and a handle.
Figure 35:
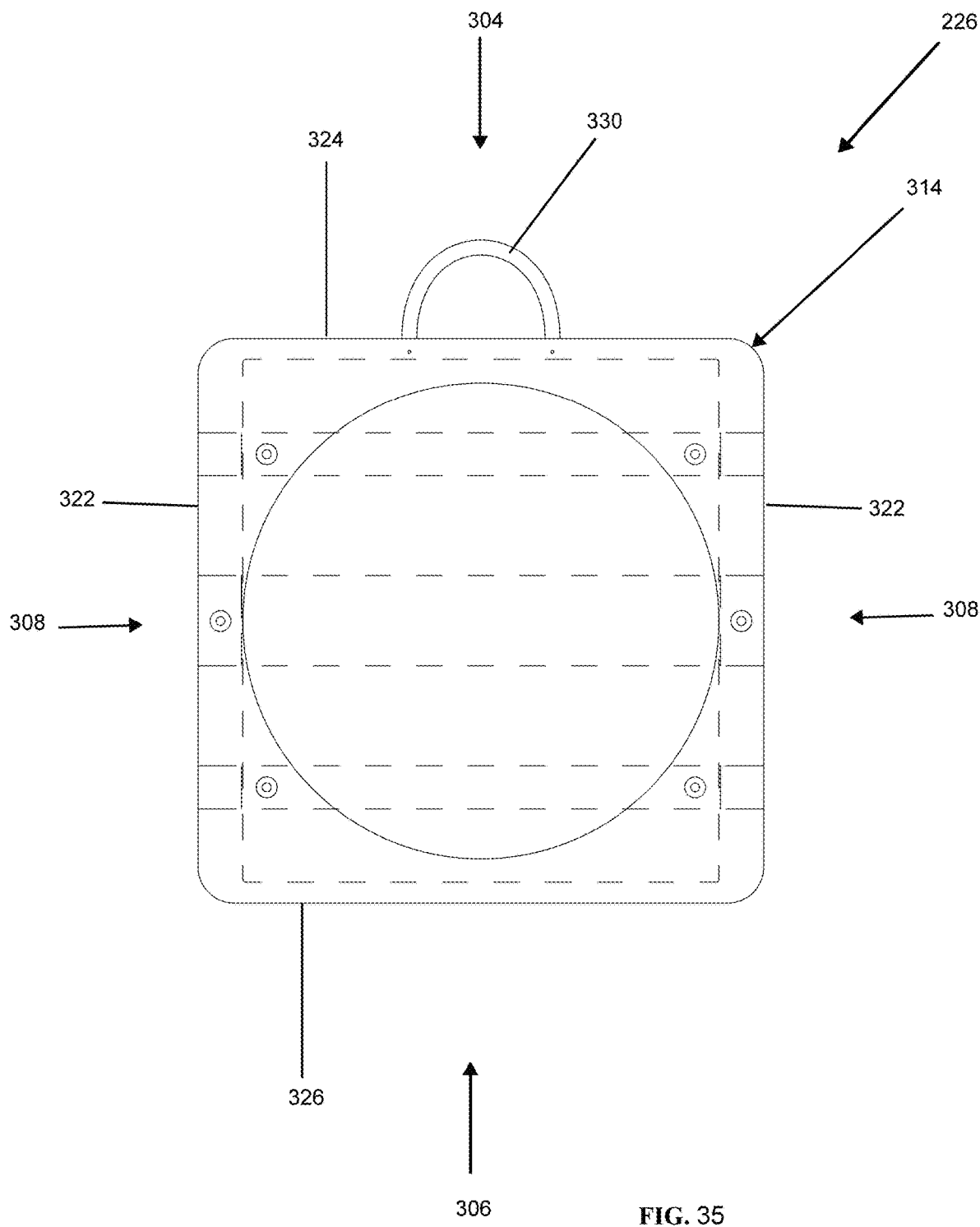
FIG. 35 is a top elevation view of an upper pad assembly for an interlocking outrigger pad support system, in accordance with one or more arrangements; the view showing the upper pad assembly having a front side, a back side, opposing left and right ends, and an upper pad having opposing left and right ends, a front surface, a back surface, and a handle.
Figure 36:
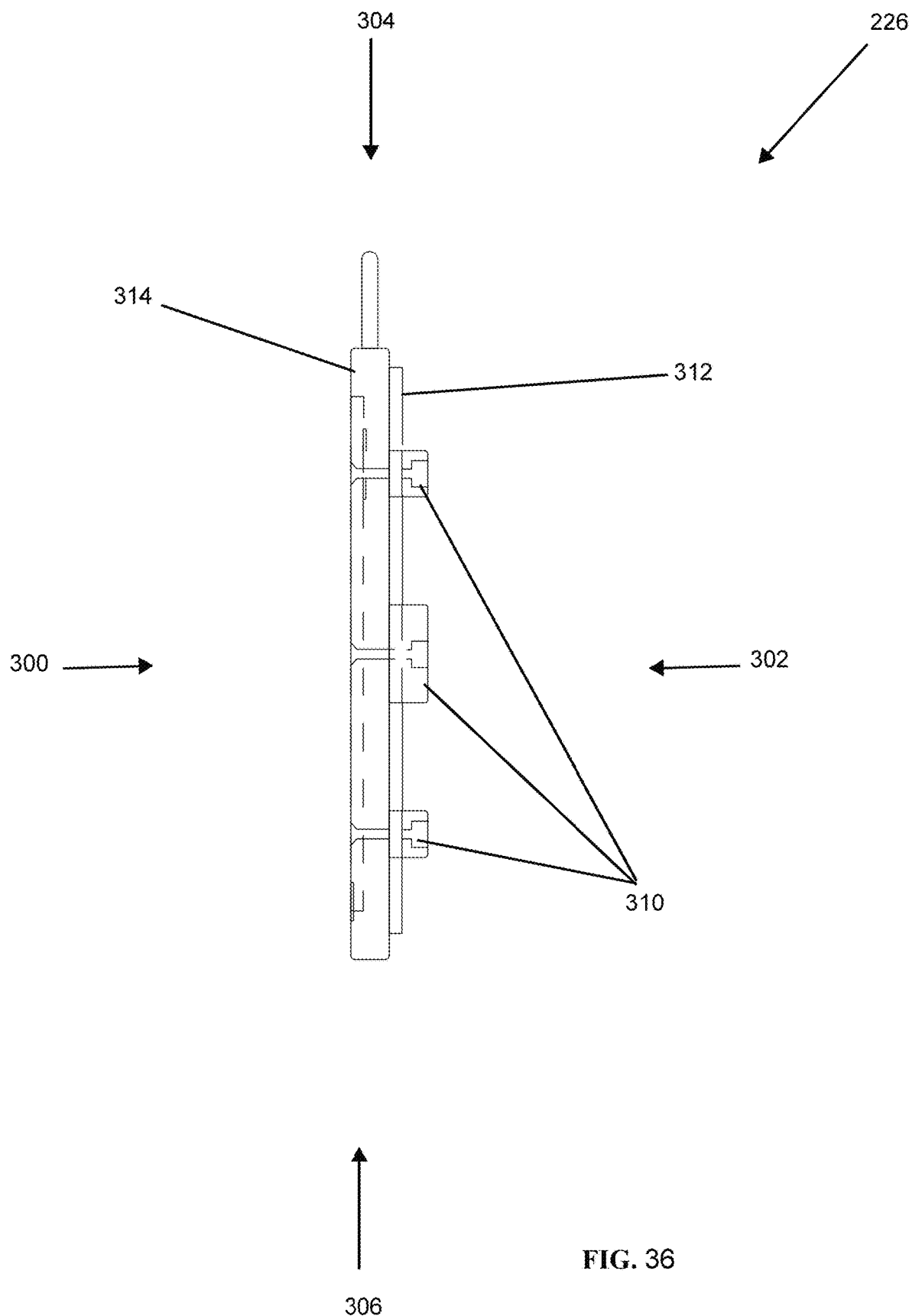
FIG. 36 is a side elevation view of an upper pad assembly for an interlocking outrigger pad support system, in accordance with one or more arrangements; the view showing the upper pad assembly having a top side, a bottom side, a front side, a back side, alignment features, an intermediate plate, and an upper pad.
Figure 37:
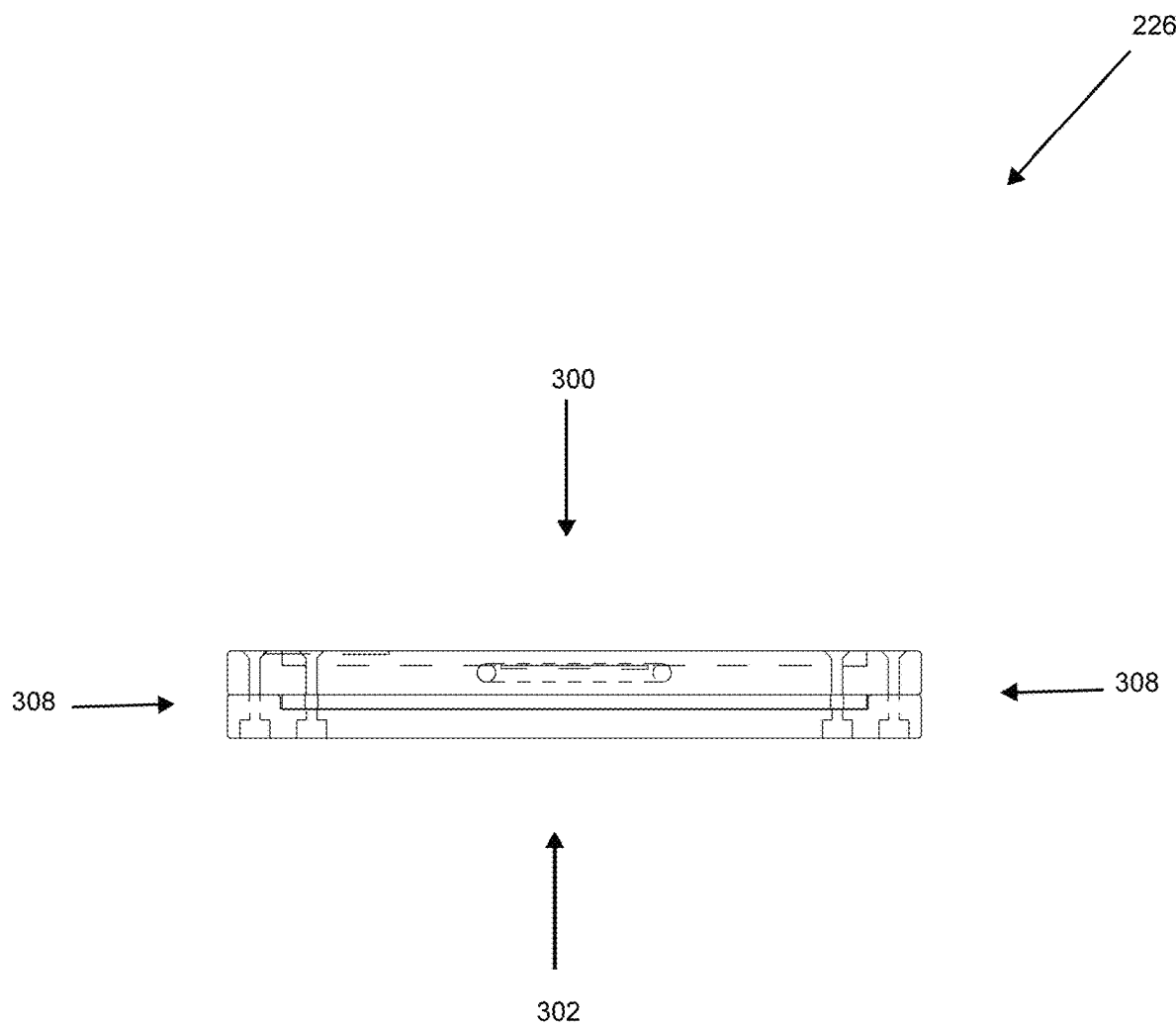
FIG. 37 is a front side elevation view of an upper pad assembly for an interlocking outrigger pad support system, in accordance with one or more arrangements; the view showing the upper pad assembly having a top side, a bottom side, and opposing left and right ends.
Figure 38:
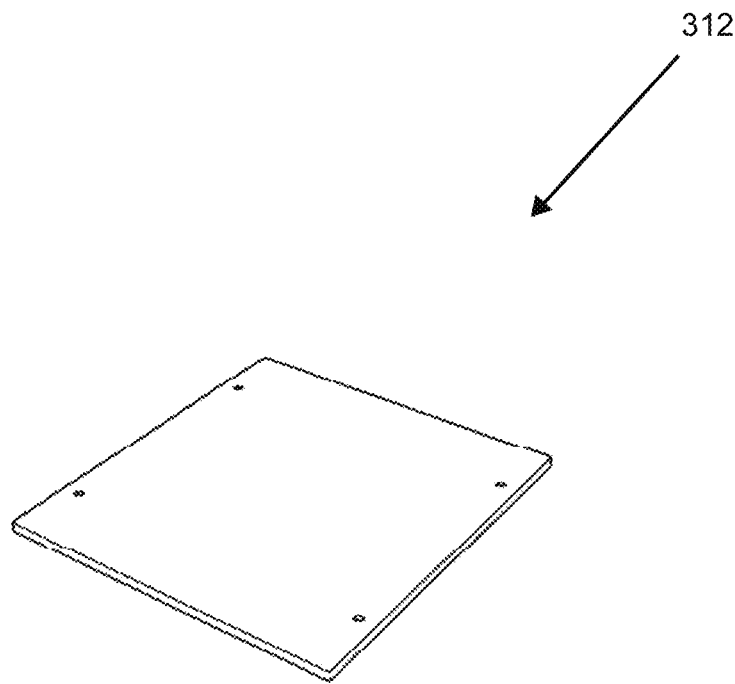
FIG. 38 is a perspective view of an intermediate plate of an upper pad assembly for an interlocking outrigger pad support system, in accordance with one or more arrangements.
Figure 39:
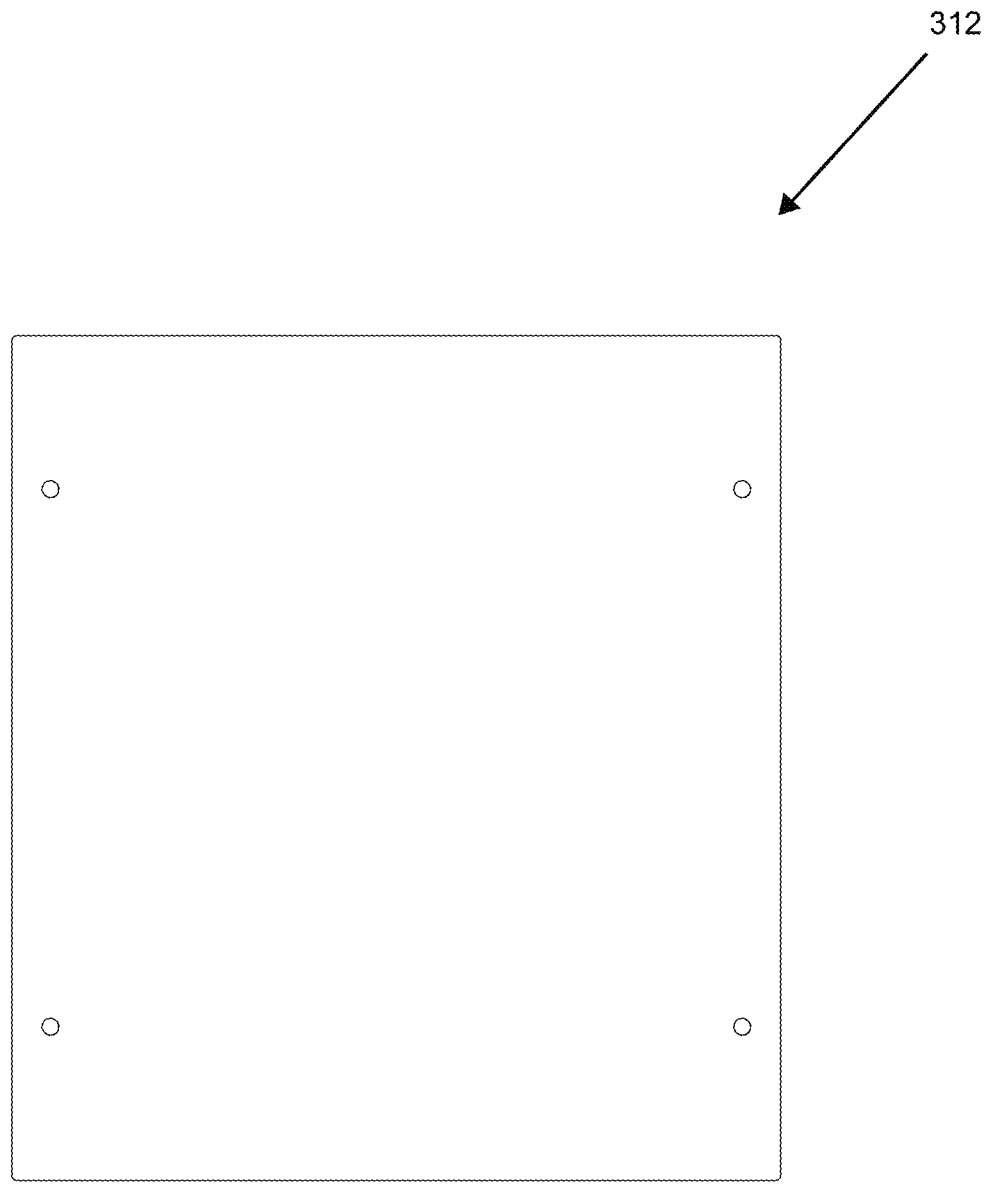
FIG. 39 is a top elevation view of an intermediate plate of an upper pad assembly for an interlocking outrigger pad support system, in accordance with one or more arrangements.
Figure 40:
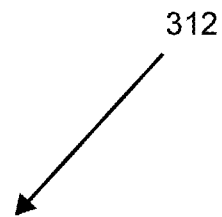
FIG. 40 is a front side elevation view of an intermediate plate of an upper pad assembly for an interlocking outrigger pad support system, in accordance with one or more arrangements.
Figure 41A:
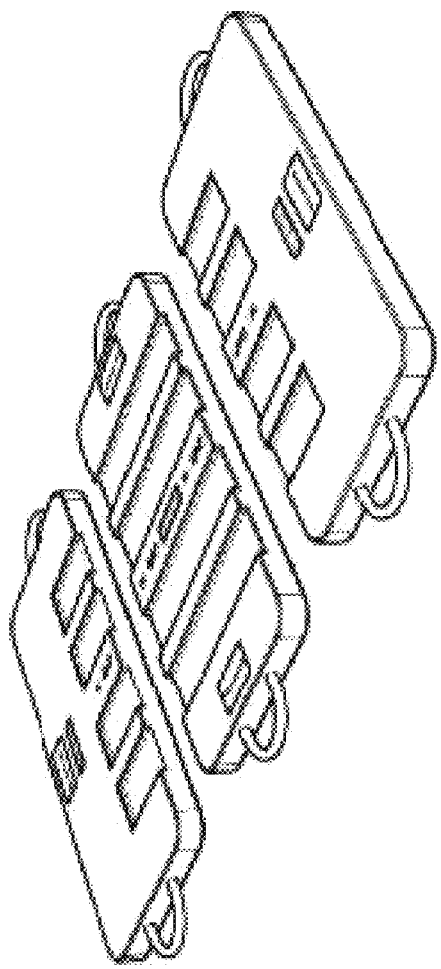
FIG. 41A is a perspective view of the base pad assembly for an interlocking outrigger pad support system, in accordance with one or more arrangements the view showing the base pad assembly having a first end pad, a center pad, and a second end pad.
Figure 41B:
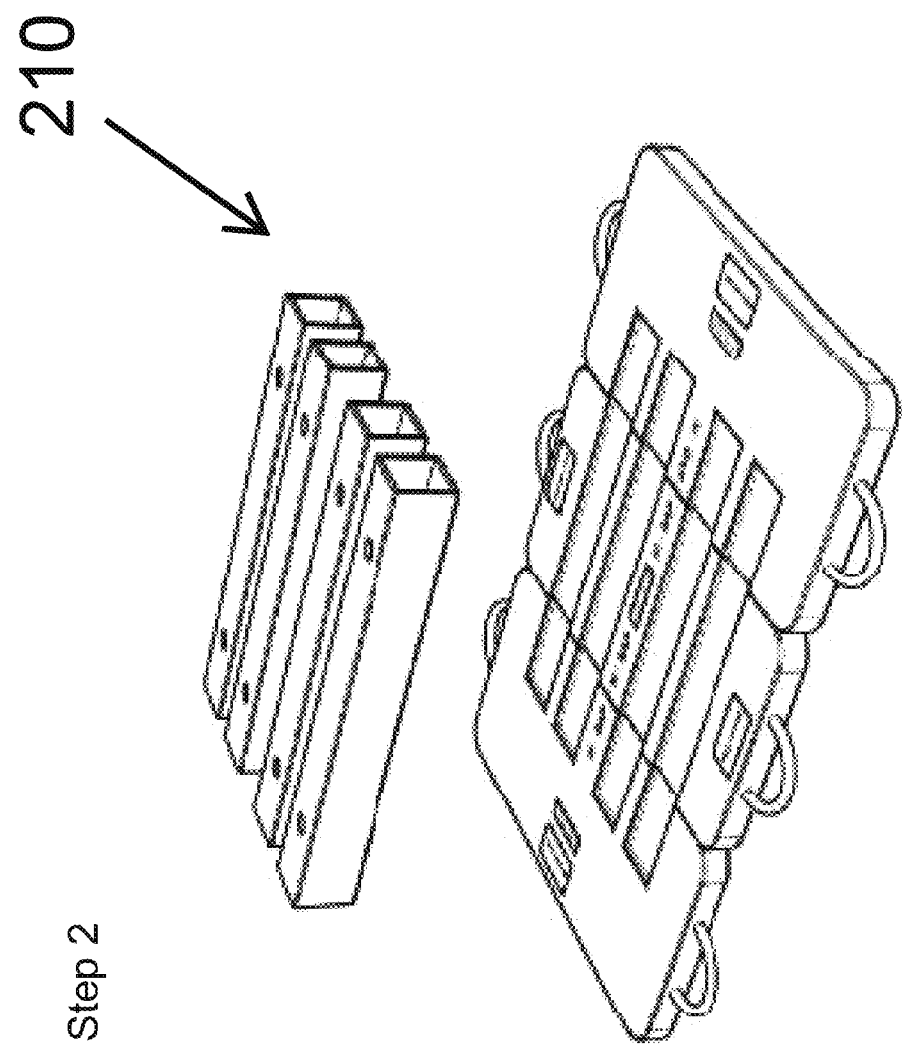
FIG. 41B is an exploded view of an interlocking outrigger pad support system, in accordance with one or more arrangements; the view showing a base pad assembly exploded from a support layer.
Figure 41C:
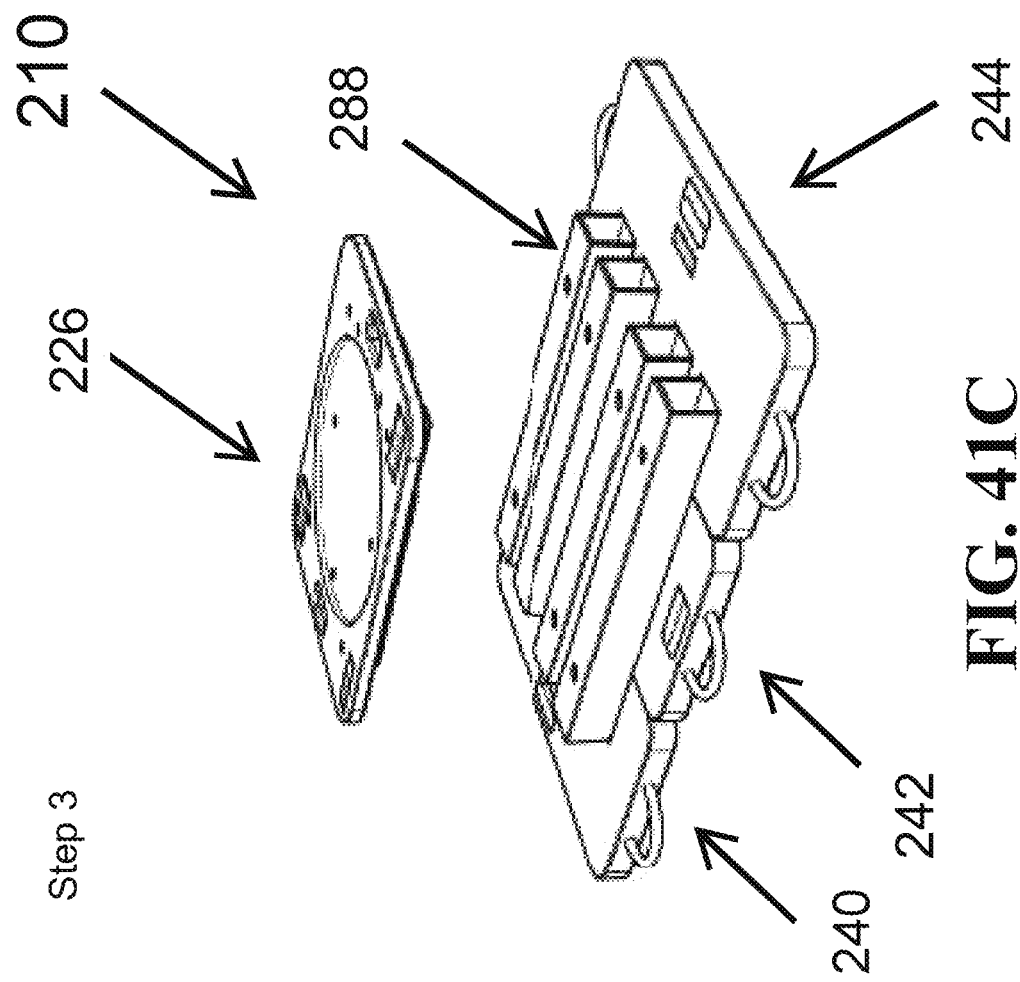
FIG. 41C is an exploded view of an interlocking outrigger pad support system, in accordance with one or more arrangements; the view showing a base pad assembly, a support layer engaged with the base pad assembly, and an upper pad assembly exploded from the base pad assembly and the support layer.
Figure 41D:
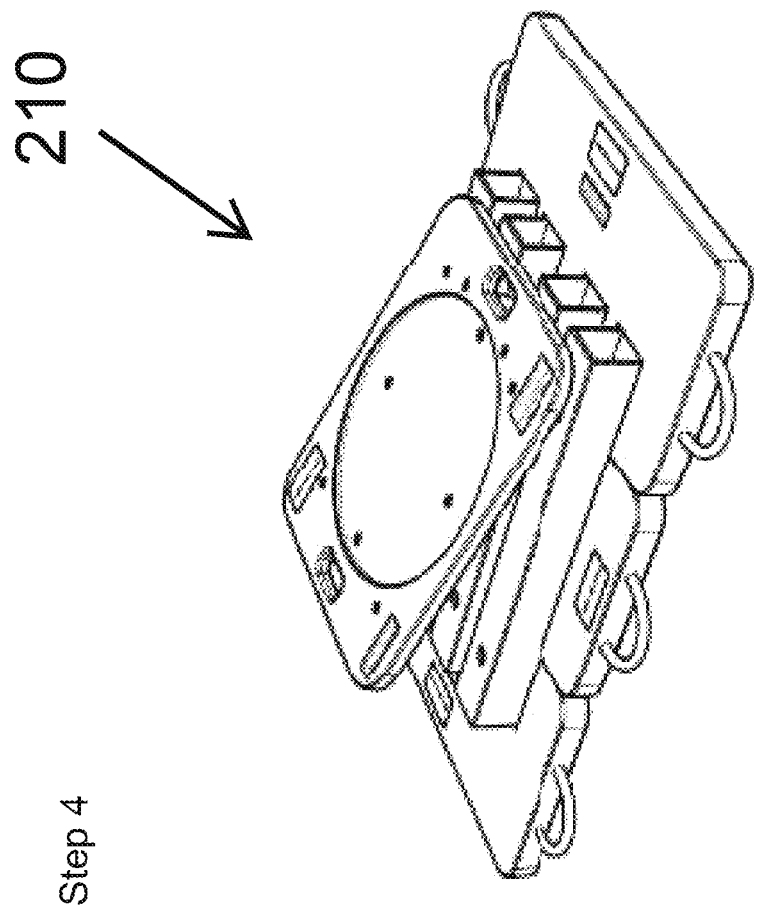
FIG. 41D is a perspective view of an interlocking outrigger pad support system, in accordance with one or more arrangements; the view showing a base pad assembly, a support layer engaged with the base pad assembly, and an upper pad assembly partially engaged with the support layer.
Figure 41E:
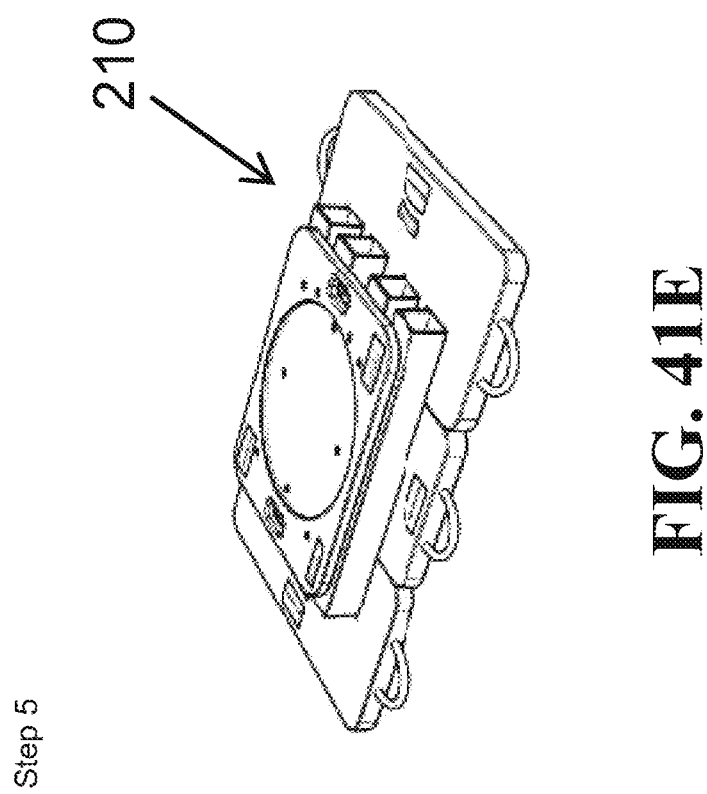
FIG. 41E is a perspective view of an interlocking outrigger pad support system, in accordance with one or more arrangements; the view showing a base pad assembly, a support layer engaged with the base pad assembly, and an upper pad assembly engaged with the support layer.
Figure 41F:
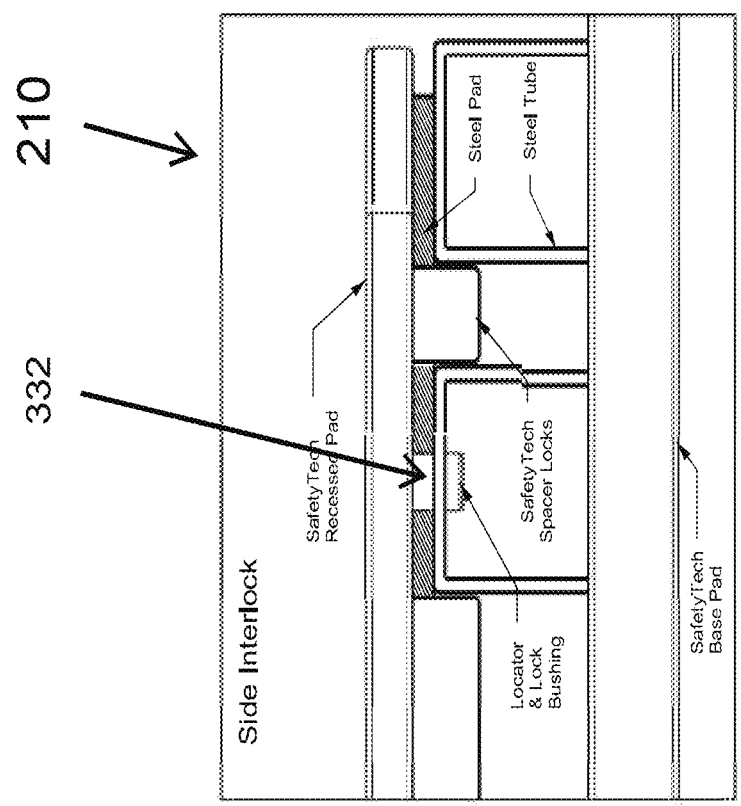
FIG. 41F is a partial close of up view of the side of an interlocking outrigger pad support system, in accordance with one or more arrangements; the view showing a base pad assembly, a support layer engaged with the base pad assembly, and an upper pad assembly engaging with the support layer using both the alignment features of the upper pad and the mating features of the upper pad.
Figure 42A:
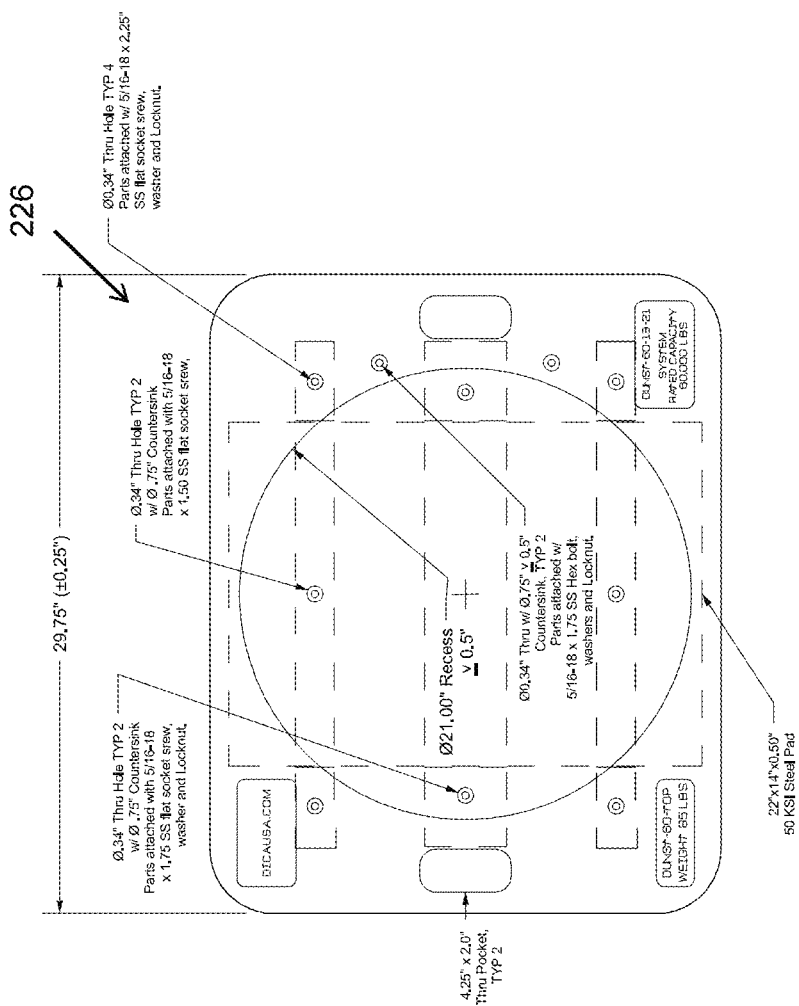
FIG. 42A is an elevation view of an upper pad assembly for an interlocking outrigger pad support system, in accordance with one or more arrangements.
Figure 42B:
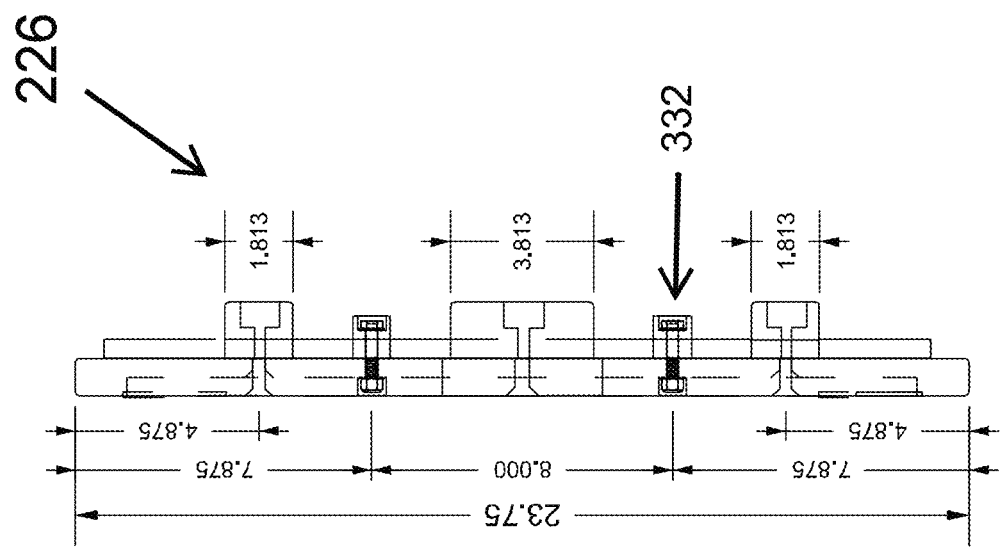
FIG. 42B is a plan view of an upper pad assembly for an interlocking outrigger pad support system, in accordance with one or more arrangements; the view showing the upper pad assembly having alignment features and mating features.
Figure 42C:
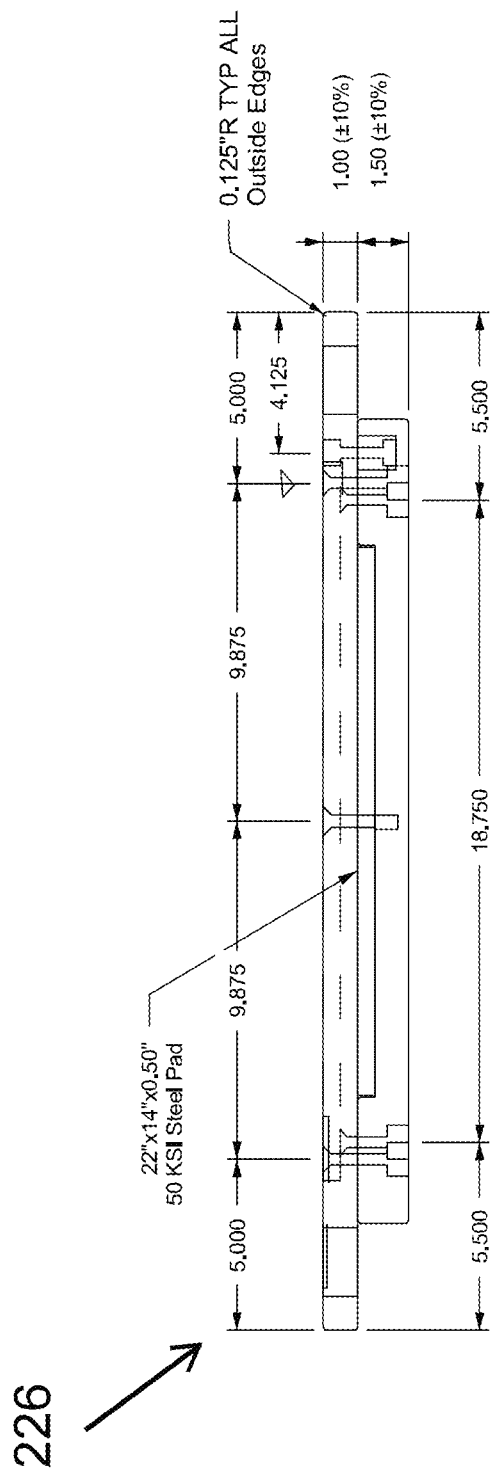
FIG. 42C is a plan view of an upper pad assembly for an interlocking outrigger pad support system, in accordance with one or more arrangements.
Figure 42D:
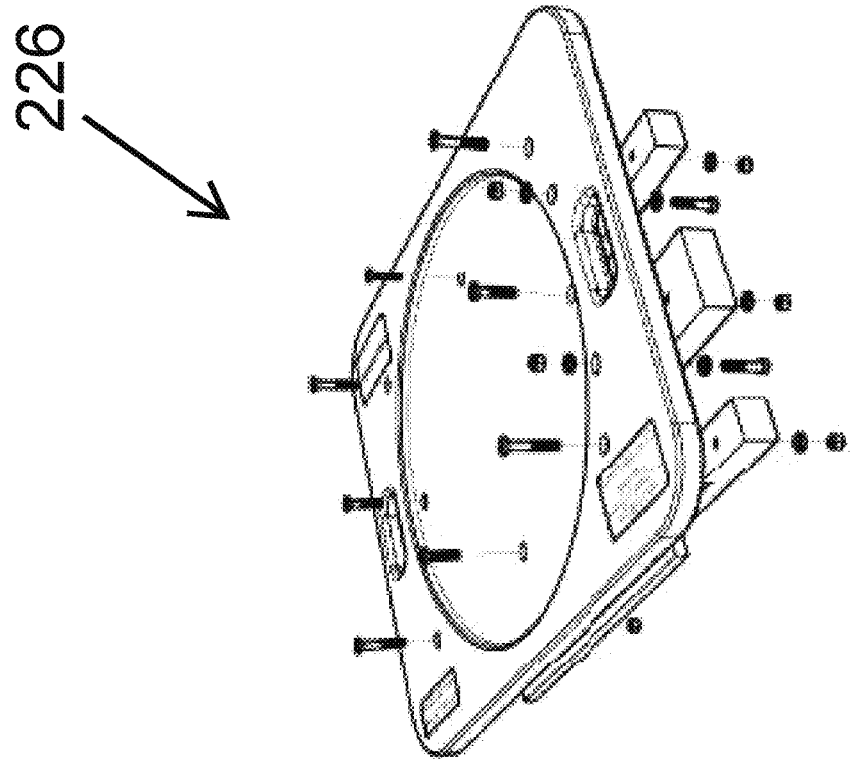
FIG. 42D is an exploded view of an upper pad assembly for an interlocking outrigger pad support system, in accordance with one or more arrangements; the view showing an upper pad and an intermediate plate exploded from alignment features of the upper pad assembly.
Figure 43A:
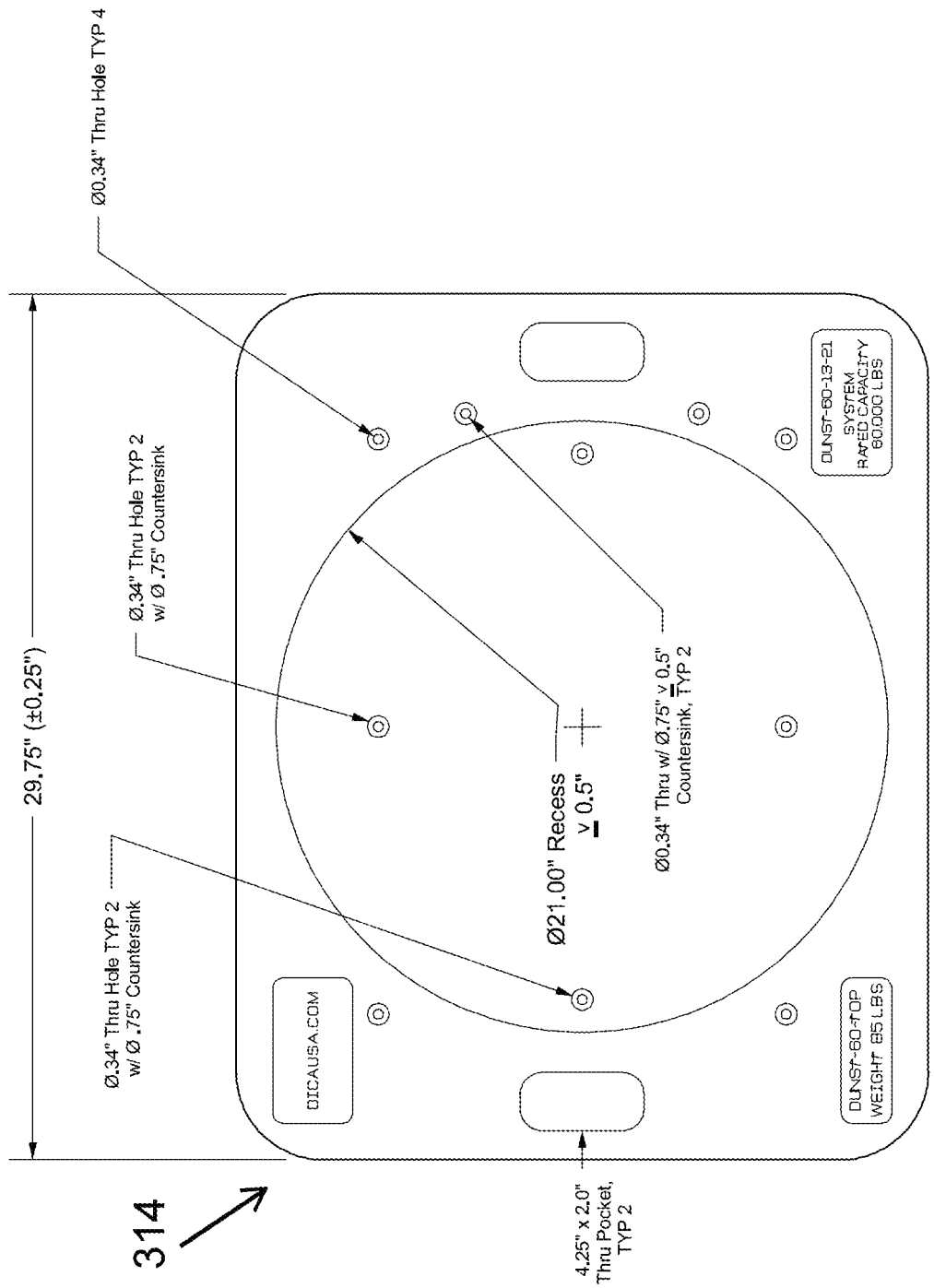
FIG. 43A is an elevation view of an upper pad for an interlocking outrigger pad support system, in accordance with one or more arrangements.
Figure 43B:
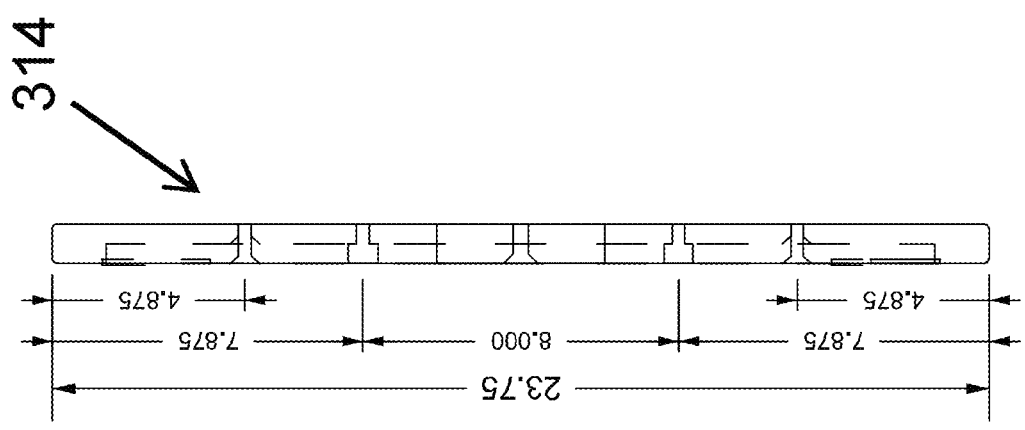
FIG. 43B is a plan view of an upper pad for an interlocking outrigger pad support system, in accordance with one or more arrangements.
Figure 43C:
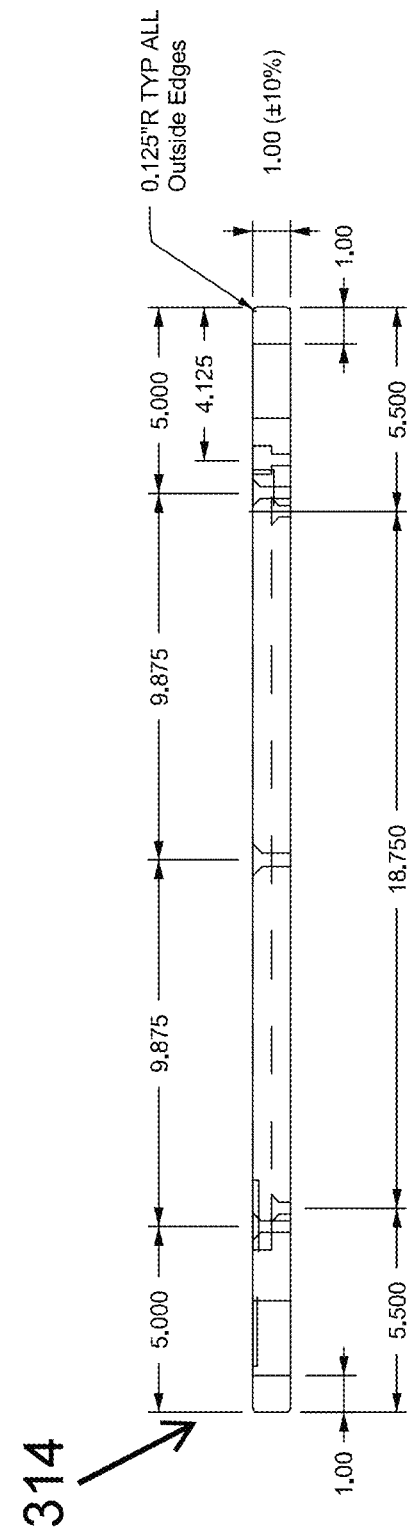
FIG. 43C is a plan view of an upper pad for an interlocking outrigger pad support system, in accordance with one or more arrangements.
Figure 43D:
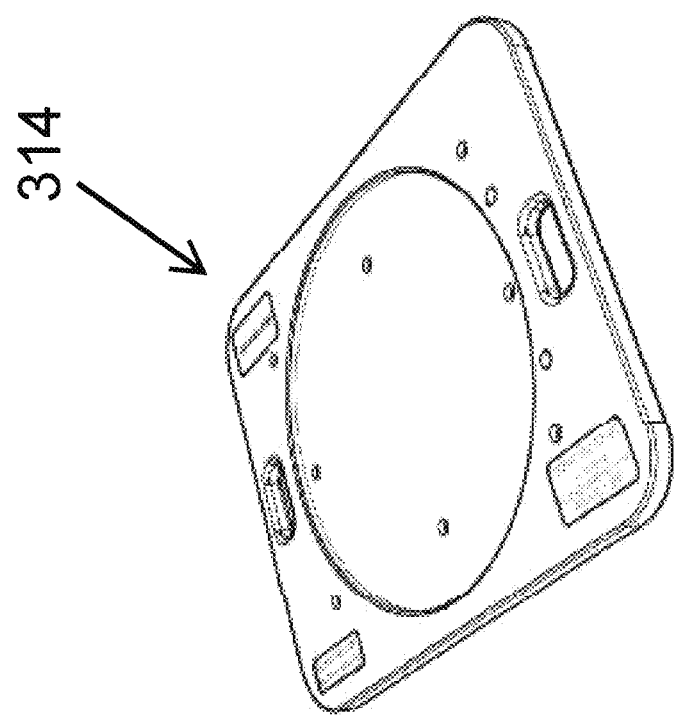
FIG. 43D is a perspective view of an upper pad for an interlocking outrigger pad support system, in accordance with one or more arrangements; the view showing the upper pad having a top surface.
Figure 43E:
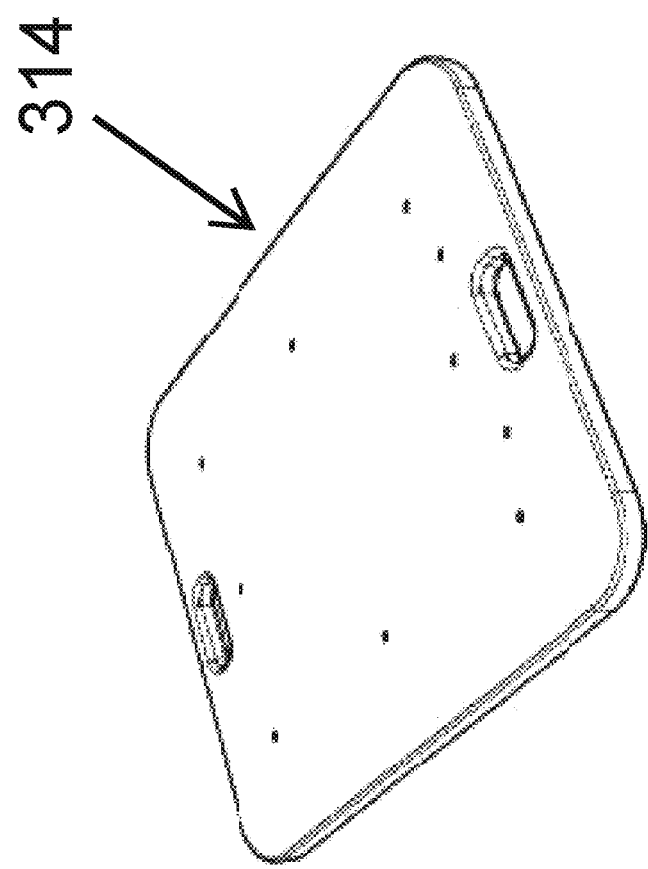
FIG. 43E is a perspective view of an upper pad for an interlocking outrigger pad support system, in accordance with one or more arrangements; the view showing the upper pad having a bottom surface.
Figure 44A:
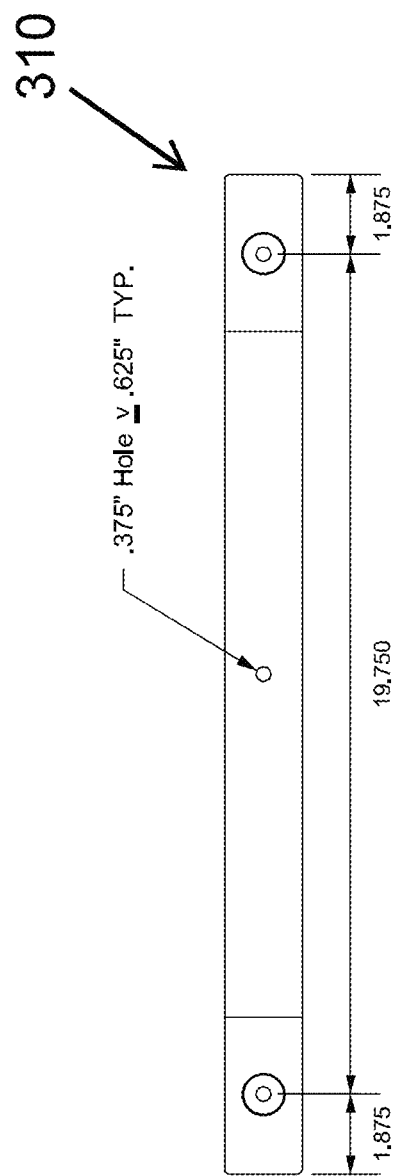
FIG. 44A is a plan view of an alignment feature of the upper pad assembly for an interlocking outrigger pad support system, in accordance with one or more arrangements.
Figure 44B:
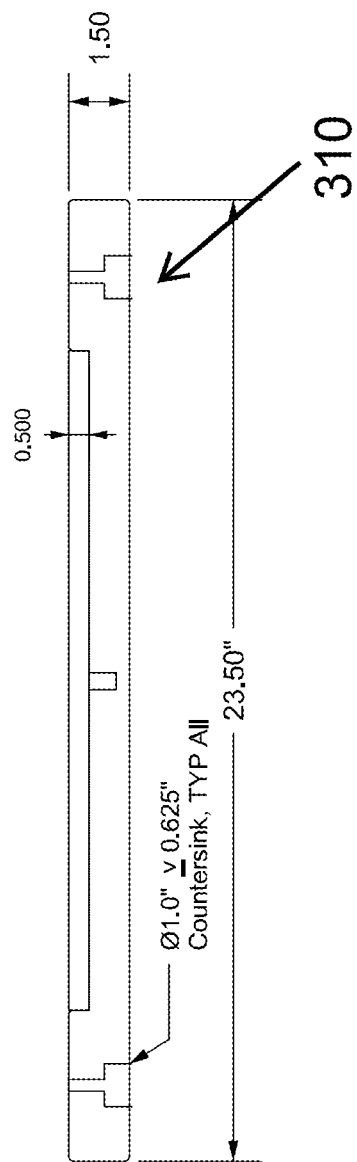
FIG. 44B is a plan view of an alignment feature of the upper pad assembly for an interlocking outrigger pad support system, in accordance with one or more arrangements.
Figure 44C:
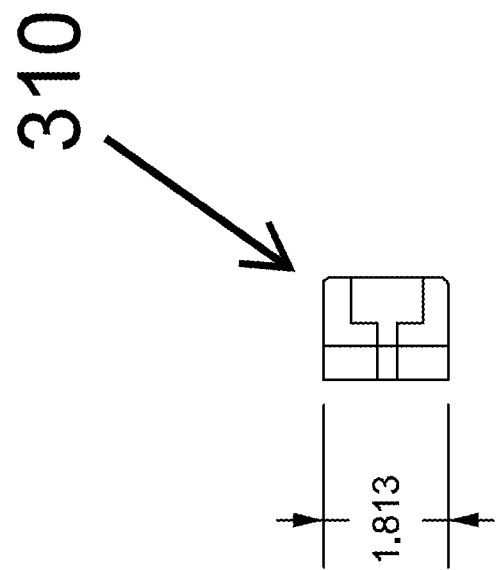
FIG. 44C is a partial plan view of an alignment feature of the upper pad assembly for an interlocking outrigger pad support system, in accordance with one or more arrangements.
Figure 44D:
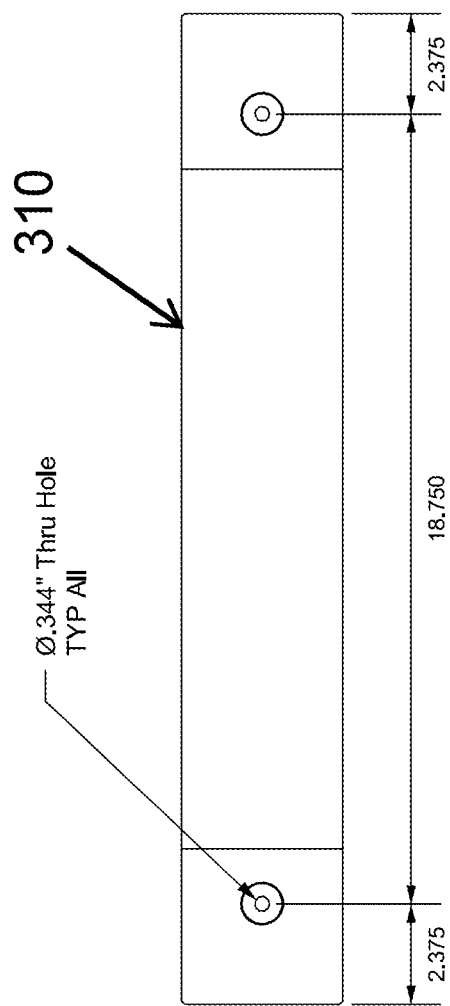
FIG. 44D is a plan view of an alignment feature of the upper pad assembly for an interlocking outrigger pad support system, in accordance with one or more arrangements.
Figure 44E:
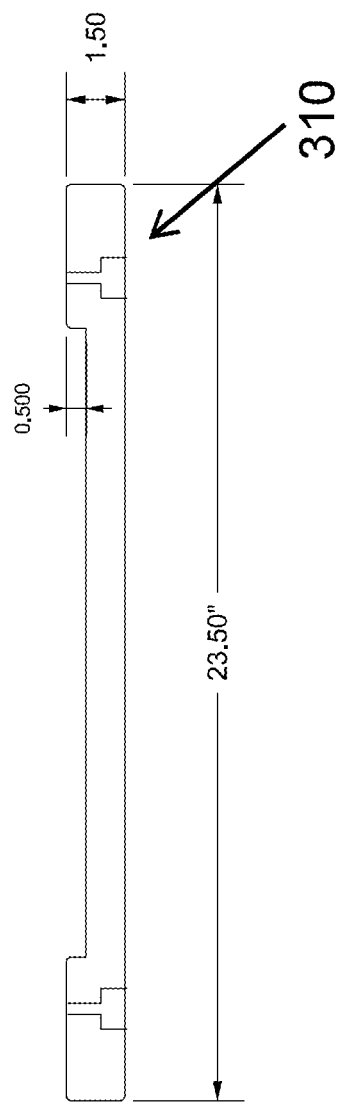
FIG. 44E is a plan view of an alignment feature of the upper pad assembly for an interlocking outrigger pad support system, in accordance with one or more arrangements.
Figure 44G:
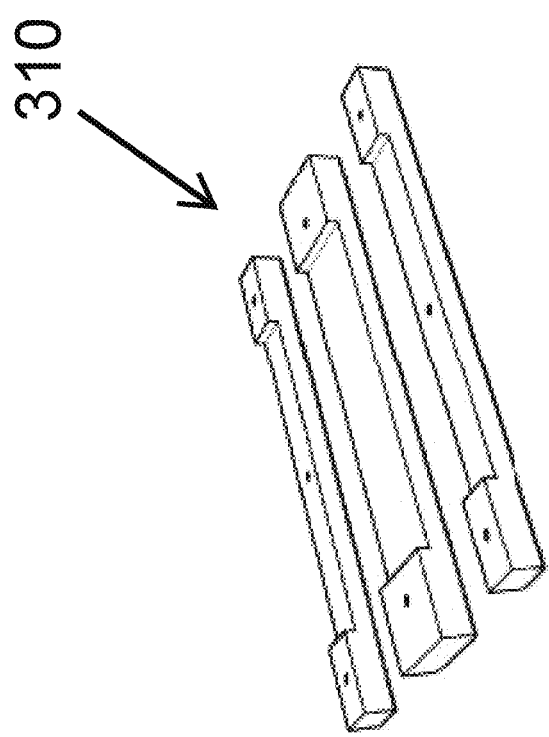
FIG. 44G is a perspective view of alignment features of the upper pad assembly for an interlocking outrigger pad support system, in accordance with one or more arrangements.
Figure 44H:
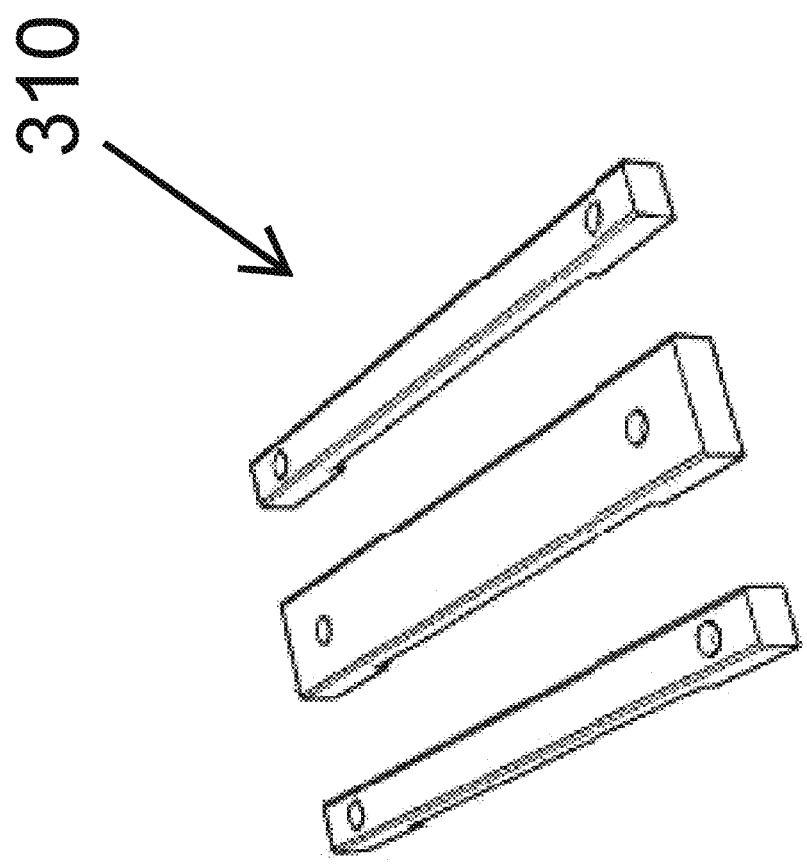
FIG. 44H is a perspective view of alignment features of the upper pad assembly for an interlocking outrigger pad support system, in accordance with one or more arrangements.
Figure 45A:
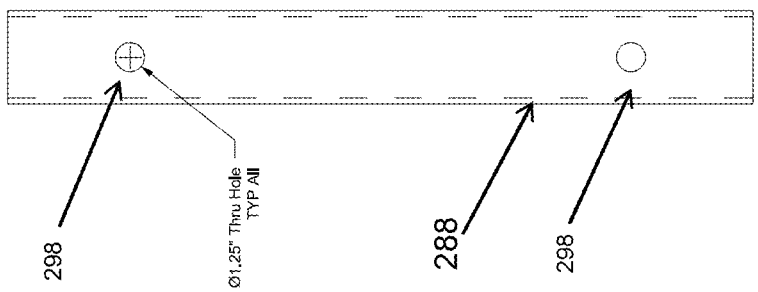
FIG. 45A is an elevation view of an elongated member of the support layer for an interlocking outrigger pad support system, in accordance with one or more arrangements; the view showing the elongated member having mating features.
Figure 45B:
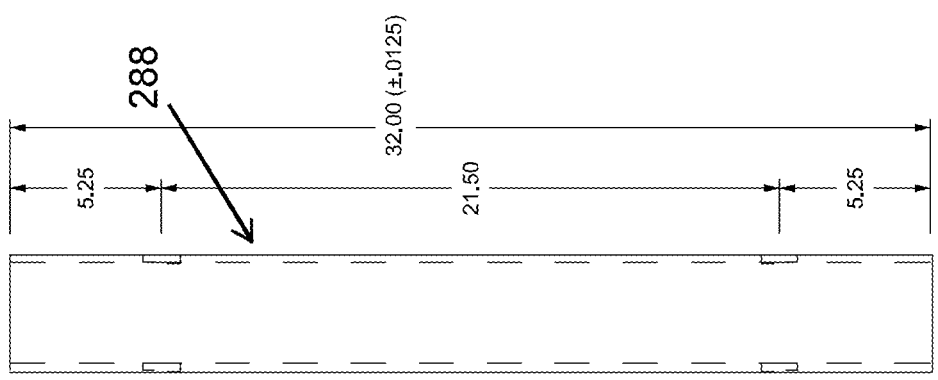
FIG. 45B is an elevation view of an elongated member of a support layer for an interlocking outrigger pad support system, in accordance with one or more arrangements.
Figure 45C:
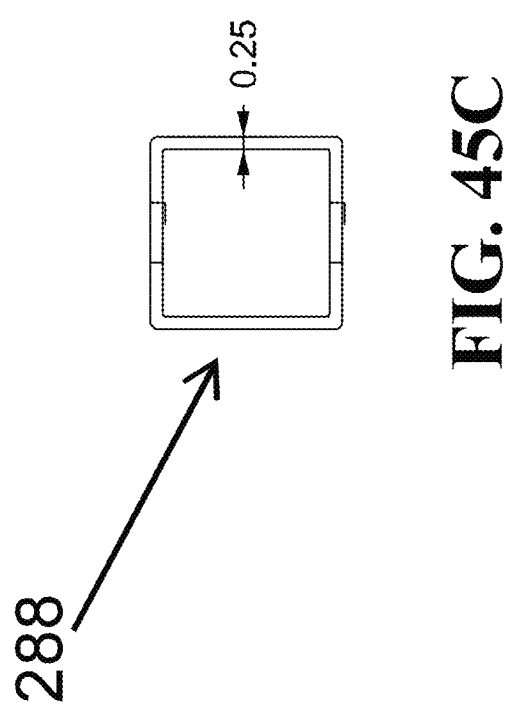
FIG. 45C is a side view of an elongated member of a support layer for an interlocking outrigger pad support system, in accordance with one or more arrangements.
Figure 45D:
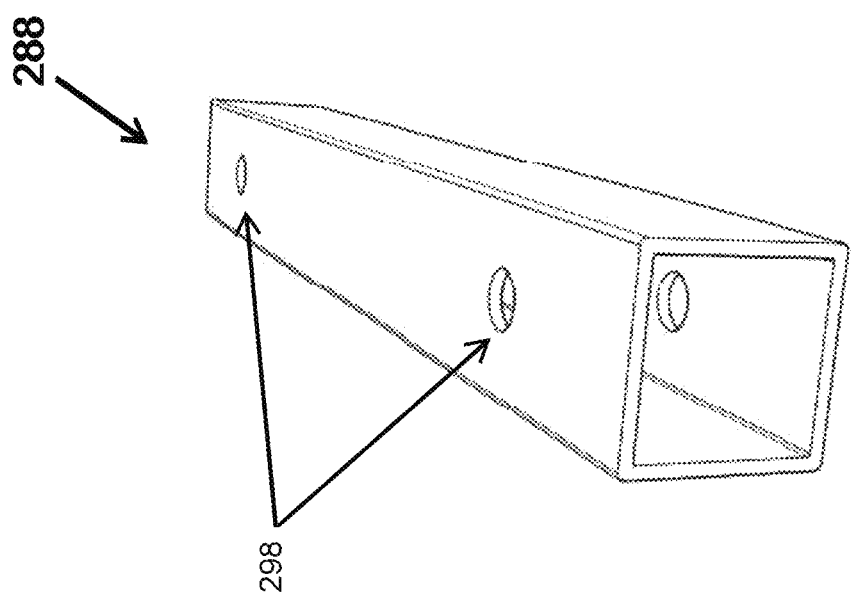
FIG. 45D is a perspective view of an elongated member of a support layer for an interlocking outrigger pad support system, in accordance with one or more arrangements; the view showing the elongated member having mating features.
Figure 46A:
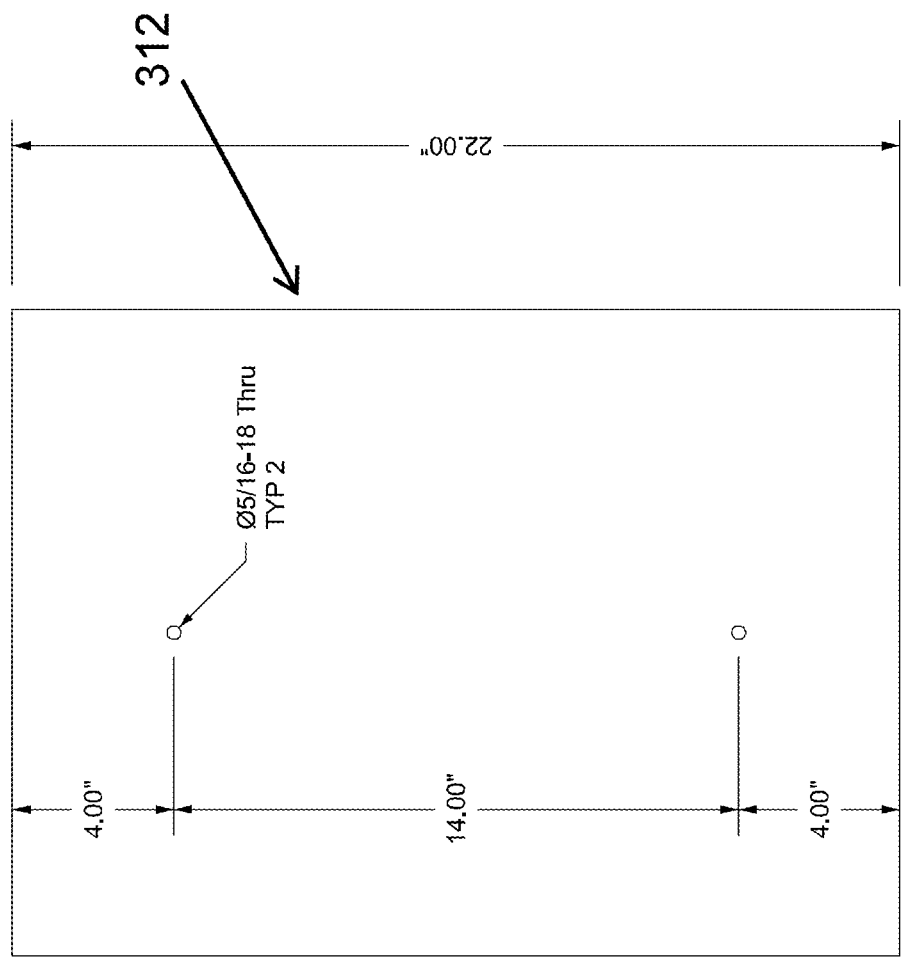
FIG. 46A is an elevation view of an intermediate plate of the upper pad assembly for an interlocking outrigger pad support system, in accordance with one or more arrangements.
Figure 46B:
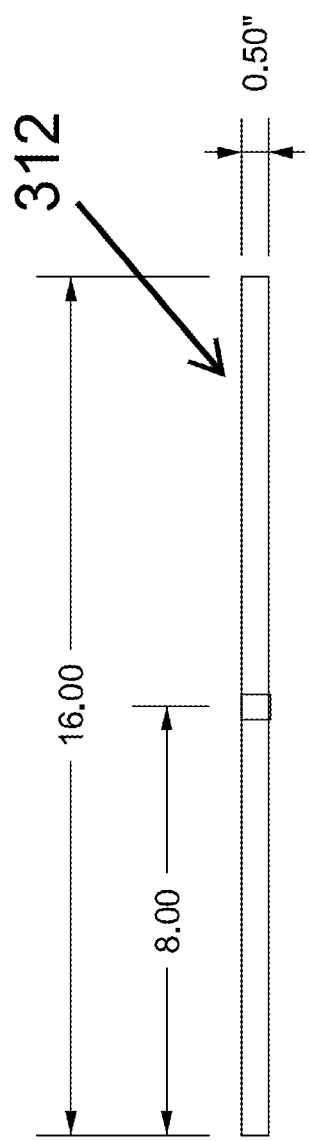
FIG. 46B is a plan view of an intermediate plate of the upper pad assembly for an interlocking outrigger pad support system, in accordance with one or more arrangements.
Figure 46C:
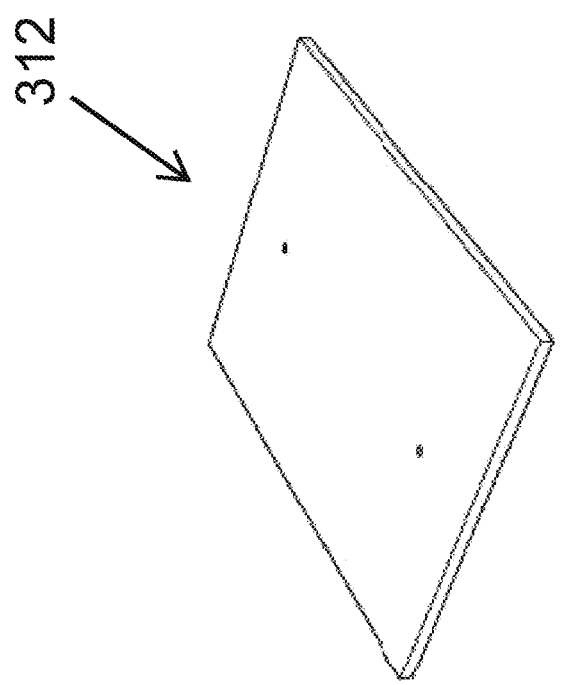
FIG. 46C is a perspective view of an intermediate plate of the upper pad assembly for an interlocking outrigger pad support system, in accordance with one or more arrangements.
Figure 47A:
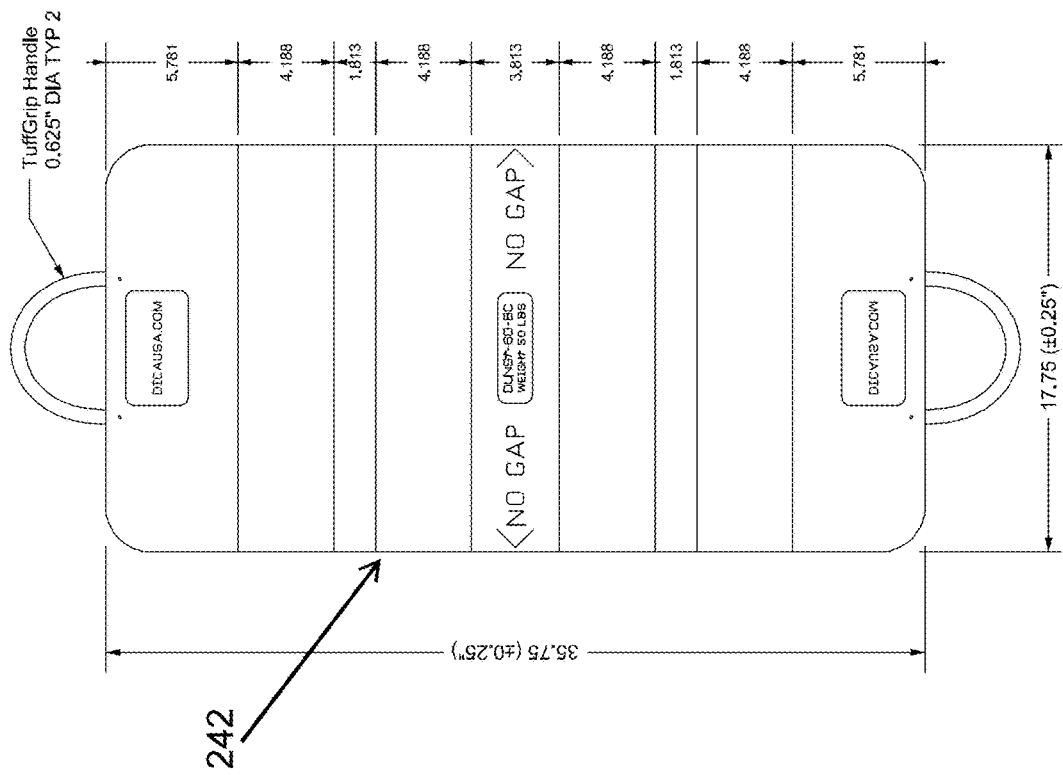
FIG. 47A is an elevation view of a center pad of the base pad assembly for an interlocking outrigger pad support system, in accordance with one or more arrangements.
Figure 47B:
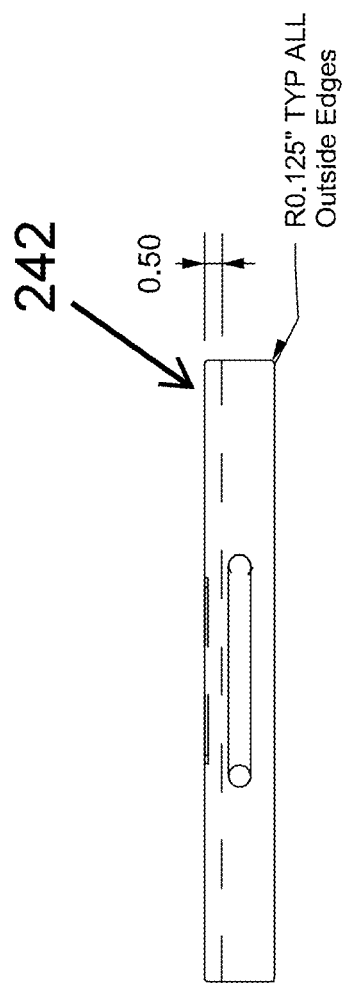
FIG. 47B is a front side elevation view of a center pad of the base pad assembly for an interlocking outrigger pad support system, in accordance with one or more arrangements.
Figure 47C:
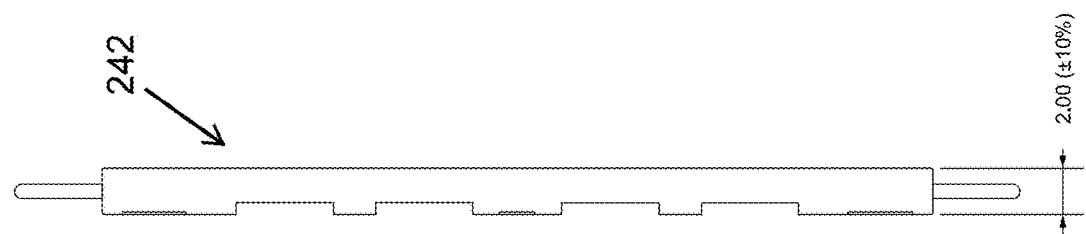
FIG. 47C is a side elevation view of a center pad of the base pad assembly for an interlocking outrigger pad support system, in accordance with one or more arrangements.
Figure 47D:
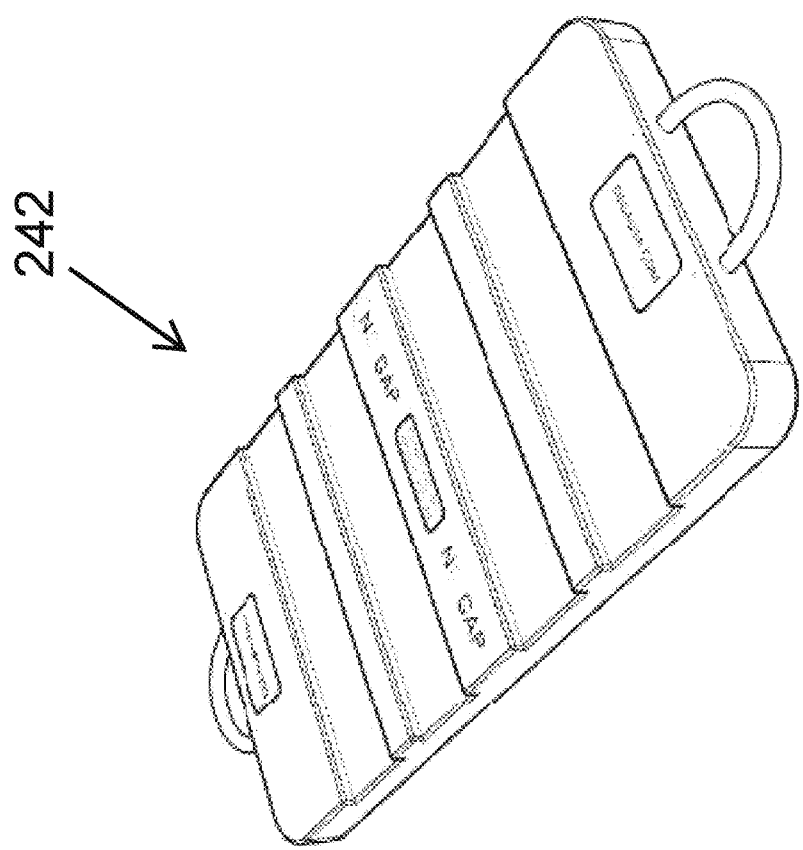
FIG. 47D is a perspective view of a center pad of the base pad assembly for an interlocking outrigger pad support system, in accordance with one or more arrangements.
Figure 48A:
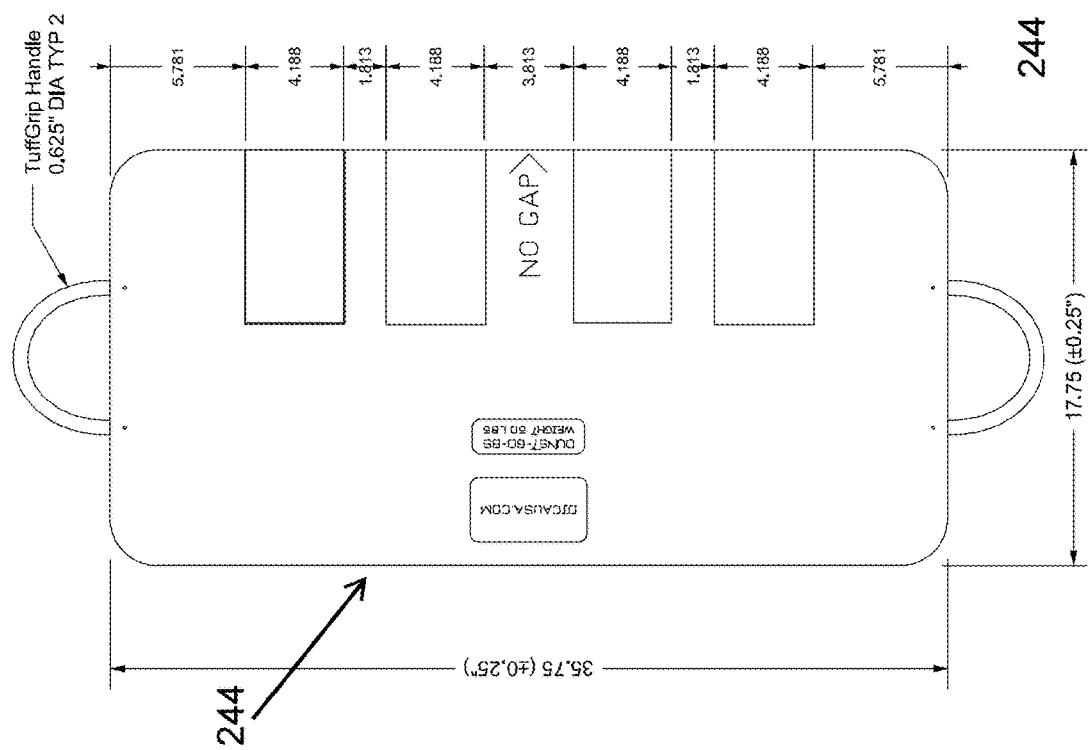
FIG. 48A is an elevation view of a second end pad of the base pad assembly for an interlocking outrigger pad support system, in accordance with one or more arrangements.
Figure 48B:
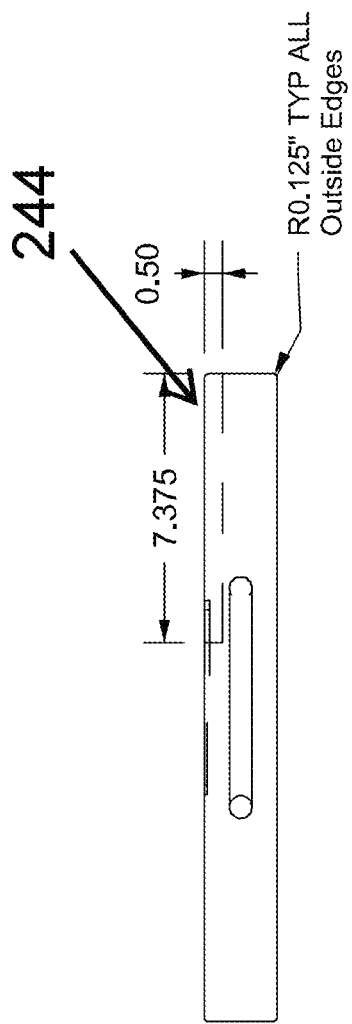
FIG. 48B is a front side elevation view of a second end pad of the base pad assembly for an interlocking outrigger pad support system, in accordance with one or more arrangements.
Figure 48C:
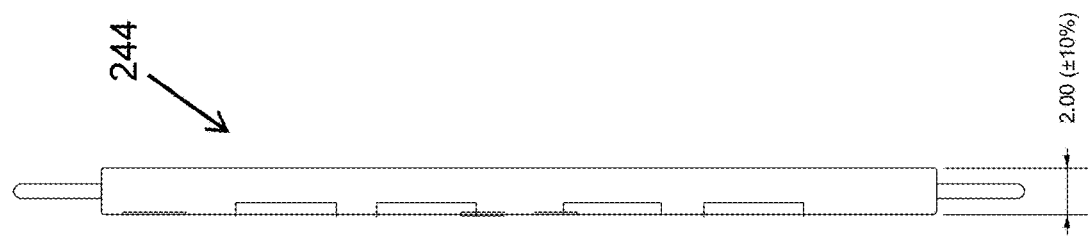
FIG. 48C is a side elevation view of a second end pad of the base pad assembly for an interlocking outrigger pad support system, in accordance with one or more arrangements.
Figure 48D:
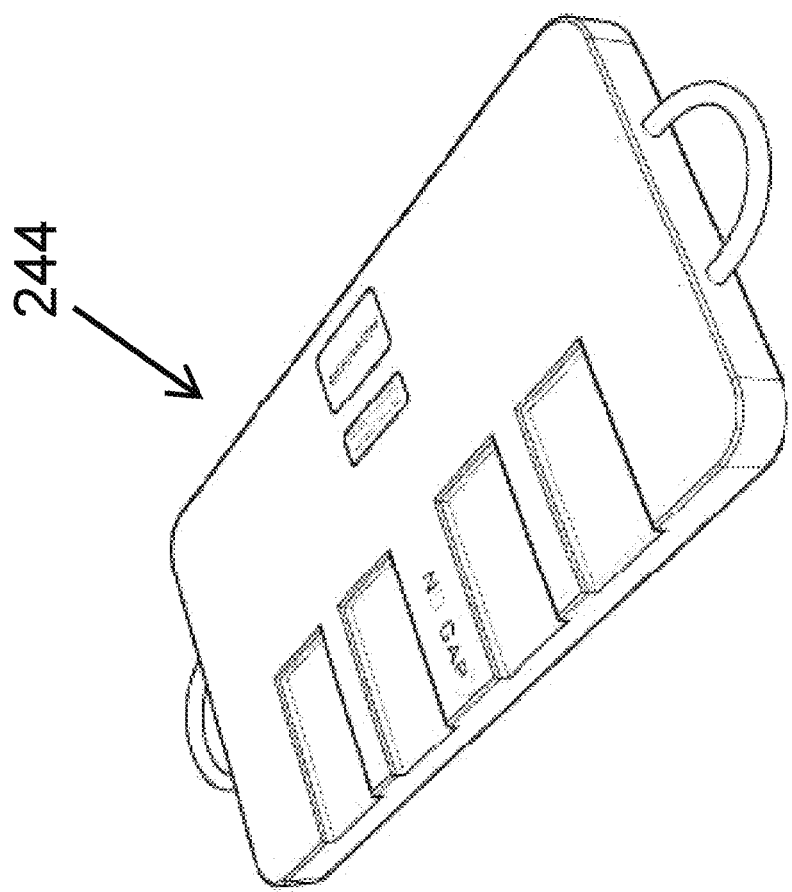
FIG. 48D is a perspective view of a second end pad of the base pad assembly for an interlocking outrigger pad support system, in accordance with one or more arrangements.

With reference to FIGS. 14-55, an interlocking outrigger pad support system 210 (or simply "system 210") is presented. System 210 is formed of any suitable size, shape, and design and is configured to provide support for outriggers or feet of machinery, vehicles, or equipment. In the arrangement shown, as one example, system 210 has a top side 212, a bottom side 214, a front side 216, a back side 218, and opposing left and right ends 220 (or simply "ends 220"). In the arrangement shown, as one example, system 210 includes a base pad assembly 222, a support layer 224, and an upper pad assembly 226, among other components described herein. While system 210 has been described according to the arrangement shown, as one example, any combination, size, shape, design, or arrangement may be used and is hereby contemplated for use as system 210.

Base Pad Assembly 222:

In the arrangement shown, as one example, system 210 includes base pad assembly 222. Base pad assembly 222 is formed of any suitable size, shape, and design and is configured to provide support to support layer 224 and distribute weight of support layer 224 over the respective area of base pad assembly 222 (in order to increase the surface area of engagement and to increase the surface area of weight distribution). In the arrangement shown, as one example, base pad assembly 222 has a top side 230, a bottom side 232, opposing front and back sides 234 (or simply "sides 234"), and opposing left and right ends 236 (or simply "ends 236"). In the arrangement shown, as one example, base pad assembly 222 is formed of a first end pad 240, a center pad 242, and a second end pad 244. In the arrangement shown, as one example, first end pad 240, center end pad 242, and second end pad 244 are arranged in an end-to-end linear alignment to form base pad assembly 222. Or, said another way, first end pad 240, center end pad 242, and second end pad 244 are aligned in a straight line so as to form an elongated base pad assembly 222. In this arrangement, alignment features 256 extend similarly across all linearly aligned pads. That is, when first end pad 240, center end pad 242, and second end pad 244 are linearly aligned in an end-to-end arrangement, where alignment feature 256 ends in one base pad, the alignment feature 256 continues in the next base pad. In this way, the linear alignment of first end pad 240, center end pad 242, and second end pad 244 along with the aligned alignment feature 256 lock the linearly aligned first end pad 240, center end pad 242, and second end pad 244 in a linear alignment, or straight alignment when elongated members 288 of support layer 224 are placed in the alignment features 256, as is further described herein. While, in the arrangement shown, three pads are shown in this linear alignment, or end-to-end alignment, any number of pads are hereby contemplated for use, such as 4 pads, 5 pads, 6 pads, 7 pads, 8 pads, 9 pads 10 pads or more. Also, it is hereby contemplated that two, three or more rows of linear-aligned pads may be used to form a larger base pad assembly 222. In one or more arrangements, as one example, system 210 is configured to support up to 60,000 pounds and base pad assembly 222 is configured to be 13 $ft^2$, over which the weight is distributed. In another arrangement, as one example, system 210 is configured to support up to 110,000 pounds and base pad assembly 222 is configured to be 18 $ft^2$, over which the weight is distributed. However, the embodiment is not so limited and in some various other arrangements, any other size of base pad assembly 222 may be used in order to effectively and safely distribute the weight being supported by system 210.

First end pad 240: In the arrangement shown, as one example, base pad assembly 222 includes first end pad 240. First end pad 240 is formed of any suitable size, shape, and design and is configured to distribute weight of support layer 224 over the respective area of first end pad 240 (in order to increase the surface area of engagement and to increase the surface area of weight distribution). In the arrangement shown, as one example, first end pad 240 includes a top surface 246, a bottom surface 248, an exterior end 250, an interior end 252, and opposing front and back surfaces 254.

In the arrangement shown, as one example, when viewed from top side 212, first end pad 240 is generally rectangular in shape, with exterior end 250 and interior end 252 extending in approximate parallel planar spaced relation to one another and in approximate perpendicular planar relation to the opposing front and back surfaces 254. In the arrangement shown, as one example, when viewed from an end 220, first end pad 240 is generally rectangular in shape, with top surface 246 and bottom surface 248 extending in approximate parallel planar spaced relation to one another and in approximate perpendicular planar relation to the opposing front and back surfaces 254. In the arrangement shown, as one example, when viewed from either front side 216 or back side 218, first end pad 240 is generally rectangular in shape, with top surface 246 and bottom surface 248 extending in approximate parallel planar spaced relation to one another and in approximate perpendicular planar relation to exterior end 250 and interior end 252.

Alignment Features 256: In the arrangement shown, as one example, top surface 246 of first end pad 240 is a generally flat and planar surface which extends a length between opposing front and back surfaces 254 and a width between exterior end 250 and interior end 252. In the arrangement shown, as one example the top surface 246 of first end pad 240 includes alignment features 256. Alignment features 256 are formed of any suitable size, shape, and design and are configured to receive and hold a portion of elongated members 288 of support layer 224 within alignment features 256. In the arrangement shown, as one example, alignment features 256 of first end pad 240 are recesses which extend downward from top surface 246 a depth. In the arrangement shown, as one example, alignment features 256 are generally rectangular recesses which extend a distance from interior end 252 towards exterior end 250. In the arrangement shown, as one example, the distance alignment features 256 extend is at or near half the distance between exterior end 250 and interior end 252.

In the arrangement shown, as one example, there are four alignment features 256 in the top surface 246 of first end pad 240 and each of the alignment features 256 extend in an approximately parallel manner relative to the other alignment features 256. However, the embodiment is not so limited and any other number of alignment features 256, or layout, design, or configuration of alignment features 256 may be used and is hereby contemplated for use. In the arrangement shown, as one example, two alignment features 256 are nearer to the front surface 254 and two alignment features 256 are nearer to the back surface 254. In the arrangement shown, as one example, the alignment features 256 in top surface 246 of first end pad 240 are configured to align with the alignment features 268 in top surface 260 of center pad 242 and the alignment features 282 in top surface 272 of second end pad 244. In this way, elongated members 288 of support layer 224 may extend across a distance of base pad assembly 222 that is greater than any one of first end pad 240, center pad 242, or second end pad 244.

Handles 258: In the arrangement shown, as one example, the opposing front and back surfaces 254 includes handles 258. Handles 258 are formed of any suitable size, shape, and design and are configured to facilitate easy transportation, setup, and disassembly of base pad assembly 222 of system 210 and handheld carrying of first end pad 240. In the arrangement shown, as one example, handles 258 are flexible loop type handles attached to both the front and back surfaces 254. However, embodiments are not so limited. Rather, it is contemplated that handles 258 may be implemented using various different types of rigid or flexible handles or handgrips including, but not limited to, loops, posts, knobs, holes, recesses, protrusions, and/or any other type of handle or handgrip.

In the arrangement shown, as one example, the opposing front and back surfaces 254 form a portion of the front and back sides 234 of base pad assembly 222. That is, the front surface 254 of first end pad 240 defines a portion of the front side 234 of base pad assembly 222 and the back surface 254 of first end pad 240 defines a portion of the back side 234 of base pad assembly 222.

In the arrangement shown, as one example, the exterior end 250 of first end pad 240 is also the first end of base pad assembly 222. That is, the exterior end 250 of first end pad 240 defines the exterior end on one end 236 of base pad assembly 222. In the arrangement shown, as one example, the interior end 252 of first end pad 240 is configured to connect with an end 264 of center pad 242.

Center Pad 242: In the arrangement shown, as one example, base pad assembly 222 includes center pad 242. Center pad 242 is formed of any suitable size, shape, and design and is configured to distribute weight of support layer 224 over the respective area of center pad 242 (in order to increase the surface area of engagement and to increase the surface area of weight distribution). In the arrangement shown, as one example, center pad 242 includes a top surface 260, a bottom surface 262, opposing left and right ends 264 (or simply "ends 264"), and opposing front and back surfaces 266.

In the arrangement shown, as one example, when viewed from top side 212, center pad 242 is generally rectangular in shape, with opposing left and right ends 264 extending in approximate parallel planar spaced relation to one another and in approximate perpendicular planar relation to the opposing front and back surfaces 266. In the arrangement shown, as one example, when viewed from an end 220, center pad 242 is generally rectangular in shape, with top surface 260 and bottom surface 262 extending in approximate parallel planar spaced relation to one another and in approximate perpendicular planar relation to the opposing front and back surfaces 266. In the arrangement shown, as one example, when viewed from either front side 216 or back side 218, center pad 242 is generally rectangular in shape, with top surface 260 and bottom surface 262 extending in approximate parallel planar spaced relation to one another and in approximate perpendicular planar relation to opposing left and right ends 264.

Alignment Features 268: In the arrangement shown, as one example, top surface 260 of center pad 242 is a generally flat and planar surface which extends a length between opposing front and back surfaces 266 and a width between ends 264. In the arrangement shown, as one example the top surface 260 of center pad 242 includes alignment features 268. Alignment features 268 are formed of any suitable size, shape, and design and are configured to receive and hold a portion of elongated members 288 of support layer 224 within alignment features 268. In the arrangement shown, as one example, alignment features 268 of center pad 242 are recesses which extend downward from top surface 260 a depth. In the arrangement shown, as one example, alignment features 268 are generally rectangular recesses which extend from one end 264 of center pad 242 to the opposing end 264 of center pad 242.

In the arrangement shown, as one example, there are four alignment features 268 in the top surface 260 of center pad 242 and each of the alignment features 268 extend in an approximately parallel manner relative to the other alignment features 268. However, the embodiment is not so limited and any other number of alignment features 268, or layout, design, or configuration of alignment features 268 may be used and is hereby contemplated for use. In the arrangement shown, as one example, two alignment features 268 are nearer to the front surface 266 and two alignment features are nearer to the back surface 266. In the arrangement shown, as one example, the alignment features 268 in top surface 260 of center pad 242 are configured to align with the alignment features 256 in top surface 246 of first end pad 240 and the alignment features 282 in top surface 272 of second end pad 244. In this way, elongated members 288 of support layer 224 may extend across a distance of base pad assembly 222 that is greater than any one of first end pad 240, center pad 242, or second end pad 244.

Handles 270: In the arrangement shown, as one example, the opposing front and back surfaces 266 includes handles 270. Handles 270 are formed of any suitable size, shape, and design and are configured to facilitate easy transportation, setup, and disassembly of base pad assembly 222 of system 210 and handheld carrying of center pad 242. In the arrangement shown, as one example, handles 270 are flexible loop type handles attached to both the front and back surfaces 266. However, embodiments are not so limited. Rather, it is contemplated that handles 270 may be implemented using various different types of rigid or flexible handles or handgrips including, but not limited to loops, posts, knobs, holes, recesses, protrusions, and/or any other type of handle or handgrip.

In the arrangement shown, as one example, the opposing front and back surfaces 266 form a portion of the front and back sides 234 of base pad assembly 222. That is, the front surface 266 of center pad 242 defines a portion of the front side 234 of base pad assembly 222 and the back surface 266 of center pad 242 defines a portion of the back side 234 of base pad assembly 222.

In the arrangement shown, as one example, one end 264 of center pad 242 is configured to align with and be mated against the interior end 252 of first end pad 240. In the arrangement shown, as one example, the opposing end 264 of center pad 242 is configured to align with and be mated against the interior end 278 of second end pad 244.

Second end pad 244: In the arrangement shown, as one example, base pad assembly 222 includes second end pad 244. Second end pad 244 is formed of any suitable size, shape, and design and is configured to distribute weight of support layer 224 over the respective area of second end pad 244 (in order to increase the surface area of engagement and to increase the surface area of weight distribution). In the arrangement shown, as one example, second end pad 244 includes a top surface 272, a bottom surface 274, an exterior end 276, an interior end 278, and opposing front and back surfaces 280.

In the arrangement shown, as one example, when viewed from top side 212, second end pad 244 is generally rectangular in shape, with exterior end 276 and interior end 278 extending in approximate parallel planar spaced relation to one another and in approximate perpendicular planar relation to the opposing front and back surfaces 280. In the arrangement shown, as one example, when viewed from an end 220, second end pad 244 is generally rectangular in shape, with top surface 272 and bottom surface 274 extending in approximate parallel planar spaced relation to one another and in approximate perpendicular planar relation to the opposing front and back surfaces 280. In the arrangement shown, as one example, when viewed from either front side 216 or back side 218, second end pad 244 is generally rectangular in shape, with top surface 272 and bottom surface 274 extending in approximate parallel planar spaced relation to one another and in approximate perpendicular planar relation to exterior end 276 and interior end 278.

Alignment Features 282: In the arrangement shown, as one example, top surface 272 of second end pad 244 is a generally flat and planar surface which extends a length between opposing front and back surfaces 280 and a width between exterior end 276 and interior end 278. In the arrangement shown, as one example, the top surface 272 of second end pad 244 includes alignment features 282. Alignment features 282 are formed of any suitable size, shape, and design and are configured to receive and hold a portion of elongated members 288 of support layer 224 within alignment features 282. In the arrangement shown, as one example, alignment features 282 of second end pad 244 are recesses which extend downward from top surface 272 a depth. In the arrangement shown, as one example, alignment features 282 are generally rectangular recesses which extend a distance from interior end 278 towards exterior end 276. In the arrangement shown, as one example, the distance alignment features 282 extend is at or near half the distance between exterior end 276 and interior end 278.

In the arrangement shown, as one example, there are four alignment features 282 in the top surface 272 of second end pad 244 and each of the alignment features 282 extend in an approximately parallel manner relative to the other alignment features 282. However, the embodiment is not so limited and any other number of alignment features 282, or layout, design, or configuration of alignment features 282 may be used and is hereby contemplated for use. In the arrangement shown, as one example, two alignment features 282 are nearer to the front surface 280 and two alignment features 282 are nearer to the back surface 280. In the arrangement shown, as one example, the alignment features 282 in top surface 272 of second end pad 244 are configured to align with the alignment features 256 in top surface 246 of first end pad 240 and the alignment features 268 in top surface 260 of center pad 242. In this way, elongated members 288 of support layer 224 may extend across a distance of base pad assembly 222 that is greater than any one of first end pad 240, center pad 242, or second end pad 244.

Handles 284: In the arrangement shown, as one example, the opposing front and back surfaces 280 include handles 284. Handles 284 are formed of any suitable size, shape, and design and are configured to facilitate easy transportation, setup, and disassembly of base pad assembly 222 of system 210 and handheld carrying of second end pad 244. In the arrangement shown, as one example, handles 284 are flexible loop type handles attached to both the front and back surfaces 280. However, embodiments are not so limited. Rather, it is contemplated that handles 284 may be implemented using various different types of rigid or flexible handles or handgrips including, but not limited to loops, posts, knobs, holes, recesses, protrusions, and/or any other type of handle or handgrip.

In the arrangement shown, as one example, the opposing front and back surfaces 280 form a portion of the front and back sides 234 of base pad assembly 222. That is, the front surface 280 of second end pad 244 defines a portion of the front side 234 of base pad assembly 222 and the back surface 280 of second end pad 244 defines a portion of the back side 234 of base pad assembly 222.

In the arrangement shown, as one example, the exterior end 276 of second end pad 244 is also the second end of base pad assembly 222. That is, the exterior end 276 of second end pad 244 defines the exterior end on one end 236 of base pad assembly 222. In the arrangement shown, as one example, the interior end 278 of second end pad 244 is configured to align with and be mated against an end 264 of center pad 242.

In the arrangement shown, as one example, base pad assembly 222 is a generally rectangular assembly which is formed by placing first end pad 240, center pad 242, and second end pad 244 in end-to-end linear alignment and engagement with one another. In the arrangement shown, as one example, when assembled the base pad assembly 222 has a generally flat and planar upper surface and lower surface which extends from the exterior end 250 of the first end pad 240 to the exterior end 276 of the second end pad 244. Additionally, in this arrangement, as one example, when properly aligned the alignment features 256 of first end pad 240, the alignment features 268 of center pad 242, and the alignment features 282 of second end pad 244 form continuous alignment features across the upper surface of the base pad assembly 222. In the arrangement shown, as one example, the alignment features in the upper surface of base pad assembly 222 extends across a portion of the upper surface from a first end near the exterior end 250 of the first end pad 240 to a second end near the exterior end 276 of the second end pad 244. In the arrangement shown, as one example, the alignment features in the upper surface of base pad assembly 222 are configured to receive and support the components of support layer 224.

While base pad assembly 222 and its components have been described according the arrangement shown, as one example, it will be understood by those skilled in the art that any other size, shape, design, or configuration of base pad assembly 222 and its components may be used in order to provide an increased area over which a load may be spread in order to prevent ground failure or damage to the ground where system 210 is located, as well as provide support to support layer 224.

Support Layer 224:

In the arrangement shown, as one example, system 210 includes support layer 224. Support layer 224 is formed of any suitable size, shape, and design and is configured to interconnect with first end pad 240, center pad 242, and second end pad 244 of base pad assembly 222, as well as upper pad assembly 226, and distribute weight from upper pad assembly 226 across the base pad assembly 222. In the arrangement shown, as one example, support layer 224 includes elongated members 288.

In the arrangement shown, as one example, support layer 224 includes four elongated members 288, however the embodiment is not so limited. In some various alternative arrangements, as examples, there may be any number of elongated members 288, so long as the number of elongated members 288 is equal to or lesser than the number of alignment features that extend across the upper surface of base pad assembly 222. In the arrangement shown, as one example, there are four alignment features in the upper surface of base pad assembly 222, therefore there may be four, three, two, or one elongated members 288 in support layer 224. In some various alternative arrangements, as examples, there may be any number of alignment features in the upper surface of base pad assembly 222, and, in such arrangements, there may be any number of elongated members 288 in support layer 224, so long as the number of elongated members is equal to or lesser than the number of alignment features that extend across the upper surface of base pad assembly 222.

Elongated Members 288: In the arrangement shown, as one example, support layer 224 includes elongated members 288. Elongated members 288 are formed of any suitable size, shape, and design and are configured to form support layer 224 and distribute weight from upper pad assembly 226 across the base pad assembly 222. In the arrangement shown, as one example, elongated members 288 are elongated square or rectangular members having a top surface 290, a bottom surface 292, opposing left and right ends 294 (or simply "ends 294"), and opposing front and back surfaces 296. In the arrangement shown, as one example, the elongated members 288 are sized and shaped to fit within the alignment features in the upper surface of base pad assembly 222.

In one or more arrangements, elongated members 288 are formed of a metallic material, such as steel, aluminum, or any alloy or any other metallic material to provide extreme ruggedness and durability. Additionally or alternatively, in one or more arrangements, elongated members 288 may be formed of non-metallic material such as, by way of example and not limitation, a plastic material, a rubber material, a synthetic rubber material, an acrylic material, a nylon material, a fiberglass material, a foam material, a UHMW material, a polyethylene material, or any other composite material and/or non-metallic material. Additionally or alternatively, in one or more arrangements, elongated members 288 are formed of a combination of metallic materials or components and non-metallic materials or components.

In the arrangement shown, as one example, elongated members 288 may be formed of a single, unitary member that is formed in a manufacturing process such as molding, pressing, forming, additive manufacturing, machining, extrusion, casting, or the like to form a unitary and monolithic member. Alternatively, elongated members 288 may be formed of multiple pieces that are connected or assembled to one another such as through screwing, bolting, stapling, fasteners, riveting, bonding, adhering, welding, adhesives, interlocking, friction fitting, or any other connecting method or means.

In the arrangement shown, as one example, elongated members 288 have a hollow square tube shape, which reduces weight of the metallic material while retaining rigidity of elongated members 288. However, the embodiments are not so limited. Rather, it is contemplated that in one or more arrangements, elongated members 288 may be of solid internal construction, hollow internal construction, honeycomb internal construction, or any other internal construction.

In one or more arrangements, as one example, system 210 is configured to support up to 60,000 pounds and elongated members 288 are 4"×4" rectangular tubes. In another arrangement, as one example, system 210 is configured to support up to 110,000 pounds and elongated members 288 are 4"×6" rectangular tubes. However, the embodiment is not so limited and in some various other arrangements, any other size and configuration of elongated members 288 may be used in order to effectively and safely distribute the weight being supported by system 210.

In the arrangement shown, as one example, the support layer 224 is formed by placing each of the elongated members 288 in the alignment features in the upper surface of the base pad assembly 222. In the arrangement shown with four elongated members 288 and four alignment features in the upper surface of the base pad assembly 222, as one example, a first elongated member 288 is placed in a first alignment feature in the upper surface of the base pad assembly 222. Likewise, a second elongated member 288 is placed in a second alignment feature in the upper surface of the base pad assembly 222, a third elongated member 288 is placed in a third alignment feature in the upper surface of the base pad assembly 222, and a fourth elongated member 288 is placed in the fourth alignment feature in the upper surface of the base pad assembly 222. Once the support layer 224 is formed, then the upper pad assembly 226 may be placed onto support layer 224.

While support layer 224 and its components have been described according the arrangement shown, as one example, it will be understood by those skilled in the art that any other size, shape, design, or configuration of support layer 224 and its components may be used in order to provide an increased area over which a load may be spread in order to interconnect with first end pad 240, center pad 242, and second end pad 244 of base pad assembly 222, as well as upper pad assembly 226, and distribute weight from upper pad assembly 226 across the base pad assembly 222.

Upper Pad Assembly 226:

In the arrangement shown, as one example, system 210 includes upper pad assembly 226. Upper pad assembly 226 is formed of any suitable size, shape, and design and is configured to be aligned with and placed on top of support layer 224, to provide an upper surface for support for outriggers or feet of machinery, vehicles, or other equipment, and to distribute weight from such outrigger or feet of machinery, vehicles, or other equipment across support layer 224 and then across base pad assembly 222. In the arrangement shown, as one example, upper pad assembly 226 has a top side 300, a bottom side 302, a front side 304, a back side 306, and opposing left and right ends 308. In the arrangement shown, as one example, upper pad assembly 226 includes alignment features 310, an intermediate plate 312, and an upper pad 314.

Alignment Features 310: In the arrangement shown, as one example, upper pad assembly 226 includes alignment features 310 on the bottom side 302 of upper pad assembly 226. Alignment features 310 are formed of any suitable size, shape, and design and are configured to facilitate alignment of upper pad assembly 226 with support layer 224. In the arrangement shown, as one example, alignment features 310 are generally rectangular elongated members which extend from one end 308 of upper pad assembly 226 to the other end 308 of upper pad assembly 226.

In the arrangement shown, as one example, alignment features 310 extend downward and are configured to rest between and/or around the elongated members 288 of support layer 224. In the arrangement shown, as one example, there are four elongated members 288 and three alignment features 310. In this arrangement, as one example, one alignment feature 310 rests between the first elongated member 288 and a second elongated member 288, a second alignment feature 310 rests between the second elongated member 288 and a third elongated member 288, and a third alignment feature 310 rests between the third elongated member 288 and a fourth elongated member 288. In this arrangement, as one example, the two outer alignment features 310 have a first width, and the middle alignment feature 310 has a second width that is greater than the first width. In this arrangement, the distance between the second and third elongated members 288 is larger than the distance between the first and second elongated members and third and fourth elongated members 288, respectively. Therefore, in order to facilitate proper alignment, the middle alignment feature 310 has a greater width that corresponds to the greater distance between the second and third elongated members 288.

While the number, size, and design of alignment features 310 have been described according to the arrangement shown, as one example, any other number, size, and design of alignment features 310 may be used, so long as the alignment features 310 are configured to rest between or around elongated members 288 of support layer 224. With respect to size and design, in an alternative arrangement, as one example, alignment features 310 may be formed of any design and size, and the design and size of all the alignment features 310 may be the same, or some or all of the alignment features 310 may be sized or designed differently. With respect to the number of alignment features, in an alternative arrangement, as one example, there may be three elongated members 288 and two alignment features 310, with a first alignment feature 310 resting between the first and second elongated members 288, and the second alignment feature 310 resting between the second and third elongated members. In yet another alternative arrangement, as one example, there may be three elongated members 288 and four alignment features 310, with a first alignment feature 310 resting outside of the first elongated member 288, a second alignment feature 310 resting between the first and second elongated members 288, a third alignment feature 310 resting between the second and third elongated members 288, and a fourth alignment feature 310 resting outside of the third elongated member 288. As a person of ordinary skill in the art will understand, any number, size, and arrangement of alignment features 310 may be used in upper pad assembly 226, so long as the alignment features 310 provide alignment with support layer 224.

In the arrangement shown, as one example, alignment features 310 connect to intermediate plate 312 and upper pad 314 of upper pad assembly 226.

Intermediate Plate 312: In the arrangement shown, as one example, upper pad assembly 226 includes intermediate plate 312. Intermediate plate 312 is formed of any suitable size, shape, and design and is configured to rest between, and help facilitate connection between, alignment features 310 and upper pad 314. In some various arrangements, as examples, intermediate plate 312 may also provide reinforcement and support to upper pad 314 to help upper pad 314 withstand greater weights or loads from outriggers or the feet of machinery, vehicles, or other equipment.

In the arrangement shown, as one example, intermediate plate 312 is a generally square or rectangular plate which extends a width between opposing left and right ends, a depth between opposing front and back sides, and a height between opposing top and bottom sides. However, the embodiment is not so limited and intermediate plate 312 may be formed of any other size, shape, or design, such as a circular plate, a triangular plate, a hexagonal plate, or any other shape or design.

In the arrangement shown, as one example, intermediate plate 312 is formed of a metallic material, such as steel, aluminum, or any alloy or any other metallic material to provide extreme ruggedness and durability. Additionally or alternatively, in one or more arrangements intermediate plate 312 may be formed of non-metallic material such as, by way of example and not limitation, a plastic material, a rubber material, a synthetic rubber material, an acrylic material, a nylon material, a fiberglass material, a foam material, a UHMW material, a polyethylene material or any other composite material and/or non-metallic material. Additionally or alternatively, in one or more arrangements, intermediate plate 312 may be formed of a combination of metallic materials or components and non-metallic materials or components.

Upper Pad 314: In the arrangement shown, as one example, upper pad assembly 226 includes upper pad 314. Upper pad 314 is formed of any suitable size, shape, and design and is configured to connect to alignment features 310 and intermediate plate 312, as well as provide an upper surface for support for outriggers or feet of machinery, vehicles, or equipment and to distribute weight of such outriggers or feet of machinery, vehicles, or equipment across support layer 224 and then across base pads assembly 222. In the arrangement shown, as one example, upper pad 314 includes a top surface 318, a bottom surface 320, opposing left and right ends 322 (or simply "ends 322"), a front surface 324, a back surface 326, and mating features 332.

In the arrangement shown, as one example, when viewed from top side 212, upper pad 314 is generally square or rectangular in shape, with opposing left and right ends 322 extending in approximate parallel planar spaced relation to one another and in approximate perpendicular planar relation to the front surface 324 and back surface 326. In the arrangement shown, as one example, when viewed from an end 220, upper pad 314 is generally rectangular in shape, with top surface 318 and bottom surface 320 extending in approximate parallel planar spaced relation to one another and in approximate perpendicular planar relation to the front surface 324 and back surface 326. In the arrangement shown, as one example, when viewed from either front side 216 or back side 218, upper pad 314 is generally rectangular in shape, with top surface 318 and bottom surface 320 extending in approximate parallel planar spaced relation to one another and in approximate perpendicular planar relation to ends 322.

Recess 328: In the arrangement shown, as one example, top surface 318 of upper pad 314 is a generally flat and planar surface. In the arrangement shown, as one example the top surface 318 of upper pad 314 includes recess 328. Recess 328 is formed of any suitable size, shape, and design and is configured to receive and hold outriggers or feet of machinery, vehicles, or equipment within recess 328 to prevent shifting of such outriggers or feet of machinery, vehicles, or equipment during use. In the arrangement shown, as one example, recess 328 is generally circular in shape and extends a distance downward into top surface 318. However, the embodiment is not so limited and recess 328 may be formed of any other size, shape, and design in order to receive, hold, and prevent shifting of outriggers or feet of machinery, vehicles, or equipment.

In one or more arrangements, upper pad 314 is used to support an outrigger or foot of machinery, vehicles, or equipment that is 12 inches in diameter, therefore recess 328 is sized and shaped to fit a 12-inch diameter outrigger or foot. However, the embodiments are not so limited and in some various alternative arrangements upper pad 314 may be used to support an outrigger or foot having a 14-inch diameter, a 16-inch diameter, or any other size, shape, or configuration, and recess 328 is appropriately sized, shaped, designed, and configured in order to accommodate such outrigger or foot.

Handle 330: In the arrangement shown, as one example, front surface 324 of upper pad 314 includes handle 330. Handle 330 is formed of any suitable size, shape, and design and is configured to facilitate easy transportation, setup, and disassembly of upper pad assembly 226 of system 210 and handheld carrying of upper pad assembly 226. In the arrangement shown, as one example, handle 330 is a flexible loop type handles attached to front surface 324. However, embodiments are not so limited. Rather, it is contemplated that handle 330 may be implemented using various different types of rigid or flexible handles or handgrips including, but not limited to loops, posts, knobs, holes, recesses, protrusions, and/or any other type of handle or handgrip.

While upper pad assembly 226 and its components have been described according to the arrangement shown, as one example, it will be understood by those skilled in the art that any other size, shape, design, or configuration of upper pad assembly 226 and its components may be used in order to provide an increased area over which a load may be spread in order to align with and be placed on top of support layer 224, to provide an upper surface for support for outriggers or feet of machinery, vehicles, or other equipment, and to distribute weight from such outrigger or feet of machinery, vehicles, or other equipment across support layer 224 and then across base pad assembly 222.

Mating Features 298/332:

In one or more arrangements, elongated members 288 and upper pad 314 have respective sets of mating features 298 and 332. Mating features 298/332 are formed of any suitable size, shape and design and are configured to interconnect to facilitate alignment and mating of upper pad 314 with elongated members 228. In the arrangement shown, mating features 298/332 are formed of complimentary protrusions and holes. However, the arrangements are not so limited. Rather it is contemplated that in some various arrangements mating features 298/332 may utilize various methods and means for alignment and/or mating including bur not limited to, for example, protrusions, holes, recesses, flanges, channels, and/or any other method or means for alignment and/or mating.

In an arrangement shown, as one example, elongated members 288 have two mating features 298 in their top surface 290. In this example, the mating features 298 are comprised of at least one opening configured to receive mating features 332 of upper pad 314. In the arrangement shown, the mating features 332 of upper pad 314 are comprised of at least one protrusion configured to engage with mating features 298 of elongated members 288. However, the embodiments are not so limited. Rather, it is contemplated that in some various arrangements, upper pad 314 and elongated members 228 may have any number of complementary mating features 298 and 332.

Materials of First End Pad 240, Center Pad 242, Second End Pad 244, and Upper Pad 314: In some various arrangements, as examples, first end pad 240, center pad 242, and second end pad 244 of base pad assembly 222, and upper pad 314 of upper pad assembly 226 may be formed of various different materials including, but not limited to, for example, metallic materials, such as aluminum, steel, or an alloy or any other metallic material, or non-metallic materials, such as a plastic material, a rubber material, a synthetic rubber material, an acrylic material, a nylon material, a fiberglass material, a foam material, a UHMW material, a polyethylene material or any other composite material and/or non-metallic material, as well as any combination of such materials.

In one or more arrangements, first end pad 240, center pad 242, and second end pad 244, and upper pad 314 are formed of a compressible material to promote secure connection of system 210 with a ground or floor surface and with outriggers or feet of machinery, vehicles, or equipment supported thereon. In some various arrangements, such compressible material may include but is not limited to, for example, a rubber, a synthetic rubber, a rubber composite, a silicone, a plastic, a foam, a polyethylene material or any other composite material, non-metallic material, or any other compressible material, flexible material, or any combination thereof. In one or more arrangements, first end pad 240, center pad 242, and second end pad 244, and upper pad 314 are formed of a material that has a high coefficient of friction so as to ensure the system 210 securely engages the ground or floor surface and the outriggers or feet of the machinery, vehicles, or equipment supported by the system 210 such that they securely engage one another and provide a sure footing thereby preventing slipping and other relative movement.

In one or more arrangements, as examples, first end pad 240, center pad 242, and second end pad 244, and upper pad 314 may be formed primarily or partially of ground up recycled tires for vehicles. This ground up recycled tire material is then added to a mold and formed into first end pad 240, center pad 242, and second end pad 244, and upper pad 314 with the addition of pressure and heat in a recipe which may include additional additives such as virgin material additives, strengthening additives such as fiberglass strands, strings, chords, netting, or other structural supports, binders, or any other materials. In one or more arrangements structural reinforcement may be added to first end pad 240, center pad 242, and second end pad 244, and upper pad 314 to increase the structural rigidity and strength of first end pad 240, center pad 242, and second end pad 244, and upper pad 314 such as steel or iron rods, netting, bars, frame members or any other shaped member. In one or more arrangements, such structural reinforcement is incorporated into the material during the manufacturing process and therefore are completely embedded within first end pad 240, center pad 242, and second end pad 244, and upper pad 314.

In Operation:

In the arrangement shown, as one example, system 210 is formed of interlocking components that can be disassembled to facilitate easy storage and transportation while providing stable support and distribution of weight across a larger area for support of outriggers or feet of machinery, vehicles, or equipment. In one or more arrangements, as one example, first end pad 240, center pad 242, and second end pad 244 are placed in end-to-end alignment with one another to form base pad assembly 222, with the alignment features 256 of first end pad 240, alignment features 268 of center pad 242, and alignment features 282 of second end pad 244 aligned to create continuous alignment features extending across a portion of the upper surface of the base pad assembly 222. Next, elongated members 288 will be placed within the alignment features of base pad assembly 222 to form support layer 224. Finally, the upper pad assembly 226 may be placed onto support layer 224 by positioning upper pad assembly 226 such that alignment features 310 of upper pad assembly 226 are positioned around elongated members 288 and mating features 332 of upper pad 314 are positioned to engage with mating features 298 of elongated members 288. More specifically, in the arrangement shown, as one example, the first alignment feature 310 of upper pad assembly 226 is positioned to be lowered and rest between the first elongated member 288 and the second elongated member 288, the second alignment feature 310 is positioned to be lowered and rest between the second elongated member 288 and third elongated member 288, and the third alignment feature 310 is positioned to be lowered and rest between the third elongated member 288 and the fourth elongated member 288. In this alignment, upper pad assembly 226 may be lowered onto support layer 224.

Once system 210 has been assembled, an outrigger or foot of machinery, vehicle, or equipment may be placed into the recess 328 in the top surface 318 of upper pad 314 of upper pad assembly 226. When the outrigger or foot of machinery, vehicle, or equipment places weight on system 210, the base pad assembly 222, support layer 224, and upper pad assembly 226 stay in secured engagement with one another and on the ground upon which system 210 is placed, and system 210 works to distribute the weight from the outrigger or foot of machinery, vehicle, or equipment across the entire area of base pad assembly 222. In this manner, system 210 is formed that can distribute loads over a larger area, while retaining the ability to be disassembled for easy transportation and/or storage.

From the above discussion it will be appreciated that the disclosed system presented herein improves upon the state of the art. Specifically, in one or more arrangements, an improved outrigger pad support system is provided that: has the necessary strength, rigidity, and durability, while also remaining affordable and relatively lightweight; is formed of interlocking components; is convenient to transport and store; can effectively distribute load over a larger area; is rigid; minimizes displacement under heavy loads; is relatively easy to manufacture; is easy to use; is relatively lightweight; is easy to move; has a robust design; is durable; has a long useful life; is not easily susceptible to wear and tear; is high quality; is relatively inexpensive; increases safety for the operator and other individuals and property in the area; is easy to transport; effectively distributes loads and pressures from outriggers to levels the supporting surface can withstand, or levels deemed acceptable by site owners; protects supporting surfaces from damage caused by outriggers; and/or has the strength to withstand heavy loads, among countless other advantages and improvements.

What is claimed:

1. An outrigger pad support system comprising:
    a base pad assembly;
        the base pad assembly having an upper surface and a lower surface;
        wherein the upper surface of the base pad assembly includes at least one alignment feature that extends across a portion of the upper surface of the base pad assembly;
    a support layer;
        the support layer formed of at least one elongated member;
        wherein the support layer is positioned on top of the base pad assembly;
    an upper pad assembly;
        the upper pad assembly having a top side and a bottom side;
        the bottom side of the upper pad assembly having at least one alignment feature;
        the bottom side of the upper pad assembly having at least one mating feature;
        wherein the upper pad assembly is positioned on top of the support layer;
    wherein the at least one elongated member of the support layer is configured to rest within the at least one alignment feature in the upper surface of the base pad assembly;
    wherein the at least one alignment feature of the upper pad assembly is configured to engage with the at least one elongated member of the support layer;
    wherein the at least one elongated member of the support layer contains at least one mating feature configured to mate with the at least one mating feature of the bottom side of the upper pad assembly;
    wherein the at least one mating feature on the bottom side of the upper pad assembly is separated from the at least one alignment feature on the bottom side of the upper pad assembly;
    wherein the base pad assembly covers a first area and an upper surface of the support layer has a second area;
    wherein the first area is larger than the second area.

2. The outrigger pad support system of claim 1, wherein the base pad assembly is formed of a first end pad, a center pad, and a second end pad;
    wherein the first end pad, the center pad, and the second end pad are positioned in end-to-end alignment with one another to form the base pad assembly.

3. The outrigger pad support system of claim 1, wherein the base pad assembly is formed of a first end pad, a center pad, and a second end pad;
    wherein the first end pad, the center pad, and the second end pad are positioned in end-to-end linear alignment with one another to form the base pad assembly.

4. The outrigger pad support system of claim 1, further comprising:
    the base pad assembly formed of a first end pad, a center pad, and a second end pad;
    wherein the at least one alignment feature of the base pad assembly extends across a portion of the first end pad, the at least one alignment feature of the base pad assembly extends across a portion of the second end pad, and the at least one alignment feature of the base pad assembly extends across the center pad from a first end to a second end.

5. The outrigger pad support system of claim 1, wherein the at least one alignment feature of the base pad assembly is a recess.

6. The outrigger pad support system of claim 1, wherein the at least one alignment feature of the base pad assembly includes a first alignment feature, a second alignment feature, a third alignment feature, and a fourth alignment feature.

7. The outrigger pad support system of claim 1, wherein the at least one alignment feature of the base pad assembly includes a plurality of alignment features and each of the plurality of alignment features extends across the base pad assembly in a parallel manner relative to one another.

8. The outrigger pad support system of claim 1, wherein the at least one elongated member of the support layer is a tube formed of a metallic material.

9. The outrigger pad support system of claim 1, wherein the at least one elongated member of the support layer includes a first elongated member, a second elongated member, a third elongated member, and a fourth elongated member.

10. The outrigger pad support system of claim 1, wherein the at least one elongated member of the support layer includes a plurality of elongated members and each of the plurality of elongated members extends in a parallel manner when placed on the base pad assembly.

11. The outrigger pad support system of claim 1, wherein the at least one alignment feature of the base pad assembly includes a plurality of alignment features; wherein the at least one elongated member of the support layer includes a plurality of elongated members; wherein the number of elongated members in the support layer is equal to the number of alignment features in the base pad assembly; wherein the plurality of elongated members of the support layer are configured to rest within the plurality of alignment features of the base pad assembly.

12. The outrigger pad support system of claim 1, further comprising:
the at least one alignment feature of the upper pad assembly is formed of a plurality of alignment features, and the upper pad assembly includes an intermediate plate, and an upper pad.

13. The outrigger pad support system of claim 1, wherein the upper pad assembly includes an intermediate plate and an upper pad;
wherein the upper pad contains at least one mating feature.

14. The outrigger pad support system of claim 1, wherein the top side of the upper pad assembly is configured to receive a foot of a piece of equipment.

15. The outrigger pad support system of claim 1, wherein the at least one alignment feature of the upper pad assembly includes a first alignment feature, a second alignment feature, and a third alignment feature.

16. The outrigger pad support system of claim 1, wherein the at least one alignment feature of the upper pad assembly includes a plurality of alignment features; wherein the at least one elongated member of the support layer includes a plurality of elongated members; wherein the number of alignment features in the upper pad assembly is less than the number of elongated members in the support layer; wherein the plurality of alignment features of the upper pad assembly rest between and engage adjacent elongated members of the support layer.

17. The outrigger pad support system of claim 1, wherein the at least one alignment feature of the upper pad assembly includes a first alignment feature, a second alignment feature, and a third alignment feature; wherein the at least one elongated member of the support layer includes a first elongated member, a second elongated member, a third elongated member, and a fourth elongated member; wherein the first alignment feature of the upper pad assembly rests between and engages the first elongated member and the second elongated member of the support layer; wherein the second alignment feature of the upper pad assembly rests between and engages the second elongated member and the third elongated member of the support layer; and wherein the third alignment feature of the upper pad assembly rests between and engages the third elongated member and the fourth elongated member of the support layer.

18. The system of claim 1, wherein the at least one mating feature on the bottom side of the upper pad assembly is a protrusion extending downward from the bottom side;
wherein the at least one alignment feature on the bottom side of the upper pad assembly is a protrusion extending downward from the bottom side.

19. The system of claim 1, wherein when the upper pad assembly is positioned on top of the support layer, a portion of the at least one elongated member of the support layer is positioned between the at least one mating feature on the bottom side of the upper pad assembly and the at least one alignment feature on the bottom side of the upper pad assembly.

20. The system of claim 1, wherein the at least one mating feature on the bottom side of the upper pad assembly is a protrusion configured to be received in a recess on a top side of the at least one elongated member of the support layer.

21. The system of claim 1, wherein the at least one mating feature on the bottom side of the upper pad assembly is a protrusion having a circular cross section and configured to be received in a circular shaped recess on a top side of the at least one elongated member of the support layer.

22. The system of claim 18, wherein a first end pad, a center pad, and a second end pad of the base assembly, and the upper pad assembly each have a respective handle to facilitate transportation of the first end pad, the center pad, the second end pad, and the upper pad assembly.

23. An outrigger pad support system comprising:
a base pad assembly;
the base pad assembly having a first end pad, a center pad, and a second end pad;
wherein the first end pad, the center pad, and the second end pad are configured to form an upper surface of the base pad assembly;
wherein the upper surface of base pad assembly includes a plurality of alignment features that extends across a portion of the upper surface of the base pad assembly;
a support layer;
the support layer having a plurality of elongated members;
wherein the plurality of elongated members are configured to rest within the plurality of alignment features in the upper surface of the base pad assembly;
an upper pad assembly;
the upper pad assembly having a top side and a bottom side;
the bottom side of the upper pad assembly having a plurality of alignment features;
wherein the upper pad assembly rests on top of the plurality of elongated members;
wherein the plurality of alignment features of the upper pad assembly rest between and engage adjacent elongated members of the plurality of elongated members.

24. The outrigger pad support system of claim 23, wherein the first end pad, the center pad, and the second end pad are positioned in end-to-end alignment with one another to form the base pad assembly,
wherein the first end pad, the center pad, the second end pad, and the upper pad assembly each have a respective handle to facilitate transportation of the first end pad, the center pad, the second end pad, and the upper pad assembly.

25. The outrigger pad support system of claim 23, wherein the first end pad, the center pad, and the second end pad are positioned in end-to-end linear alignment with one another to form the base pad assembly and cover a larger first area;
wherein the upper pad assembly covers a second area;
wherein the first area is larger than the second area;

wherein the support layer transfers and distributes downward force from the upper pad assembly across the first end pad, the center pad, and the second end pad, thereby distributing the downward force across the larger first area.

26. The outrigger pad support system of claim 23, wherein the plurality of alignment features in the upper surface of the base pad assembly extend across a portion of the first end pad, wherein the plurality of alignment features in the upper surface of the base pad assembly extend across a portion of the second end pad, and wherein the plurality of alignment features in the upper surface of the base pad assembly extend across the center pad from a first end to a second end.

27. The outrigger pad support system of claim 23, wherein the plurality of alignment features in the upper surface of the base pad assembly are recesses.

28. The outrigger pad support system of claim 23, wherein the plurality of alignment features of the base pad assembly includes a first alignment feature, a second alignment feature, a third alignment feature, and a fourth alignment feature.

29. The outrigger pad support system of claim 23, wherein the plurality of alignment features in the upper surface of the base pad assembly extend in a parallel manner relative to one another.

30. The outrigger pad support system of claim 23, wherein the plurality of elongated members are tubes formed of a metallic material.

31. The outrigger pad support system of claim 23, wherein the plurality of elongated members contains at least one mating feature.

32. The outrigger pad support system of claim 23, wherein the plurality of elongated members extend in a parallel manner relative to one another.

33. The outrigger pad support system of claim 23, further comprising:
the upper pad assembly includes an intermediate plate and an upper pad.

34. The outrigger pad support system of claim 23, further comprising:
the upper pad assembly includes an intermediate plate and an upper pad;
wherein the upper pad contains at least one mating feature.

35. The outrigger pad support system of claim 23, wherein the plurality of alignment features of the upper pad assembly includes a first alignment feature, a second alignment feature, and a third alignment feature.

36. The outrigger pad support system of claim 23, wherein the plurality of alignment features of the upper pad assembly includes a first alignment feature, a second alignment feature, and a third alignment feature; wherein the plurality of elongated members includes a first elongated member, a second elongated member, a third elongated member, and a fourth elongated member; wherein the first alignment feature of the upper pad assembly rests between and engages the first elongated member and the second elongated member of the support layer; wherein the second alignment feature of the upper pad assembly rests between and engages the second elongated member and the third elongated member of the support layer; and wherein the third alignment feature of the upper pad assembly rests between and engages the third elongated member and the fourth elongated member of the support layer.

37. An outrigger pad support system comprising:
a base pad assembly;
the base pad assembly having a first end pad, a center pad, and a second end pad;
wherein the first end pad, the center pad, and the second end pad are configured to form an upper surface of the base pad assembly;
wherein the upper surface of the base pad assembly includes a first alignment feature, a second alignment feature, a third alignment feature, and a fourth alignment feature;
wherein the first alignment feature, the second alignment feature, the third alignment feature, and the fourth alignment feature extend across a portion of the upper surface of the base pad assembly in a parallel manner relative to one another;
a support layer;
wherein the support layer includes a plurality of elongated members;
the plurality of elongated members including a first elongated member, a second elongated member, a third elongated member, and a fourth elongated member;
an upper pad assembly;
the upper pad assembly having a top side and a bottom side;
the bottom side of the upper pad assembly having a first alignment feature, a second alignment feature, and a third alignment feature;
wherein the upper pad assembly rests on top of the plurality of elongated members;
wherein the first elongated member of the support layer rests within the first alignment feature of the base pad assembly, the second elongated member of the support layer rests within the second alignment feature of the base pad assembly, the third elongated member of the support layer rests within the third alignment feature of the base pad assembly, the fourth elongated member of the support layer rests within the fourth alignment feature of the base pad assembly; and
wherein the first alignment feature of the upper pad assembly rests between and engages the first elongated member and the second elongated member of the support layer, the second alignment feature of the upper pad assembly rests between and engages the second elongated member and the third elongated member of the support layer, and the third alignment feature of the upper pad assembly rests between and engages the third elongated member and the fourth elongated member of the support layer;
wherein the base pad assembly covers a first area and an upper surface of the support layer has a second area;
wherein the first area is larger than the second area.

38. The outrigger pad support system of claim 37, wherein the first end pad, the center pad, and the second end pad are positioned in end-to-end alignment with one another to form the base pad assembly.

39. The outrigger pad support system of claim 37, wherein the first end pad, the center pad, and the second end pad are positioned in end-to-end linear alignment with one another to form the base pad assembly.

40. The outrigger pad support system of claim 37, wherein the first alignment feature, the second alignment feature, the third alignment feature, and the fourth alignment feature in the upper surface of the base pad assembly extend across a portion of the first end pad, across a portion of the second end pad, and across the center pad from a first end to a second end.

41. The outrigger pad support system of claim 37, wherein the first alignment feature, the second alignment feature, the third alignment feature, and the fourth alignment feature in the upper surface of the base pad assembly are recesses.

42. The outrigger pad support system of claim 37, wherein the first elongated member, the second elongated member, the third elongated member, and the fourth elongated member of the support layer are tubes formed of a metallic material.

43. The outrigger pad support system of claim 37, wherein the plurality of elongated members contains at least one mating feature.

44. The outrigger pad support system of claim 37, further comprising:
   the upper pad assembly formed of the first alignment feature, the second alignment feature, the third alignment feature, an intermediate plate, and an upper pad.

45. The outrigger pad support system of claim 37, further comprising:
   the upper pad assembly formed of the first alignment feature, the second alignment feature, the third alignment feature, an intermediate plate, and an upper pad;
   wherein the upper pad contains at least one mating feature.

46. An outrigger pad support system comprising:
   a base pad assembly;
      the base pad assembly having an upper surface and a lower surface;
      wherein the upper surface of the base pad assembly includes a first plurality of recesses;
      wherein the base pad assembly is formed of a plurality of pad segments that are positioned adjacent to one another to form the base pad assembly;
   a support layer;
      the support layer formed of a plurality of elongated members;
      wherein plurality of elongated members are positioned on top of the base pad assembly within the first plurality of recesses;
   an upper pad assembly;
      the upper pad assembly having a top side and a bottom side;
      wherein the bottom side of the upper pad assembly includes a second plurality of recesses;
      wherein the upper pad assembly is positioned on top of the support layer with the elongated members positioned withing the second plurality of recesses;
   wherein the first plurality of recesses align with the second plurality of recesses;
   wherein the base pad assembly covers a first area and an upper surface of the support layer has a second area;
   wherein the first area is larger than the second area;
   wherein the support layer transfers and distributes downward force from the upper pad assembly across the plurality of pad segments of the base pad assembly, thereby distributing the downward force across the larger first area.

* * * * *